(12) United States Patent
Hisakado et al.

(10) Patent No.: US 10,459,290 B2
(45) Date of Patent: Oct. 29, 2019

(54) OPTICAL FILM, POLARIZING PLATE, AND IMAGE DISPLAY DEVICE

(71) Applicant: FUJIFILM Corporation, Tokyo (JP)

(72) Inventors: Yoshiaki Hisakado, Kanagawa (JP); Masato Nagura, Kanagawa (JP); Yu Naito, Kanagawa (JP); Rikio Inoue, Kanagawa (JP); Yutaka Adegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 479 days.

(21) Appl. No.: 14/802,438

(22) Filed: Jul. 17, 2015

(65) Prior Publication Data

US 2015/0323824 A1    Nov. 12, 2015

Related U.S. Application Data

(63) Continuation of application No. PCT/JP2014/050754, filed on Jan. 17, 2014.

(30) Foreign Application Priority Data

Jan. 18, 2013  (JP) .................................. 2013-007165
Mar. 15, 2013  (JP) .................................. 2013-053975
Jan. 16, 2014  (JP) .................................. 2014-006019

(51) Int. Cl.

| G02F 1/13363 | (2006.01) |
|---|---|
| G02B 5/30 | (2006.01) |
| G02B 5/20 | (2006.01) |
| G02B 1/14 | (2015.01) |
| C08J 5/18 | (2006.01) |
| C08L 1/10 | (2006.01) |
| C08K 5/3462 | (2006.01) |
| C08B 3/08 | (2006.01) |
| C08B 3/18 | (2006.01) |
| C08B 3/06 | (2006.01) |
| C08B 3/16 | (2006.01) |
| C08K 5/544 | (2006.01) |

(52) U.S. Cl.
CPC ............ *G02F 1/13363* (2013.01); *C08J 5/18* (2013.01); *C08K 5/3462* (2013.01); *C08L 1/10* (2013.01); *G02B 1/14* (2015.01); *G02B 5/208* (2013.01); *G02B 5/305* (2013.01); *G02B 5/3033* (2013.01); *G02B 5/3083* (2013.01); *B32B 2457/202* (2013.01); *C08B 3/06* (2013.01); *C08B 3/08* (2013.01); *C08B 3/16* (2013.01); *C08B 3/18* (2013.01); *C08J 2301/10* (2013.01); *C08J 2467/03* (2013.01); *C08K 5/5442* (2013.01); *Y10T 428/105* (2015.01); *Y10T 428/1036* (2015.01); *Y10T 428/1041* (2015.01)

(58) Field of Classification Search
CPC ..... G02F 1/13363; G02B 1/14; G02B 5/3083; G02B 5/208; G02B 5/305; G02B 5/3033; C08L 1/10; C08J 5/18; C08J 2301/10; C08J 2467/03; Y10T 428/105; Y10T 428/1036; Y10T 428/1041; C08B 3/08; C08B 3/18; C08B 3/06; C08B 3/16; B32B 2457/202; C08K 5/3462; C08K 5/5442

See application file for complete search history.

(56) References Cited

U.S. PATENT DOCUMENTS

| 7,479,312 B2 | 1/2009 | Tamagawa et al. |
| 7,709,067 B2 | 5/2010 | Takagi et al. |
| 8,648,982 B2 | 2/2014 | Yanai et al. |
| 2006/0257591 A1 | 11/2006 | Takagi et al. |
| 2007/0009676 A1 | 1/2007 | Tamagawa et al. |
| 2010/0308264 A1* | 12/2010 | Furukawa ............ C08J 5/18 252/299.01 |
| 2011/0134374 A1* | 6/2011 | Fukagawa ............ C08J 5/18 349/96 |
| 2012/0177848 A1 | 7/2012 | Kamohara et al. |
| 2012/0320316 A1 | 12/2012 | Yanai et al. |

(Continued)

FOREIGN PATENT DOCUMENTS

| CN | 102585298 A | 7/2012 |
| CN | 102859401 A | 1/2013 |

(Continued)

OTHER PUBLICATIONS

Office Action, issued by the State Intellectual Property Office of China, dated Feb. 28, 2017 in connection with Chinese Patent Application No. 2014-80005260.6.

(Continued)

*Primary Examiner* — Eli D. Strah

(74) *Attorney, Agent, or Firm* — Edwards Neils LLC; Jean C. Edwards, Esq.

(57) ABSTRACT

A film of 15 to 45 μm thick containing a cellulose acylate and an aromatic ester oligomer having a repeating unit derived from a dicarboxylic acid and a repeating unit derived from a diol, in which the repeating unit derived from a dicarboxylic acid has a ratio m/n of from 0/10 to 3/7, m and n represent a molar proportion of a repeating unit derived from an aliphatic dicarboxylic acid and an aromatic dicarboxylic acid, respectively, and the film satisfies |Rth(590)|≤50 nm; has a good appearance and is free of deterioration in display performance when the film with a thin thickness is produced in the form of a roll, achieves a high pencil hardness by imparting a high Knoop hardness to the film, even with a hard coat layer provided, and is free of display unevenness on installing the film in a liquid crystal display device.

14 Claims, No Drawings

(56) References Cited

U.S. PATENT DOCUMENTS

| | | | | |
|---|---|---|---|---|
| 2013/0120839 A1* | 5/2013 | Fukagawa | ............ | G02B 5/3025 359/483.01 |
| 2013/0141681 A1* | 6/2013 | Takahashi | ............ | G02B 5/3041 349/117 |
| 2014/0099452 A1 | 4/2014 | Kawanishi et al. | | |

FOREIGN PATENT DOCUMENTS

| | | | | | |
|---|---|---|---|---|---|
| JP | 2010-138379 | A | | 6/2010 | |
| JP | 2010-248493 | A | | 11/2010 | |
| JP | 2011-173964 | A | | 9/2011 | |
| JP | 2011173964 | A | * | 9/2011 | ................ C08L 1/10 |
| JP | 2012-018421 | A | | 1/2012 | |
| JP | WO 2012014964 | A1 | * | 2/2012 | ........... G02B 5/3041 |
| JP | 2012-144627 | A | | 8/2012 | |
| KR | 10-2012-0130332 | A | | 11/2012 | |
| WO | 2006/121026 | A1 | | 11/2006 | |
| WO | 2007/007565 | A1 | | 1/2007 | |
| WO | 2012/169629 | A1 | | 12/2012 | |

OTHER PUBLICATIONS

International Search Report issued in PCT/JP2014/050754 dated Feb. 18, 2014.
Written Opinion issued in PCT/JP2014/050754 dated Feb. 18, 2014.
International Preliminary Report on Patentability issued by WIPO dated Jul. 30, 2015 in connection with International Patent Application No. PCT/JP2014/050754.
Notification of Reasons for Refusal issued by the Japanese Patent Office dated May 24, 2016 in connection with corresponding Japanese Patent Application No. 2014-006019.
Office Action, issued by the State Intellectual Property Office of China, dated Aug. 19, 2016, in connection with corresponding Chinese Patent Application No. 2014-80005260.6.
Office Action, issued by the Korean Intellectual Property Office dated Jan. 23, 2017, in connection with corresponding Korean Patent Application No. 10-2015-7019499.

\* cited by examiner

OPTICAL FILM, POLARIZING PLATE, AND IMAGE DISPLAY DEVICE

CROSS-REFERENCE TO RELATED APPLICATIONS

This application is a Continuation of PCT International Application No. PCT/JP2014/050754, which was published under PCT article 21(2) in Japanese, filed on Jan. 17, 2014, which claims priority under 35 U.S.C. Section 119(a) to Japanese Patent Application No. 2013-007165 filed on Jan. 18, 2013, Japanese Patent Application No. 2013-053975 filed on Mar. 15, 2013, and Japanese Patent Application No. 2014-006019 filed on Jan. 16, 2014.The above applications are hereby expressly incorporated by reference, in their entirety, into the present application.

BACKGROUND OF THE INVENTION

Field of the Invention

The present invention relates to an optical film that is useful for a surface protective film for an image display device, and the like, and to a polarizing plate and an image display device that have the optical film.

Background Art

A cellulose acylate film, which is represented by cellulose acetate, has high transparency and has been used for various purposes in an image display device. For example, a cellulose acylate film is used as a polarizing plate protective film in a liquid crystal display device since the adhesiveness thereof to polyvinyl alcohol used in a polarizer may be easily secured.

In recent years, a liquid crystal display device, particularly a liquid crystal display device for a middle sized or small sized equipment, undergoes drastic reduction in thickness, and thus reduction in thickness of members used therein, particularly reduction in thickness of a polarizing plate protective film (such as a protective film having a hard coat layer provided on a surface of an image display device, a protective film functioning as a retardation film, and an ordinary protective film having a small phase difference), is being demanded.

As a protective film provided on a surface of an image display device, which is represented by a liquid crystal display (LCD), a plasma display panel (PDP) and an electroluminescent display (ELD), a cellulose acylate film having provided thereon a hard coat layer for imparting physical strength, such as scratch resistance, thereto is generally used. The protective film is generally disposed outside the polarizer, particularly outside the polarizer on the viewing side.

Under the circumstances, Patent Document 1 describes that an ester oligomer is added to a thin cellulose acylate film having a thickness of 20 μm, 40 μm, 60 μm or the like to achieve a retardation film having a high Re value (in which Re shows the retardation in the in-plane direction, hereinafter the same) or a high Rth value (in which Rth shows the retardation in the thickness direction, hereinafter the same), and the application thereof to a liquid crystal display device may prevent color unevenness on displaying an black image due to temperature fluctuation and light leakage occurring on the outer periphery of the display part after the lapse of time in a high temperature and high humidity environment, and may reduce the bleed out.

Patent Documents 2 to 5 describe a cellulose acylate film having an aromatic ring-containing ester oligomer added thereto. Patent Document 2 describes that an aromatic ring-containing ester oligomer may impart a high retardation value to a film formed of a cellulose ester resin, and the example thereof describes a cellulose ester film with a thickness of 80 μm having a high Rth value.

Patent Document 3 describes that the addition of an aromatic ring-containing ester oligomer may improve the moisture permeation resistance of a cellulose ester film and may improve the bleed resistance under a high temperature and a high humidity. The example thereof describes a cellulose ester film with a thickness of 80 μm having a high Rth value.

Patent Document 4 describes that the addition of an aromatic ring-containing ester oligomer may suppress fluctuation of the retardation value of a cellulose acylate film depending on the humidity. The example thereof describes a cellulose acylate film using an aromatic ring-containing ester oligomer containing phthalic acid, isophthalic acid or terephthalic acid as an aromatic dicarboxylic acid component, and describes a retardation film with a thickness of 40 μm having a high Re value and a high Rth value.

Patent Document 5 describes a cellulose acylate film having an aromatic ring-containing ester oligomer added thereto may be suppressed in fluctuation of the retardation depending on the humidity and fluctuation thereof under a hydrothermal environment. The example thereof describes a cellulose acylate film using an aromatic ring-containing ester oligomer containing phthalic acid or isophthalic acid as an aromatic dicarboxylic acid component, and also describes a retardation film with a thickness of from 10 to 50 μm having a high Re value and a high Rth value.

CITATION LIST

Patent Documents

Patent Document 1: JP-A-2011-173964
Patent Document 2: JP-A-2010-248493
Patent Document 3: JP-A-2010-138379
Patent Document 4: WO 2006/121026
Patent Document 5: WO 2007/007565

SUMMARY OF INVENTION

When the present inventors use a thin cellulose acylate film as a base film of a protective film provided on a surface of an image display device, for reducing the thickness of the protective film, it has found that a cellulose acylate film having a thickness in a range of from 15 to 45 μm or less has an unknown problem, i.e., the film produced in the form of a roll is deteriorated in appearance due to depressions and dents (so-called a dent bump), which deteriorate the display performance.

Furthermore, when a protective film containing a cellulose acylate film having a thickness of from 15 to 45 μm having provided thereon a hard coat layer is produced, another problem has been newly found that the hard coat layer is largely reduced in pencil hardness, as compared to the case where a hard coat layer is provided on an ordinary cellulose acylate film having a thickness of approximately from 80 to 100 μm. Most of the measures for improving the hardness of the hard coat layer having been used have focused attention to improvement of the hardness of the hard coat layer itself.

Under the circumstances, as a result of investigations made by the inventors on the films described in Patent Documents 1 to 5, it has been found that there are still problems in the films.

For example, the inventors have investigated the retardation films having a thickness of 20 µm and 40 µm described in the example of Patent Document 1, and as a result have found that the constitution described in the literature may have unknown problems, for example, a problem that the pencil hardness is insufficient, and depressions are formed on the film produced in the form of a roll, thereby deteriorating the appearance and the display performance, and a problem that the hard coat layer is deteriorated in the pencil hardness thereof.

The inventors have investigated the retardation films having a high Re value and a high Rth value described in the examples of Patent Documents 2 to 5, and as a result have found that the constitutions described in the literatures may suffer display unevenness on installing the films in a liquid crystal display device.

As a result of earnest investigations, it has been found that the deterioration of the display performance due to depressions on the film and the deterioration of the pencil hardness of the hard coat layer may be avoided by increasing the Knoop hardness of the film. The Knoop hardness is one of the indices expressing hardness of a material and is one kind of indentation hardness.

An object of the invention is to provide an optical film that: has a good appearance and is free of deterioration in display performance when the film with a thin thickness is produced in the form of a roll; achieves a high pencil hardness by imparting a high Knoop hardness to the film, even with a hard coat layer provided; and is free of display unevenness on installing the film in a liquid crystal display device.

As a result of investigations made by the inventors for solving the problem, it has been found the problem may be solved by achieving an optical film that satisfies a Knoop hardness, a low Re value and a low Rth value simultaneously. Furthermore, it has been found that the problem may be solved by using a cellulose acylate film that is reduced in thickness to a particular range, adding an aromatic dicarboxylic acid-containing ester oligomer having a particular structure to the film, and controlling the Rth value of the film to a particular range. As a result of further investigations based on the knowledge, the invention has been completed.

The invention for solving the problem includes the following.

(1) An optical film containing a cellulose acylate film wherein:

the cellulose acylate film contains a cellulose acylate and an aromatic ester oligomer having a repeating unit derived from a dicarboxylic acid and a repeating unit derived from a diol, the cellulose acylate film has a thickness of from 15 to 45 µm, the repeating unit derived from a dicarboxylic acid has a ratio m/n of from 0/10 to 3/7, wherein m represents a molar proportion of a repeating unit derived from an aliphatic dicarboxylic acid, and n represents a molar proportion of a repeating unit derived from an aromatic dicarboxylic acid, and the cellulose acylate film satisfies the following expression (1):

$$|Rth(590)| \leq 50 \text{ nm} \quad (1)$$

wherein in the expression (1), Rth(590) represents a retardation in a thickness direction at a wavelength of 590 nm.

(2) In the optical film according to the item (1), the aromatic ester oligomer preferably has a hydroxyl value of 10 mgKOH/g or less.

(3) In the optical film according to the item (1) or (2), the aromatic ester oligomer preferably has both ends that each are terminated with a monocarboxylic acid residual group.

(4) In the optical film according to the item (3), the monocarboxylic acid residual group is preferably an aliphatic monocarboxylic acid residual group having from 2 to 3 carbon atoms.

(5) In the optical film according to anyone of the items (1) to (4), the aromatic ester oligomer preferably has a number average molecular weight Mn of from 600 to 2,000.

(6) In the optical film according to anyone of the items (1) to (5), the optical film preferably contains the aromatic ester oligomer in an amount of from 5 to 25% by mass based on the cellulose acylate.

(7) In the optical film according to any one of the items (1) to (6), the optical film preferably further contains a compound having a ratio of (molecular weight)/(number of aromatic groups) of 300 or less and represented by the following general formula (2):

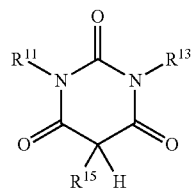

wherein in the general formula (2), $R^{11}$, $R^{13}$ and $R^{15}$ each independently represent a hydrogen atom, an alkyl group having from 1 to 20 carbon atoms, a cycloalkyl group having from 3 to 20 carbon atoms, an alkenyl group having from 2 to 20 carbon atoms, or an aromatic group having from 6 to 20 carbon atoms.

(8) In the optical film according to anyone of the items (1) to (7), the amount of the aromatic ester oligomer contained is preferably from 5 to 25% by mass based on the cellulose acylate.

(9) In the optical film according to any one of the items (1) to (8), the optical film preferably further contains a compound having a ratio of (molecular weight)/(number of aromatic groups) of 300 or less represented by the general formula (2) in an amount of from 0.5 to 20% by mass based on the cellulose acylate.

(10) In the optical film according to any one of the items (1) to (9), the optical film preferably further contains an ultraviolet ray absorbent.

(11) In the optical film according to any one of the items (1) to (10), the optical film preferably further contains at least one layer of an antiglare layer, a hard coat layer and a patterned retardation layer, on the cellulose acylate film.

(12) In the optical film according to the item (11), the patterned retardation layer preferably contains a first region and a second region, and the Re value of the first region and the Re value of the second region each are preferably from 30 to 250 nm.

(13) In the optical film according to any one of the items (1) to (12), the repeating unit derived from an aromatic dicarboxylic acid contained in the aromatic ester oligomer preferably contains a repeating unit derived from phthalic acid.

(14) A polarizing plate containing at least one sheet of the optical film according to any one of the items (1) to (13).

(15) A liquid crystal display device containing the optical film according to any one of the items (1) to (13) or the polarizing plate according to the item (14).

According to the invention, an optical film may be provided that: has a good appearance and is free of deterioration in display performance when the film with a thin thickness is produced in the form of a roll; achieves a high pencil hardness by imparting a high Knoop hardness to the film, even with a hard coat layer provided; and is free of display unevenness on installing the film in a liquid crystal display device.

DESCRIPTION OF EMBODIMENTS

The invention will be described in detail below. While the constitutional elements of the invention may be described with reference to representative embodiments of the invention, the invention is not limited to the embodiments. In the description, the expression for numeral ranges "from A to B" means that the values A and B are included in the range as the lower and upper limits respectively, and the expression for numeral ranges "A or more" or "A or less" means that the value A is included in the range as the lower or upper limit respectively.
Optical Film The optical film of the invention contains a cellulose acylate film containing at least a cellulose acylate and an aromatic ester oligomer having a repeating unit derived from a dicarboxylic acid and a repeating unit derived from a diol, and has a thickness of from 15 to 45 μm, in which the repeating unit derived from a dicarboxylic acid has a ratio m/n of from 0/10 to 3/7, wherein m represents the molar proportion of the repeating unit derived from an aliphatic dicarboxylic acid, and n represents the molar proportion of the repeating unit derived from an aromatic dicarboxylic acid, and the cellulose acylate film satisfies the following expression (1):

$$|Rth(590)| \leq 50 \text{ nm} \tag{1}$$

wherein in the expression (1), Rth(590) represents a retardation in a thickness direction at a wavelength of 590 nm.

According to the constitution, an optical film may be provided that: has a good appearance and is free of deterioration in display performance when the film with a thin thickness is produced in the form of a roll; achieves a high pencil hardness by imparting a high Knoop hardness to the film, even with a hard coat layer provided; and is free of display unevenness on installing the film in a liquid crystal display device.

The use of the aromatic ester oligomer may improve the appearance of the optical film produced in the form of a roll, by enhancing the Knoop hardness of the film, and the Knoop hardness of the optical film may be further enhanced by controlling the ratio of the molar proportion m of the repeating unit derived from an aliphatic dicarboxylic acid and the molar proportion n of the repeating unit derived from an aromatic dicarboxylic acid, thereby further improving the appearance of the optical film produced in the form of a roll.

As a result of earnest investigations made by the inventors, it has been found that when an optical film containing an ordinary cellulose acylate film having a thickness of approximately from 80 to 100 μm having formed thereon a hard coat layer is enhanced in the Knoop hardness, the pencil hardness of the surface of the hard coat layer may also be enhanced. However, it has been also found that in the case where the optical film containing a cellulose acylate film having formed thereon a hard coat layer is reduced in thickness to provide a thickness of the cellulose acylate film of from 15 to 45 μm, the pencil hardness on the surface of the hard coat layer may be decreased in some cases even though the Knoop hardness is enhanced.

It is considered that the pencil hardness is decreased by reducing the thickness of the cellulose acylate film because the rigidity of the film (hardness×thickness) may be decreased with the same hardness of the film. Accordingly, a thinner film may be demanded to have a higher Knoop hardness. It is considered that there is a difference in the pencil hardness even between thin films with the same Knoop hardness because the impregnation of the hard coat layer into the cellulose acylate film may vary depending on the plasticizer used. It is considered that the pencil hardness may be decreased with higher ease of impregnation of the hard coat layer into the cellulose acylate film.

In the invention, the aromatic ester oligomer is used, and the ratio of the molar proportion m of the repeating unit derived from an aliphatic dicarboxylic acid of the aromatic ester oligomer and the molar proportion n of the repeating unit derived from an aromatic dicarboxylic acid is controlled, by which the Knoop hardness of the optical film may be enhanced, and simultaneously the impregnation of the hard coat layer into the cellulose acylate film may be suppressed, thereby enhancing the pencil hardness in the case where the hard coat layer is provided. In the case where the sugar ester compound described in JP-A-2012-215812 is used as the additive, the pencil hardness on the surface of the hard coat layer may be enhanced by enhancing the Knoop hardness of the optical film containing a cellulose acylate film having a thickness of approximately from 80 to 100 μm having formed thereon the hard coat layer, but in the case where the optical film containing the cellulose acylate film having formed thereon the hard coat layer is reduced in thickness to make a thickness of the cellulose acylate film of from 15 to 45 μm, there may be a problem that the pencil hardness on the surface of the hard coat layer may be decreased even though the Knoop hardness of the optical film is enhanced.

Furthermore, the aromatic ester oligomer is used to make a value of Rth within the range defined by the expression (1) when the aromatic ester oligomer is added to the cellulose acylate film, thereby providing an optical film that is free of display unevenness when the film is installed in a liquid crystal display device as an optical film disposed on the inner side of a polarizer.

Preferred embodiments of the optical film of the invention will be described below.
Cellulose Acylate Film
Cellulose Acylate The cellulose acylate film contained in the optical film of the invention preferably contains a cellulose acylate as the major component. The cellulose acylate used in the invention is not particularly limited. In the cellulose acylate, a cellulose acylate having an acetyl substitution degree of from 2.70 to 2.95 is preferably used. When the acetyl substitution degree is 2.7 or more, it is advantageous since the compatibility with the aromatic ester oligomer described later may be improved, and the film may be prevented from being whitened. Furthermore, it is also advantageous since the moisture permeability and the water content may be improved in addition to the improvement of the transparency. Moreover, it is also advantageous since the polarizer durability of the polarizing plate and the hydrothermal durability of the film itself may be improved. The acetyl substitution degree is preferably 2.95 or less from the standpoint of the optical capability.

The acetyl substitution degree of the cellulose acylate is more preferably from 2.75 to 2.90, and particularly preferably from 2.82 to 2.87.

The preferred ranges of the total acyl substitution degree are the same as the preferred ranges of the acetyl substitution degree.

A substitution degree of an acyl group may be measured by a method according to ASTM D817-96. The sites that are not substituted by an acyl group are generally in the form of a hydroxyl group.

In the acyl group having from 2 to 22 carbon atoms substituted on the hydroxyl group of the cellulose, the acyl group having from 2 to 22 carbon atoms is not particularly limited and may be an aliphatic group or an aryl group, and may be a single compound or a mixture of two or more kinds thereof. Examples thereof include an alkylcarbonyl ester, an alkenylcarbonyl ester, an aromatic carbonyl ester and an aromatic alkylcarbonyl ester of cellulose, which may further have a substituted group. Preferred examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among these, acetyl, propionyl, butanoyl, dodecanoyl, octadecanoyl, t-butanoyl, oleoyl, benzoyl, naphthylcarbonyl, cinnamoyl and the like are preferred, and acetyl, propionyl and butanoyl are more preferred.

The cellulose acylate used in the invention is preferably a cellulose acylate having an acetyl group as a substituent.

A mixed fatty acid cellulose acylate may be used, and specific examples of the mixed fatty acid cellulose acylate include cellulose acetate propionate and cellulose acetate butyrate.

The basic theory of the synthesis method of the cellulose acylate is described in Migita, et al., Mokuzai Kagaku (Wood Chemistry), pp. 180-190 (published by Kyoritsu Shuppan Co., Ltd., 1968). Representative examples of the synthesis method include a liquid phase acetylation method with a carboxyl anhydride-acetic acid-sulfuric acid catalyst.

The cellulose acylate preferably has a molecular weight of from 40,000 to 200,000, and more preferably from 100,000 to 200,000, in terms of number average molecular weight (Mn). The cellulose acylate used in the invention preferably has an Mw/Mn ratio of 4.0 or less, and more preferably from 1.4 to 2.3.

The average molecular weight and the molecular weight distribution of the cellulose acylate and the like in the invention may be obtained in such a manner that the number average molecular weight (Mn) and the weight average molecular weight (Mw) are measured by gel permeation chromatography (GPC), and the ratio thereof may be calculated according to the method described in WO 2008/126535.

The cellulose acylate film contains at least one kind of an aromatic ester oligomer, in addition to the cellulose acylate as the major component. The aromatic ester oligomer is preferably added in a small amount since it may contribute to the enhancement of the tensile elastic modulus. For example, the cellulose acylate film containing the aromatic ester oligomer may be enhanced in the tensile elastic modulus through a stretching treatment (preferably a biaxial stretching treatment).

Aromatic Ester Oligomer

The aromatic ester oligomer used in the invention will be described.

The aromatic ester oligomer has a repeating unit derived from a dicarboxylic acid and a repeating unit derived from a diol, and the repeating unit derived from a dicarboxylic acid has a ratio m/n of from 0/10 to 3/7, wherein m represents the molar proportion of the repeating unit derived from an aliphatic dicarboxylic acid, and n represents the molar proportion of the repeating unit derived from an aromatic dicarboxylic acid. It is expected that in the case where the ester oligomer enters into the free volume fraction of the cellulose, the hardness inherent to the material may be increased by increasing the phthalic acid proportion, and thereby the Knoop hardness of the film may be increased.

The number average molecular weight (Mn) of the aromatic ester oligomer in the invention is preferably from 600 to 2,000, more preferably from 600 to 1,500, and further preferably from 600 to 1,200. When the number average molecular weight of the aromatic ester oligomer is 600 or more, the aromatic ester oligomer may have low volatility, which may prevent malfunction of the film and contamination of the process due to the volatilization thereof on stretching the cellulose acylate film under a high temperature condition. When the number average molecular weight thereof is 2,000 or less, the aromatic ester oligomer may have high compatibility with the cellulose acylate, which may prevent bleed out in the production of the film and the stretching under heating.

The number average molecular weight of the aromatic ester oligomer in the invention may be measured and evaluated by gel permeation chromatography.

The aromatic ester oligomer used in the invention is preferably synthesized from a diol having from 2 to 10 carbon atoms and a dicarboxylic acid having from 4 to 10 carbon atoms. Examples of the synthesis method include known methods, such as dehydration condensation reaction of a dicarboxylic acid and a diol, and addition and dehydration condensation reaction of a dicarboxylic anhydride to a glycol.

The aromatic ester oligomer is preferably a polyester oligomer that is obtained through synthesis with an aromatic dicarboxylic acid as a dicarboxylic acid and a diol.

The dicarboxylic acid and the diol that may be preferably used in the synthesis of the aromatic ester oligomer in the invention will be described.

Dicarboxylic Acid

The dicarboxylic acid used may be either an aliphatic dicarboxylic acid or an aromatic dicarboxylic acid.

Examples of the aromatic dicarboxylic acid include phthalic acid, terephthalic acid and isophthalic acid. Among these, phthalic acid and terephthalic acid are preferred, and phthalic acid is preferred from the standpoint that the pencil hardness is improved in the case where a hard coat layer is provided, the display unevenness is reduced on installing the film in a liquid crystal display device, and the polarizer durability is improved. Two or more kinds of aromatic dicarboxylic acids may be used in combination. Specific examples thereof include combination use of phthalic acid and terephthalic acid. In the aromatic ester oligomer, from the standpoint that the pencil hardness is improved in the case where a hard coat layer is provided, the display unevenness is reduced on installing the film in a liquid crystal display device, and the polarizer durability is improved, the proportion of phthalic acid among the aromatic dicarboxylic acids is preferably increased, and the proportion of the repeating unit derived from phthalic acid in the repeating units derived from the dicarboxylic acids contained in the aromatic ester oligomer is preferably 70% by mol or more, more preferably 80% by mol or more, and particularly preferably 90% by mol or more. The ratio (molar ratio) of phthalic acid and terephthalic acid is preferably from 5/5 to 10/0, more preferably from 7/3 to 10/0, and particularly preferably 10/0, from the standpoint that Rth of the cellulose acylate film is reduced.

Examples of the aliphatic dicarboxylic acid include oxalic acid, malonic acid, succinic acid, maleic acid, fumaric acid, glutaric acid, adipic acid, suberic acid, azelaic acid, cyclohexanedicarboxylic acid and sebacic acid. Among these, succinic acid and adipic acid are preferred, and adipic acid is particularly preferred.

The number of carbon atoms of the dicarboxylic acid used in the invention is preferably from 4 to 10, and more preferably from 4 to 8. A mixture of two or more kinds of dicarboxylic acids may be used in the invention, and in this case, the average number of carbon atoms of the two or more kinds of dicarboxylic acids is preferably in the aforementioned range. The number of carbon atoms of the dicarboxylic acid that is in the range is preferred since the aromatic ester oligomer may have high compatibility with the cellulose acylate, and the resulting optical film may be prevented from undergoing bleed out of the aromatic ester oligomer in the production of the cellulose acylate film and on stretching the film under heating.

An aliphatic dicarboxylic acid and an aromatic dicarboxylic acid may be used in combination. Specific examples thereof include combination use of adipic acid and phthalic acid, combination use of adipic acid and terephthalic acid, combination use of succinic acid and phthalic acid, and combination use of succinic acid and terephthalic acid.

In the case where an aliphatic dicarboxylic acid and an aromatic dicarboxylic acid are used in combination, the ratio of them (molar ratio) m/n may be from 0/10 to 3/7, and preferably from 0/10 to 2/8, wherein m represents the molar proportion of the repeating unit derived from the aliphatic dicarboxylic acid, and n represents the molar proportion of the repeating unit derived from the aromatic dicarboxylic acid.

Diol

Examples of the diol include an aliphatic diol and an aromatic diol, and an aliphatic diol is preferred.

Examples of the aliphatic diol include an alkyl diol and an alicyclic diol, specific examples of which include ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol(3,3-dimethylolpentane), 2-n-butyl-2-ethyl-1,3-propanediol (3,3-dimethylolheptane), 3-methyl-1,5-pentanediol, 1,6-hexanediol, 1,4-cyclohexanedol, 1,4-cyclohexanedimethanol, 2,2,4-trimethyl-1,3-pentanediol, 2-ethyl-1,3-hexanediol, 2-methyl-1,8-octanediol, 1,9-nonanediol, 1,10-decanediol and diethylene glycol.

The aliphatic diol is preferably at least one kind of ethylene glycol, 1,2-propanediol and 1,3-propanediol, more preferably at least one kind of ethylene glycol and 1,2-propanediol, and particularly preferably ethylene glycol from the standpoint of the compatibility with the cellulose. In the case where two kinds of aliphatic diols are used, ethylene glycol and 1,2-propanediol are preferably used.

The number of carbon atoms of the glycol is preferably from 2 to 10, more preferably from 2 to 6, and particularly preferably from 2 to 4. In the case where two or more kinds of the glycols are used, the average number of carbon atoms of the two or more kinds of glycols is preferably in the aforementioned range. When the number of carbon atoms of the glycol is in the range, the aromatic ester oligomer may have high compatibility with the cellulose acylate, and the resulting optical film may be prevented from undergoing bleed out of the aromatic ester oligomer in the production of the cellulose acylate film and on stretching the film under heating.

Capping

The both ends of the aromatic ester oligomer used in the invention may be either capped or uncapped, and the aromatic ester oligomer preferably has an end that is capped (terminated) with an alkyl group or an aromatic group. The capping with a hydrophobic functional group is effective for enhancing the polarizer durability used in a polarizing plate due to the factor that hydrolysis of the ester group may be delayed.

The both ends of the aromatic ester oligomer are preferably protected (terminated) with a monoalcohol residual group or a monocarboxylic acid residual group for preventing the ends from becoming a carboxylic acid or a hydroxyl group. The hydroxyl value of the aromatic ester oligomer is preferably 10 mgKOH/g or less from the standpoint of the improvement of the polarizer durability, and is more preferably 5 mgKOH/g or less, and particularly preferably 0 mgKOH/g.

In the case where the both ends of the aromatic ester oligomer are capped, the ends are preferably capped through reaction with a monocarboxylic acid. In this case, the both ends of the aromatic ester oligomer each are terminated with a monocarboxylic acid residual group. The residual group referred herein means a partial structure of the aromatic ester oligomer that has characteristics of the monomer constituting the aromatic ester oligomer. For example, the monocarboxylic acid residual group derived from a monocarboxylic acid R—COOH is R—CO—. The monocarboxylic acid residual group is preferably an aliphatic monocarboxylic acid residual group, more preferably an aliphatic monocarboxylic acid residual group having from 2 to 22 carbon atoms, further preferably an aliphatic monocarboxylic acid residual group having 2 or 3 carbon atoms, and particularly preferably an aliphatic monocarboxylic acid residual group having 2 carbon atoms.

When the number of carbon atoms of the monocarboxylic acid residual group at the both ends of the aromatic ester oligomer is 3 or less, the aromatic ester oligomer may have low volatility to prevent the aromatic ester oligomer from being reduced in amount on heating, and the resulting optical film may be prevented from undergoing process contamination and malfunction in surface property. Accordingly, the monocarboxylic acid used for capping is preferably an aliphatic monocarboxylic acid rather than an aromatic monocarboxylic acid, from the standpoint of the productivity and the surface property. The monocarboxylic acid is preferably an aliphatic monocarboxylic acid having from 2 to 22 carbon atoms, more preferably an aliphatic monocarboxylic acid having 2 or 3 carbon atoms, and particularly preferably an aliphatic monocarboxylic acid residual group having 2 carbon atoms. The monocarboxylic acid is preferably acetic acid, propionic acid, butanoic acid, derivatives thereof and the like, more preferably acetic acid or propionic acid, and most preferably acetic acid (which forms an end acetyl group). Two or more kinds of the monocarboxylic acids may be used as a mixture for capping.

In the case where the both ends of the aromatic ester oligomer are capped, the aromatic ester oligomer may not be in a solid state at ordinary temperature to provide good handling property, and the resulting cellulose acylate film may be excellent in the stability against humidity and the polarizer durability used in a polarizing plate.

Synthesis Method

The aromatic ester oligomer may be easily synthesized, for example, by a thermal fusion condensation method using polyesterification reaction or ester exchange reaction of the dicarboxylic acid containing the aromatic dicarboxylic acid, the diol, and depending on necessity, the monocarboxylic acid or the monoalcohol for capping the ends according to the ordinary method, or an interface condensation method with the acid chloride of the acid and a glycol.

Amount Added

In the optical film of the invention, the amount of the aromatic ester oligomer contained is preferably from 5 to 25% by mass, more preferably from 5 to 20% by mass, and particularly preferably from 5 to 15% by mass, based on the cellulose acylate.

Compound Represented by General Formula (1) or (2)

The optical film of the invention preferably further contains a compound having a ratio of (molecular weight)/(number of aromatic groups) of 300 or less represented by the following general formula (1) or (2) from the standpoint of the improvement of the polarizer durability, and more preferably contains a compound having a ratio of (molecular weight)/(number of aromatic groups) of 300 or less represented by the following general formula (2). The compound is also preferred from the standpoint of the improvement of the appearance of the film produced in the form of a roll, and is also preferably used from the standpoint of the achievement of a pencil hardness of 3H in the case where a hard coat layer is provided. In the following description, the compound represented by the general formula (1) or (2) may be referred to as a polarizer durability improver.

The polarizer durability improver preferably has a hydrogen-bonding hydrogen-donating group.

Examples of the hydrogen-bonding hydrogen-donating group are described, for example, in the literatures, such as Jeffrey, George A., Introduction to Hydrogen Bonding, published by Oxford University Press.

Preferred examples of the hydrogen-bonding hydrogen-donating group in the polarizer durability improver in the invention include, from the standpoint of the interaction to the carbonyl group in the cellulose acylate, an amino group, an acylamino group, an alkoxycarbonylamino group, an aryloxycarbonylamino group, a sulfonylamino group, a hydroxyl group, a mercapto group and a carboxyl group, and among these, a sulfonylamino group, an acylamino group, an amino group and a hydroxyl group are more preferred, and an amino group and a hydroxyl group are further preferred.

The ratio of (molecular weight)/(number of aromatic groups) of the polarizer durability improver is 300 or less, preferably 190 or less, more preferably 160 or less, and particularly preferably 150 or less.

The ratio of (molecular weight)/(number of aromatic groups) of the polarizer durability improver is preferably 90 or more, and more preferably 100 or more, from the standpoint of the improvement of the compatibility with the cellulose acylate.

The molecular weight of the polarizer durability improver is preferably from 200 to 1,000, more preferably from 250 to 800, and particularly preferably from 280 to 600. The molecular weight that is the lower limit or more is preferred since the polarizer durability improver may be prevented from being lost due to volatilization thereof on forming the cellulose acylate film, and the molecular weight that is the upper limit or less is also preferred since good compatibility may be obtained between the cellulose acylate and the polarizer durability improver, providing a cellulose acylate film having low haze.

As for the polarizer durability improver, the compound represented by the general formula (1) and the compound represented by the general formula (2) will be described in this order below.

Compound Represented by General Formula (1)

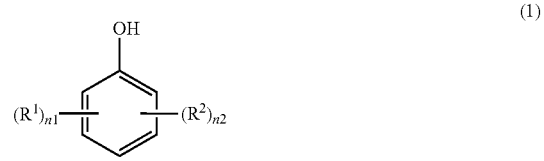

In the general formula (1), $R^1$ represents a substituent; $R^2$ represents a substituent represented by the following general formula (1-2); n1 represents an integer of from 0 to 4, provided that when n1 is 2 or more, plural groups represented by $R^1$ may be the same as or different from each other; and n2 represents an integer of from 1 to 5, provided that when n2 is 2 or more, plural groups represented by $R^2$ may be the same as or different from each other,

In the general formula (1-2), A represents a substituted or unsubstituted aromatic ring; $R^3$ and $R^4$ each independently represent a hydrogen atom, an alkyl group having from 1 to 5 carbon atoms, or a substituent represented by the following general formula (1-3); $R^5$ represents a single bond or an alkylene group having from 1 to 5 carbon atoms; X represents a substituted or unsubstituted aromatic ring; and n3 represents an integer of from 0 to 10, provided that when n3 is 2 or more, plural groups represented by $R^5$ and X may be the same as or different from each other,

In the general formula (1-3), X represents a substituted or unsubstituted aromatic ring; $R^6$, $R^7$, $R^8$ and $R^9$ each independently represent a hydrogen atom or an alkyl group having from 1 to 5 carbon atoms; and n5 represents an integer of from 1 to 11, provided that n5 is 2 or more, plural groups represented by $R^6$, $R^7$, $R^8$ and X may be the same as or different from each other.

$R^1$ represents a substituent. The substituent is not particularly limited, and examples thereof include an alkyl group (preferably an alkyl group having from 1 to 10 carbon atoms, such as methyl, ethyl, isopropyl, t-butyl, pentyl, heptyl, 1-ethylpentyl, benzyl, 2-ethoxyethyl and 1-carbonxymethyl), an alkenyl group (preferably an alkenyl group having from 2 to 20 carbon atoms, such as vinyl, allyl and oleyl), an alkynyl group (preferably an alkynyl group having from 2 to 20 carbon atoms, such as ethynyl, butadiynyl and phenylethynyl), a cycloalkyl group (preferably a cycloalkyl group having from 3 to 20 carbon atoms, such as cyclopropyl, cyclopentyl, cyclohexyl and 4-methylcyclohexyl), an aryl group (preferably an aryl group having from 6 to 26 carbon atoms, such as phenyl, 1-naphthyl, 4-methoxyphenyl, 2-chlorophenyl and 3-methylphenyl), a heterocyclic group (preferably a heterocyclic group having from 2 to 20 carbon atoms, such as 2-pyridyl, 4-pyridyl, 2-imidazolyl, 2-benzoimidazolyl, 2-thiazolyl and 2-oxazolyl), an alkoxy group (preferably an alkoxy group having from 1 to 20 carbon atoms, such as methoxy, ethoxy, isopropyloxy and benzyloxy), an aryloxy group (preferably an aryloxy group having from 6 to 26 carbon atoms, such as phenoxy, 1-naphthyloxy, 2-methylphenoxy and 4-methoxyphenoxy), an alkoxycarbonyl group (preferably an alkoxycarbonyl group having from 2 to 20 carbon atoms, such as ethoxycarbonyl and 2-ethylhexyloxycarbonyl), an amino group (preferably an amino group having from 0 to 20 carbon atoms, such as amino, N,N-dimethylamino, N,N-diethylamino, N-ethylamino and anilino), a sulfonamide group (preferably a sulfonamide group having from 0 to 20 carbon atoms, such as N,N-dimethylsulfonamide and N-phenylsulfonamide), an acyloxy group (preferably an acyloxy group having from 1 to 20 carbon atoms, such as acetyloxy and benzoyloxy), a carbamoyl group (preferably a carbamoyl group having from 1 to 20 carbon atoms, such as N,N-dimethylcarbamoyl and N-phenylcarbamoyl), an acylamino group (preferably an acylamino group having from 1 to 20 carbon atoms, such as acetylamino and benzoylamino), a cyano group, a halogen atom (such as a fluorine atom, a chlorine atom, a bromine atom and an iodine atom), and a hydroxyl group.

$R^1$ preferably represents an alkyl group having from 1 to 20 carbon atoms or a hydroxyl group, and more preferably a hydroxyl group or a methyl group. $R^1$ may have one or more substituent, and examples of the further substituent include the substituents exemplified above for $R^1$.

n1 represents an integer of from 0 to 4, and preferably from 2 to 4.

n2 represents an integer of from 1 to 5, preferably from 1 to 3, and more preferably from 1 to 2.

$R^2$ represents a substituent represented by the following general formula (1-2):

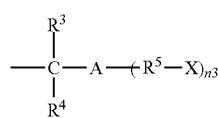

(1-2)

In the general formula (1-2), A represents a substituted or unsubstituted aromatic ring; $R^3$ and $R^4$ each independently represent a hydrogen atom, an alkyl group having from 1 to 5 carbon atoms, or a substituent represented by the following general formula (1-3); $R^5$ represents a single bond or an alkylene group having from 1 to 5 carbon atoms; X represents a substituted or unsubstituted aromatic ring; and n3 represents an integer of from 0 to 10, provided that when n3 is 2 or more, plural groups represented by $R^5$ and X may be the same as or different from each other.

A represents a substituted or unsubstituted aromatic ring. The aromatic ring may be a heterocyclic ring containing a hetero atom, such as a nitrogen atom, an oxygen atom and a sulfur atom. Examples of the aromatic ring represented by A include a benzene ring, an indene ring, a naphthalene ring, a fluorene ring, a phenanthrene ring, an anthracene ring, a biphenyl ring, a pyrene ring, a pyrane ring, a dioxane ring, a dithiane ring, a dithiin ring, a pyridine ring, a piperidine ring, an oxazine ring, a morpholine ring, a thiazine ring, a pyridazine ring, a pyrimidine ring, a pyrazine ring, a piperazine ring and a triazine ring. Other 6-membered or 5-membered ring may be condensed thereto.

A is preferably a benzene ring.

Preferred examples of the substituent that may be substituted on A include a halogen atom (such as a fluorine atom, a chlorine atom, a bromine atom and an iodine atom), an alkyl group and a hydroxyl group, and an alkyl group and a hydroxyl group are preferred, an alkyl group having from 1 to 10 carbon atoms and a hydroxyl group are more preferred, and an alkyl group having from 1 to 5 carbon atoms and a hydroxyl group are further preferred.

In the general formula (1-2), $R^5$ represents a single bond or an alkylene group having from 1 to 5 carbon atoms, and the alkylene group having from 1 to 5 carbon atoms may have a substituent. $R^5$ is preferably an alkylene group having from 1 to 4 carbon atoms, and more preferably an alkylene group having from 1 to 3 carbon atoms. Examples of the substituent that may be substituted on $R^5$ include an alkyl group having from 1 to 5 carbon atoms (such as methyl, ethyl, isopropyl and t-butyl), a halogen atom (such as a fluorine atom, a chlorine atom, a bromine atom and an iodine atom), and a hydroxyl group.

In the general formula (1-2), X represents a substituted or unsubstituted aromatic ring. The aromatic ring may be a heterocyclic ring containing a hetero atom, such as a nitrogen atom, an oxygen atom and a sulfur atom. Examples of the aromatic ring represented by X include a benzene ring, an indene ring, a naphthalene ring, a fluorene ring, a phenanthrene ring, an anthracene ring, a biphenyl ring, a pyrene ring, a pyrane ring, a dioxane ring, a dithiane ring, a dithiin ring, a pyridine ring, a piperidine ring, an oxazine ring, a morpholine ring, a triazine ring, a pyridazine ring, a pyrimidine ring, a pyrazine ring, a piperazine ring and a triazine ring. Other 6-membered or 5-membered ring may be condensed thereto. X is preferably a benzene ring. Examples of the substituent that may be substituted on X include those exemplified for the substituent on A.

n3 represents an integer of from 0 to 10, preferably from 0 to 2, and more preferably from 0 to 1. When n3 is an integer of 2 or more, plural groups represented by —($R^5$—X) may be the same as or different from each other, may each be bonded to A. In the case where n3 is 0, there is no group represented by —($R^5$—X), and thus no group represented by —($R^5$—X) is bonded to A.

$R^3$ and $R^4$ each independently represent a hydrogen atom, an alkyl group having from 1 to 5 carbon atoms, or a substituent represented by the following general formula (1-3). $R^3$ and $R^4$ each independently preferably represent a hydrogen atom, an alkyl group having from 1 to 3 carbon atoms, or a substituent represented by the following general formula (1-3), and more preferably a hydrogen atom, a methyl group, or a substituent represented by the following general formula (1-3):

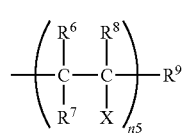

(1-3)

In the substituent represented by the general formula (1-3), which may be contained in the substituent represented by the general formula (1-2), X represents a substituted or unsubstituted aromatic ring; $R^6$, $R^7$, $R^8$ and $R^9$ each independently represent a hydrogen atom or an alkyl group having from 1 to 5 carbon atoms; and n5 represents an integer of from 1 to 11, provided that n5 is 2 or more, plural groups represented by $R^6$, $R^7$, $R^8$ and X may be the same as or different from each other.

In the substituent represented by the general formula (1-3), which may be contained in the substituent represented by the general formula (1-2), X has the same meaning as X in the general formula (1-2), and the preferred ranges thereof are the same as X in the general formula (1-2).

$R^6$, $R^7$, $R^8$ and $R^9$ each independently represent a hydrogen atom or an alkyl group having from 1 to 5 carbon atoms. $R^3$ and $R^4$ each are preferably a hydrogen atom or an alkyl group having from 1 to 3 carbon atoms, and more preferably a hydrogen atom or a methyl group.

n5 represents an integer of from 1 to 11, preferably from 1 to 9, and more preferably from 1 to 7.

The substituent represented by the general formula (1-3), which may be contained in the substituent represented by the general formula (1-2), is preferably represented by the following general formula (1-3'):

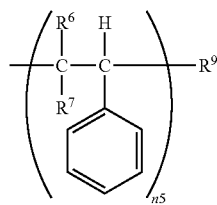

(1-3')

The definitions of the symbols in the general formula (1-3'), which may be contained in the substituent represented by the general formula (1-2), are the same as the definitions of the symbols in the general formula (1-3), and the preferred ranges thereof are the same as those in the general formula (1-3).

The substituent represented by the general formula (1-3), which may be contained in the substituent represented by the general formula (1-2), is more preferably represented by the following general formula (1-3"):

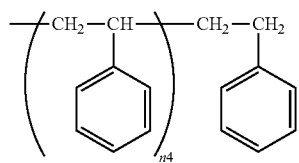

(1-3")

wherein in the general formula (1-3"), n4 represents an integer of from 0 to 10.

In the general formula (1-3"), n4 represents an integer of from 0 to 10, preferably from 0 to 8, and more preferably from 0 to 6.

The substituent represented by the general formula (1-2) is preferably represented by the following general formula (1-2'):

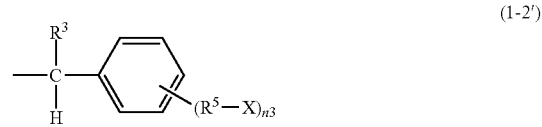

(1-2')

In the general formula (1-2'), $R^3$ represents a hydrogen atom, an alkyl group having from 1 to 5 carbon atoms, or a substituent represented by the general formula (1-3); $R^5$ represents a single bond or an alkylene group having from 1 to 5 carbon atoms; X represents a substituted or unsubstituted aromatic ring; and n3 represents an integer of from 0 to 5, provided that when n3 is 2 or more, plural groups represented by $R^5$ and X may be the same as or different from each other.

The preferred ranges of the symbols in the general formula (1-2') are the same as those in the general formula (1-2).

The general formula (1-2) is preferably represented by the following general formula (1-2"):

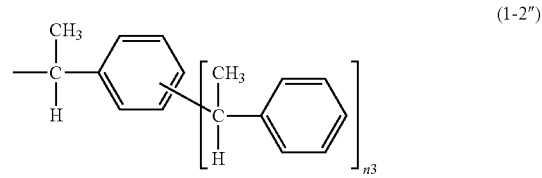

(1-2")

In the general formula (1-2"), n3 represents an integer of from 0 to 5.

The preferred ranges of n3 in the general formula (1-2") are the same as the preferred ranges of n3 in the general formula (1-2).

Specific examples of the compound represented by the general formula (1) are shown below, but the compound is not limited to the specific examples.

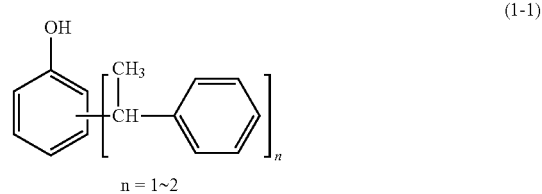

(1-1)

n = 1~2

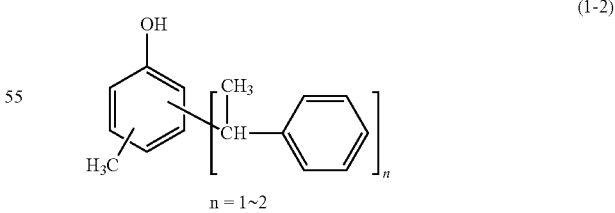

(1-2)

n = 1~2

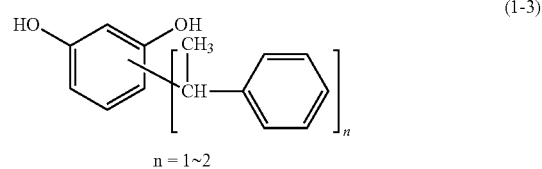

(1-3)

n = 1~2

-continued (1-4)
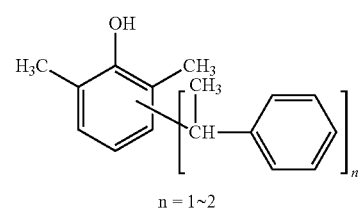
n = 1~2

(1-5)
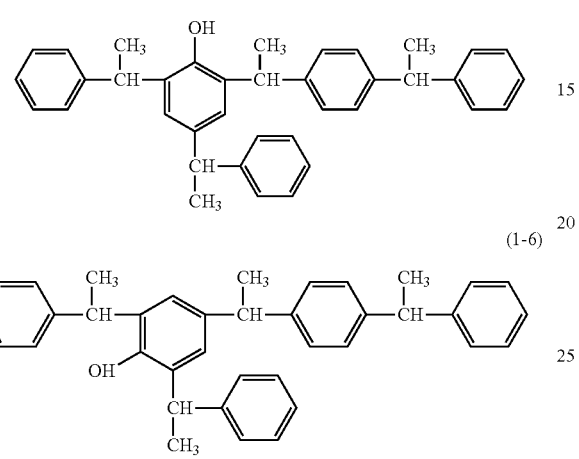

(1-6)

(1-7)
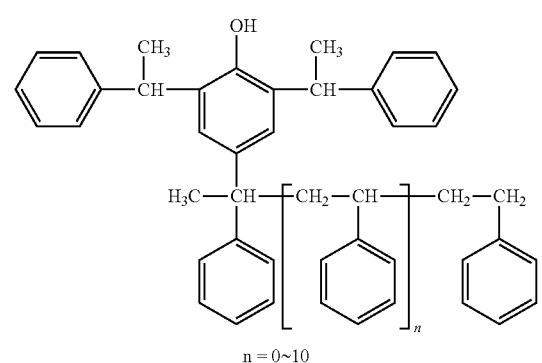
n = 0~10

(1-11)
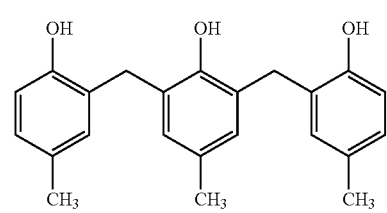

(1-12)
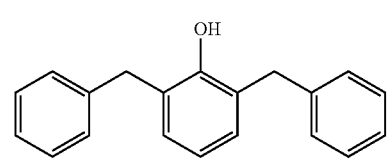

(1-13)
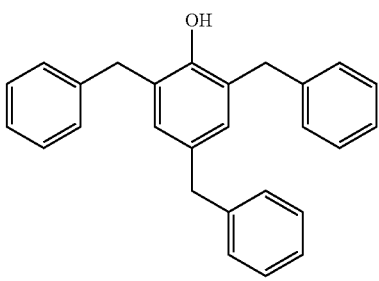

(1-14)
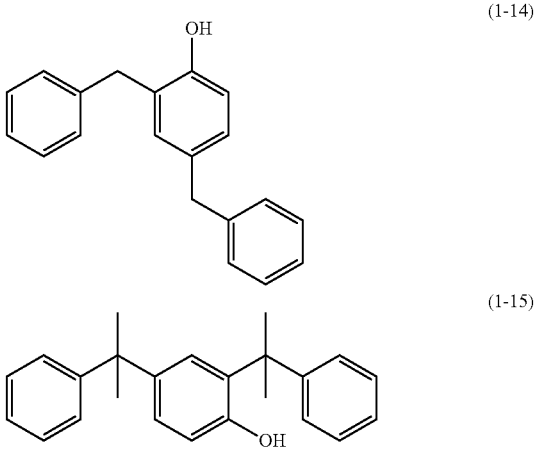

(1-15)

For enabling the compounds each represented by the general formula (1) having different numbers of a hydroxyl group to form hydrogen bonds at plural sites, a mixture of two or more kinds of the compounds each represented by the general formula (1) different from each other may be used. Examples of the mixture include a mixture of a styrenated phenol formed of phenol alkylated with from 1 to 3 mol of styrene, a styrenated phenol formed of an alkylated styrene further alkylated at the phenyl moiety thereof with styrene, and a styrenated phenol formed of phenol alkylated with an oligomer, such as a dimer, a trimer or a tetramer, of styrene.

The compound represented by the general formula (1) may be generally synthesized by adding one equivalent or more of a styrene compound to one equivalent of a phenol compound in the presence of an acid catalyst, and a commercially available product thereof may also be used. A mixture obtained by the synthesis method may be used as it is.

Examples of the commercially available product of the compound represented by the general formula (1) include TSP, which is a styrenated phenol produced by Sanko Co., Ltd., PH-25, produced by Nitto Chemical Co., Ltd., and Nonflex WS, produced by Seiko Chemical Co., Ltd.

Compound Represented by General Formula (2)

(2)
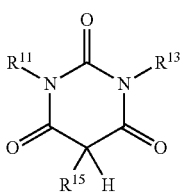

wherein in the general formula (2), $R^{11}$, $R^{13}$ and $R^{15}$ each independently represent a hydrogen atom, an alkyl group having from 1 to 20 carbon atoms, a cycloalkyl group having from 3 to 20 carbon atoms, an alkenyl group having from 2 to 20 carbon atoms, or an aromatic group having from 6 to 20 carbon atoms.

In the general formula (2), $R^{15}$ preferably represents an alkyl group having from 1 to 20 carbon atoms, a cycloalkyl group having from 3 to 20 carbon atoms, or an aromatic group having from 6 to 20 carbon atoms, more preferably an alkyl group having from 1 to 12 carbon atoms, a cycloalkyl group having from 3 to 12 carbon atoms, or an aromatic group having from 6 to 18 carbon atoms, particularly preferably an alkyl group having from 1 to 6 carbon atoms, a cycloalkyl group having from 3 to 6 carbon atoms, or an aromatic group having from 6 to 12 carbon atoms, further particularly preferably a methyl group, an ethyl group, an isopropyl group, a cyclohexyl group or a phenyl group, and most preferably a methyl group, an isopropyl group or a phenyl group.

In the general formula (2), $R^{11}$ and $R^{13}$ each independently represent a hydrogen atom, an alkyl group having from 1 to 20 carbon atoms, or an aromatic group having from 6 to 20 carbon atoms, more preferably a hydrogen atom, an alkyl group having from 1 to 12 carbon atoms, a cycloalkyl group having from 3 to 12 carbon atoms, or an aryl group having from 6 to 12 carbon atoms, particularly preferably a hydrogen atom, an alkyl group having from 1 to 6 carbon atoms, a cycloalkyl group having from 3 to 6 carbon atoms, or a phenyl group, further particularly preferably a hydrogen atom, a methyl group, an ethyl group, a cyclohexyl group or a phenyl group, and most preferably a methyl group or a phenyl group.

In the general formula (2), it is preferred that $R^{11}$ represents an alkyl group having from 1 to 20 carbon atoms, a cycloalkyl group having from 3 to 20 carbon atoms, or an aromatic group having from 6 to 20 carbon atoms, and $R^{13}$ represents a hydrogen atom or an aromatic group having from 6 to 20 carbon atoms. It is more preferred that $R^{11}$ represents an alkyl group having from 1 to 12 carbon atoms, a cycloalkyl group having from 3 to 12 carbon atoms, or an aromatic group having from 6 to 12 carbon atoms, and $R^{13}$ represents a hydrogen atom or an aromatic group having from 6 to 12 carbon atoms. It is particularly preferred that $R^{11}$ represents an alkyl group having from 1 to 3 carbon atoms or a cyclohexyl group, and $R^{13}$ represents a hydrogen atom or a phenyl group. It is further particularly preferred that $R^{11}$ represents a methyl group, and $R^{13}$ represents a hydrogen atom or a phenyl group.

$R^{15}$ may further has a substituent. The substituent that may be substituted on $R^{15}$ is not particularly limited as far as the substituent does not impair the effects of the invention, and is preferably a halogen atom, an alkyl group, or an aromatic group, more preferably a halogen atom, an alkyl group having from 1 to 6 carbon atoms, or an aromatic group having from 6 to 12 carbon atoms, and particularly preferably a chlorine atom, a methyl group, or a phenyl group. In the case where $R^{15}$ is an alkyl group having from 1 to 20 carbon atoms, in particular, $R^{15}$ preferably has, as a substituent, an aromatic group, more preferably an aromatic group having from 6 to 12 carbon atoms, and particularly preferably a phenyl group. In the case where $R^{15}$ is an aromatic group having from 6 to 20 carbon atoms, in particular, $R^{15}$ preferably has, as a substituent, a halogen atom or an alkyl group having from 1 to 20 carbon atoms, more preferably a halogen atom, an alkyl group having from 1 to 6 carbon atoms, and particularly preferably a chlorine atom or a methyl group.

$R^{11}$ and $R^{13}$ each may further have a substituent. The substituent that may be substituted on $R^{11}$ is not particularly limited as far as the substituent does not impair the effects of the invention, and is preferably an aromatic group having from 6 to 12 carbon atoms, and more preferably a phenyl group.

Specific examples of the compound represented by the general formula (2) are shown below, but the compound is not limited to the specific examples.

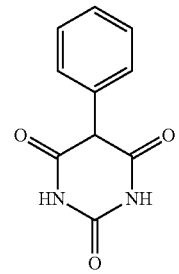

(2-1)

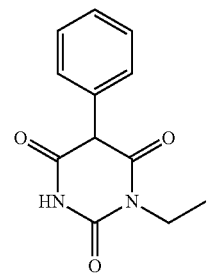

(2-2)

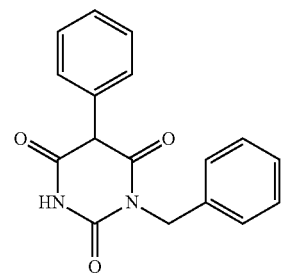

(2-3)

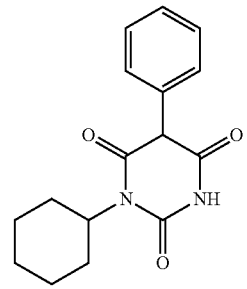

(2-4)

-continued (2-5)

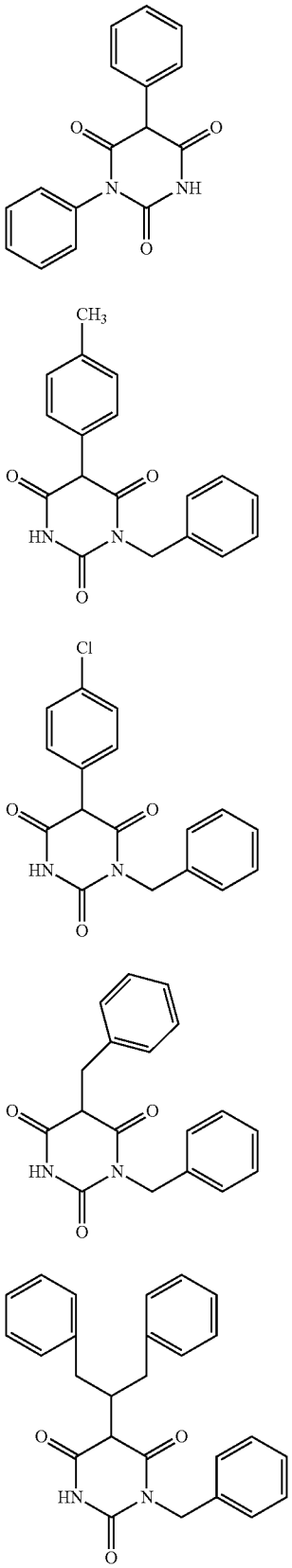

(2-6)

(2-7)

(2-8)

(2-9)

-continued (2-10)

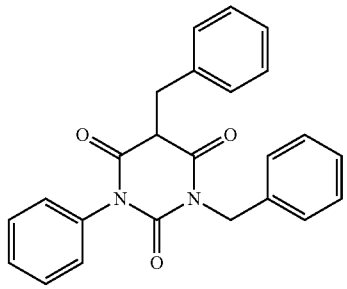

The compound represented by the general formula (2) may be a commercially available product, and may be synthesized according to a known method.

Amount Contained

In the optical film of the invention, the amount of the compound having a ratio of (molecular weight)/(number of aromatic groups) of 300 or less represented by the general formula (1) or (2) contained therein is preferably from 0.5 to 20% by mass, and more preferably from 1 to 20% by mass, based on the cellulose acylate. When the amount thereof contained is 0.5% by mass or more based on the cellulose acylate, the effect of enhancing the elastic modulus is liable to be obtained, and when the amount is 20% by mass or less based on the cellulose acylate, bleed out and oozing may be prevented from occurring in the formation of the cellulose acylate film.

The amount of the compound having a ratio of (molecular weight)/(number of aromatic groups) of 300 or less represented by the general formula (1) or (2) contained therein is particularly preferably from 1 to 15% by mass, and further particularly preferably from 1 to 10% by mass, based on the cellulose acylate.

UV Absorbent

The cellulose acylate film used in the invention preferably contains an UV absorbent along with the cellulose acylate as the major component. The UV absorbent may contribute to the improvement of the polarizer durability. The addition of the UV absorbent is particularly effective in an embodiment where the optical film of the invention is used as a surface protective film of an image display device.

The UV absorbent that may be used in the invention is not particularly limited, and any UV absorbent that has been used in a cellulose acylate may be used. Examples of the UV absorbent include the compounds described in JP-A-2006-184874. A polymer ultraviolet ray absorbent may also be preferably used, and the polymer ultraviolet ray absorbent described in JP-A-6-148430 may be preferably used.

The amount of the ultraviolet ray absorbent used is not determined unconditionally since the amount may vary depending on the kind of the ultraviolet ray absorbent, the use conditions and the like, and the ultraviolet ray absorbent is preferably contained in an amount of from 1 to 3% by mass based on the cellulose acylate as the major component.

Examples of the ultraviolet ray absorbent include one having the following structure, but the ultraviolet ray absorbent added is not limited thereto.

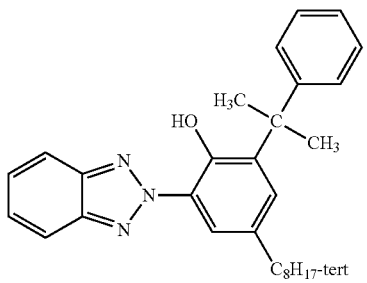

Other Additional Additive

The cellulose acylate film may further contain at least one kind of an additional additive in such a range that does not impair the advantageous effects of the invention. Examples of the additional additive include a polymer plasticizer except for the aromatic ester oligomer (for example, a phosphate ester plasticizer, a carboxylate ester plasticizer, a polycondensation oligomer plasticizer and the like), an improver for the retardation durability against humidity, and an antioxidant.

Improver for Retardation Durability Against Humidity

Examples of the compound that improve the retardation durability against humidity include the following compounds.

Compound Having Hydroxyl Group

Examples of the compound containing a hydroxyl group that is preferably used in the invention, which is preferably a compound containing a phenolic hydroxyl group, include the compound A described in JP-A-2008-89860, pp. 13-19, and the compound represented by the general formula (I) described in JP-A-2008-233530, pp. 7-9.

Compound Having Amino Group

The compound having an amino group that is preferably used in the invention is not particularly limited, and is preferably a compound represented by the following general formula (3) or (4):

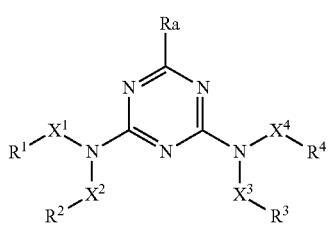

wherein in the general formula (3), Ra represents an alkyl group, an alkenyl group, an alkynyl group, a heterocyclic group or an aryl group; $X^1$, $X^2$, $X^3$ and $X^4$ each independently represent a single bond or a divalent linking group; and $R^1$, $R^2$, $R^3$ and $R^4$ each independently represent a hydrogen atom, an alkyl group, an alkenyl group, an alkynyl group, an aryl group, an acyl group or a heterocyclic group,

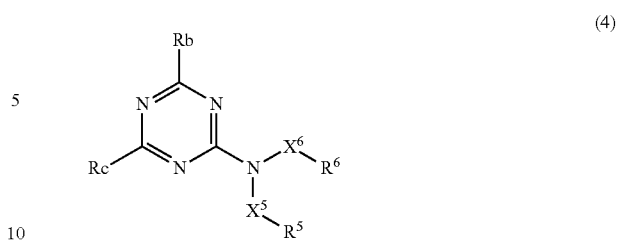

wherein in the general formula (4), Rb and Rc each independently represent an alkyl group, an alkenyl group, an alkynyl group, a heterocyclic group or an aryl group; $X^5$ and $X^6$ each independently represent a single bond or a divalent linking group; and $R^5$ and $R^6$ each independently represent a hydrogen atom, an alkyl group, an alkenyl group, an alkynyl group, an aryl group, an acyl group or a heterocyclic group.

$X^1$ to $X^6$ each represent a single bond or a divalent linking group and may be the same as or different from each other. The divalent linking group is preferably selected from the groups represented by the following formula (5):

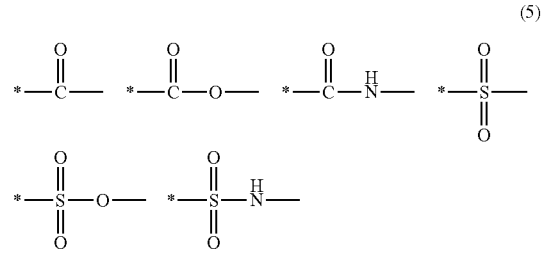

The compound having an amino group is preferably a compound having pyridine or pyrimidine as a basic skeleton and having an amino group as a substituent substituted on any of the substitutable positions on the basic skeleton, and is also preferably a compound represented by the following general formula (6):

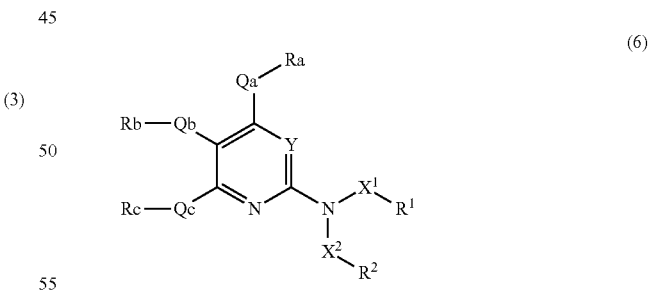

wherein in the general formula (6), Y represents a methine group or a nitrogen atom; Qa, Qb and Qc each independently represent a single bond or a divalent linking group; Ra, Rb and Rc each independently represent a hydrogen atom, a substituted or unsubstituted alkyl group, a substituted or unsubstituted alkenyl group, a substituted or unsubstituted alkynyl group, a substituted or unsubstituted aryl group, a cyano group, a halogen atom, a substituted or unsubstituted heterocyclic group, or —N(Rd)(Rd'), wherein Rd and Rd' each independently represent a hydrogen atom or a substituent, provided that Rd and Rd' may be bonded to each other to form a ring, and Ra and Rb may be bonded to each other to form a ring; $X^1$ represents a single bond or a divalent linking group selected from the divalent linking groups represented by the following general formula (L); $X^2$ represents a single bond or a divalent linking group; and $R^1$ and $R^2$ each independently represent a hydrogen atom, a substituted or unsubstituted alkyl group, a substituted or unsubstituted alkenyl group, a substituted or unsubstituted alkynyl group, a substituted or unsubstituted aryl group, or a substituted or unsubstituted heterocyclic group, provided that $R^1$ and $R^2$ may be bonded to each other to form a ring:

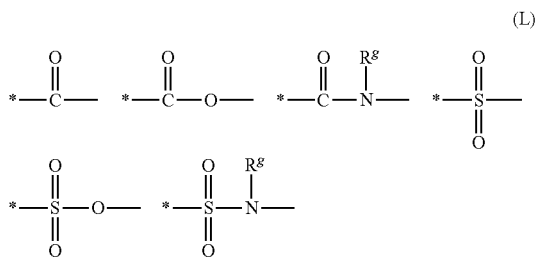

wherein in the general formula (L), * represents the position that is bonded to the nitrogen atom substituted on the nitrogen-containing aromatic ring in the compound represented by the general formula (6); and Rg represents a substituted or unsubstituted alkyl group, a substituted or unsubstituted alkenyl group, a substituted or unsubstituted alkynyl group, a substituted or unsubstituted aryl group, or a substituted or unsubstituted heterocyclic group.

Antioxidant

In the invention, a cellulose acylate solution may contain a known antioxidant, such as a phenol antioxidant and a hydroquinone antioxidant, e.g., 2,6-di-tert-butyl-4-methylphenol, 4,4'-thiobis(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl tetrakis(3-(3,5-di-tert-butyl-4-hydroxyphenyl)propionate) and 6-O-palmitoyl-L-ascorbic acid. Furthermore, a phosphorous antioxidant may be preferably contained, such as tris(4-methoxy-3,5-diphenyl)phosphite, tris(nonylphenyl)phosphite, tris(2,4-di-tert-butylphenyl) phosphite, bis(2,6-di-tert-butyl-4-methylphenyl) pentaerythritol diphosphite and bis(2,4-di-tert-butylphenyl) pentaerythritol diphosphite. The amount of the antioxidant added is preferably from 0.05 to 5.0 parts by mass per 100 parts by mass of the cellulose resin.

Production Method of Cellulose Acylate Film

The method for producing the cellulose acylate film of the invention is not particularly limited, and the optical film may be produced by any known method. Examples of the production method include a solution casting film forming method and a melt film forming method. For enhancing the surface property of the optical film, the cellulose acylate film is preferably produced by a solution casting film forming method. An example where the optical film is produced by a solution casting film forming method will be described below, but the invention is not limited to a solution casting film forming method. For producing the optical film by a melt casting method, any known method may be used.

Polymer Solution

In the solution casting film forming method, a polymer solution containing the cellulose acylate, the aromatic ester oligomer and the various additives depending on necessity (i.e., a cellulose acylate solution) is used for forming a web.

The polymer solution that may be used in the solution casting film forming method (which may be hereinafter referred to as a cellulose acylate solution) will be described below.

Solvent

The cellulose acylate used in the invention is dissolved in a solvent to form a dope, which is then cast on a substrate to form a film. It is necessary in this case to evaporate the solvent after extrusion or casting, a volatile solvent is preferably used.

The solvent is preferably such a solvent that does not undergo reaction with a reactive metal compound, a catalyst and the like, and does not dissolve the substrate for casting. Two or more kinds of solvents may be used in combination.

The cellulose acylate and a reactive metal compound capable of hydrolytic polycondensation may be dissolved in separate solvents respectively, and the resulting solution may be mixed with each other.

An organic solvent that has good solubility for the cellulose acylate is referred to as a good solvent, and a solvent that exhibits major effect of dissolution and is used in a large amount is referred to as the major (organic) solvent.

Examples of the good solvent include a ketone compound, such as acetone, methyl ethyl ketone, cyclopentanone and cyclohexanone, an ether compound, such as tetrahydrofuran (THF), 1,4-dioxane, 1,3-dioxolane and 1,2-dimethoxyethane, and an ester compound, such as methyl formate, ethyl formate, methyl acetate, ethyl acetate, amyl acetate and γ-butyrolactone, and also include methyl cellosolve, dimethylimidazolinone, dimethylformamide, dimethylacetamide, acetonitrile, dimethylsulfoxide, sulfolane, nitroethane, methylene chloride and methyl acetoacetate, and 1,3-dioxolane, THF, methyl ethyl ketone, acetone, methyl acetate and methylene chloride are preferred.

The dope preferably contains an alcohol having from 1 to 4 carbon atoms in an amount of from 1 to 40% by mass in addition to the organic solvent.

The alcohol may be used as a gelation solvent, in which after casting the dope on a metal support, the web (a dope film obtained by casting the dope of the cellulose acylate may be referred to as a web) is gelled by increasing the proportion of the alcohol due to evaporation of the solvent, thereby facilitating the release of the web from the metal support, and in the case where the proportion of the alcohol is small, the alcohol may accelerate the dissolution of the cellulose acylate in a non-chlorine organic solvent, and also suppresses a reactive metal compound from being gelled, deposited and increased in viscosity.

Examples of the alcohol having from 1 to 4 carbon atoms include methanol, ethanol, n-propanol, isopropanol, n-butanol, sec-butanol, tert-butanol and propylene glycol monomethyl ether.

Among these, methanol and ethanol are preferred since they have a relatively low boiling point and good drying property, and have no toxicity. Ethanol is most preferred. This kind of organic solvents has no dissolution power to the cellulose acylate by itself and thus is referred to as a poor solvent.

The cellulose acylate as a raw material of the cellulose acylate in the invention contains a hydrogen bonding functional group, such as a hydroxyl group, an ester group and a ketone group, and thus the alcohol is preferably contained in the total solvent in an amount of from 5 to 30% by mass, more preferably from 7 to 25% by mass, and further preferably from 10 to 20% by mass, for reducing the releasing load from the casting support.

In the invention, water may be contained in a small amount, which is effective for enhancing the viscosity of the solution and the wet web strength on drying, and for enhancing the dope strength on drum casting. For example, water may be contained in an amount of from 0.1 to 5% by mass, preferably from 0.1 to 3% by mass, and particularly preferably from 0.2 to 2% by mass.

Preferred examples of the combination of organic solvents used as the solvent for the polymer solution in the invention include those described in JP-A-2009-262551.

A non-halogen organic solvent may be used as the major solvent depending on necessity, the details of which are described in JIII Journal of Technical Disclosure Monthly, 2001-1745, Mar. 15, 2001.

The concentration of the cellulose acylate in the polymer solution in the invention is preferably from 5 to 40% by mass, more preferably from 10 to 30% by mass, and most preferably from 15 to 30% by mass.

The concentration of the cellulose acylate may be controlled to the prescribed concentration in the stage where the cellulose acylate is dissolved in the solvent. Alternatively, a solution having a low concentration (for example, from 4 to 14% by mass) may be prepared in advance and then concentrated by evaporating the solvent. A solution having a high concentration may be prepared in advance and the diluted. The concentration of the cellulose acylate may be lowered by adding the additive.

The stage where the additive is added may be appropriately determined depending on the kind of the additive. For example, an aromatic ester oligomer and a UV absorbent may be dissolved in an organic solvent, such as an alcohol, e.g., methanol, ethanol and butanol, methylene chloride, methyl acetate, acetone and dioxolane, or a mixed solvent thereof, and then added to the dope, or may be added directly to the dope. A material that is not dissolved in an organic solvent, such as an inorganic powder material, may be dispersed in an organic solvent and the cellulose acylate with a dissolver or a sand mill, and then added to the dope.

Examples of the solvent that is most suitable for dissolving the cellulose acylate in a high concentration include a mixed solvent of methylene chloride and ethyl alcohol in a ratio of from 95/5 to 80/20, and a mixed solvent of methyl acetate and ethyl alcohol in a ratio of from 60/40 to 95/5.

(1) Dissolving Step

In this step, the cellulose acylate and the additive are dissolved in an organic solvent mainly containing a good solvent in a dissolving tank to form a dope, or the cellulose acylate solution and the additive solution are mixed to form a dope.

Examples of the method for dissolving the cellulose acylate include a method of dissolving under ordinary pressure, a method of dissolving at a temperature lower than the boiling point of the major solvent, a method of dissolving under pressure at a temperature higher than the boiling point of the major solvent, a cooling dissolving method described in JP-A-9-95544, JP-A-9-95557 and JP-A-9-95538, and a method of dissolving under high pressure described in JP-A-11-21379, and a method of dissolving under pressure at a temperature higher than the boiling point of the major solvent is preferably employed.

The concentration of the cellulose acylate in the dope is preferably from 10 to 35% by mass. After the additive is added, dissolved and dispersed in the dope after or during the dissolution of the cellulose ester, the dope is preferably filtered with a filter, deaerated and then fed to the next step with a liquid feed pump.

(2) Casting Step

In this step, the dope is fed to a pressure die with a liquid feed pump (such as a pressure metering pump) and cast through the slit of the pressure die onto a casting position of a metal support, such as an endlessly running endless metal belt, e.g., a stainless steel belt, or a rotating metal drum.

The pressure die preferably has at the top thereof a slit capable of being adjusted in the shape thereof for controlling the film thickness uniformly. Examples of the pressure die include a coat hanger die and a T-die, any of which may be preferably used. The metal support has a mirror surface. For enhancing the film forming speed, two or more pressure dies may be provided on the metal support, to which the amount of the dope is distributed, and plural dope films may be laminated. Alternatively, a film having a laminate structure is preferably obtained by a co-casting method, in which plural dopes are cast simultaneously.

(3) Solvent Evaporating Step

In this step, the web (which is a precursor of the cellulose acylate film and contains a large amount of the solvent) is heated on the metal support, thereby evaporating the solvent to such an extent that the web is capable of being released from the metal support.

For evaporating the solvent, such a method may be employed as a method of blowing air from the side of the web, a method of conducting heat with a liquid from the back surface of the metal support, a method of conducting heat by radiation on both the front and back surface thereof, and the like, and/or a method of conducting heat with a liquid from the back surface is preferred due to the good drying efficiency obtained thereby. Combinations of these methods may also be preferably employed. In the method of conducting heat with a liquid from the back surface, the metal support is preferably heated to a temperature that is lower than the boiling point of the major solvent of the organic solvents used in the dope or the boiling point of the organic solvent having the lowest boiling point therein.

(4) Releasing Step

In this step, the web, from which the solvent has been evaporated on the metal support, is released therefrom at a releasing position. The web thus released is sent to the next step. When the residual solvent amount (see the expression below) of the web on releasing is too large, it may be difficult to release the web, and when the web has been dried excessively on the metal support, the web may be broken partly on releasing.

A gel casting method may be employed as a method of enhancing the film forming speed (the film forming speed may be increased by releasing at a large residual solvent amount as much as possible). Examples of the gel casting method include a method of adding a poor solvent to the cellulose acylate to the dope, and gelling the dope after casting the dope, and a method of gelling the dope by decreasing the temperature of the metal support. The dope film may be increased in strength by gelling on the metal support, thereby facilitating the release and increasing the film forming speed.

The residual solvent amount on releasing the web from the metal support is preferably in a range of from 5 to 150% by mass while depending on the strength of the drying condition, the length of the metal support and the like, and in the case where the web is released at a larger residual solvent amount, the residual solvent amount on releasing may be determined in consideration of the economical speed and the quality. In the invention, the temperature of the metal support at the releasing position is preferably from −50 to 40° C., more preferably from 10 to 40° C., and most preferably from 15 to 30° C.

The residual solvent amount of the web at the releasing position is preferably from 10 to 150% by mass, and more preferably from 10 to 120% by mass.

The residual solvent amount is expressed by the following expression.

$$\text{residual solvent amount (\% by mass)} = ((M-N)/N) \times 100$$

wherein M represents the mass of the web at an arbitrary time point, and N represents the mass of the web having the mass M that has been dried at 110° C. for 3 hours.

(5) Drying or Heat-Treating Step and Stretching Step

After the releasing step, the web is preferably dried with a drying device, in which the web is passed through plural rolls alternately, and/or a tenter device, in which the web is conveyed with both ends thereof held with a clip.

In the case where the web is heat-treated in the invention, the heat treatment temperature may be less than (Tg −5° C.), preferably (Tg −20° C.) or more and less than (Tg −5° C.), and more preferably (Tg −15° C.) or more and less than (Tg −5° C.)

The heat treatment time is preferably 30 minutes or less, more preferably 20 minutes or less, and particularly preferably approximately 10 minutes.

The measure for drying and heat-treating the web may be generally hot air blown on the web, or may be microwave applied thereto instead of hot air. The temperature, the air flow amount and the time may vary depending on the solvent used, and the conditions may be appropriately selected depending on the kind and the combination of the solvent.

The web may be stretched in any one direction of the machine direction (MD) and the transversal direction (TD) or may be biaxially stretched in both the directions. The web is preferably biaxially stretched. The stretching may be performed by a single step or multiple steps. The tensile elastic modulus may be controlled to the aforementioned range by controlling the kind of the cellulose acylate and the acylation degree thereof, and selecting the additives and controlling the proportions thereof.

The stretching ratio in MD, i.e., the film conveying direction, is preferably from 0 to 20%, more preferably from 0 to 15%, and particularly preferably from 0 to 10%. The stretching ratio (i.e., elongation) of the web on stretching may be achieved by the difference in circumferential speed between the metal support and the releasing speed (e.g., the drawing speed of releasing roll). For example, in the case where an equipment having two nip rolls is used, the rotation speed of the nip roll on the side of outlet is rendered larger than the rotation speed of the nip roll on the side of inlet, thereby stretching the film favorably in the conveying direction, i.e., MD. The tensile elastic modulus in MD may be controlled by performing the stretching.

The stretching ratio (%) referred herein means a value defined by the following expression.

$$\text{stretching ratio (\%)} = 100 \times ((\text{length after stretching}) - (\text{length before stretching}))/(\text{length before stretching})$$

The stretching ratio in TD, i.e., the direction perpendicular to the film conveying direction, is preferably from 0 to 30%, more preferably from 1 to 20%, and particularly preferably from 2.0 to 15%.

In the invention, the web is preferably stretched in TD, i.e., the direction perpendicular to the film conveying direction, with a tenter device.

In the biaxial stretching, the web may be relaxed, for example, by from 0.8 to 1.0 time in MD to provide a desired retardation value. The stretching ratio may be determined depending on the target optical characteristics. The cellulose acylate film may be uniaxially stretched in MD in production.

The temperature on stretching is preferably Tg or less, thereby increasing the tensile elastic modulus in the stretching direction. The stretching temperature is preferably from (Tg −50° C.) to Tg, and more preferably from (Tg −30° C.) to (Tg −5° C.). When the web is stretched at a temperature within the range, there is a tendency that the tensile elastic modulus in the stretching direction is increased, whereas the tensile elastic modulus in the direction perpendicular thereto is decreased. Accordingly, for increasing the tensile elastic modulus in both MD and TD, the web is preferably stretched in both the directions, i.e., biaxially stretched, at a temperature within the range.

The web may be dried after stretching. In the case where the web is dried after the stretching step, the drying temperature, the drying air flow amount and the drying time may vary depending on the solvent used, and the drying condition may be appropriately selected depending on the kind of the solvent and the combination thereof. In the invention, the drying temperature after the stretching step is preferably lower than the stretching temperature in the stretching step for increasing the front contrast on installing the film in a liquid crystal display device.

(6) Winding Step

The thus resulting film is preferably wound in a length of from 100 to 10,000 m, more preferably from 500 to 7,000 m, and further preferably from 1,000 to 6,000 m, per roll. The width of the film is preferably from 0.5 to 5.0 m, more preferably from 1.0 to 3.0 m, and further preferably from 1.0 to 2.5 m. On winding the film, the film is preferably subjected to knurling on at least one edge thereof, and the knurling preferably has a width of from 3 to 50 mm, and more preferably from 5 to 30 mm, and a height of from 0.5 to 500 µm, and more preferably from 1 to 200 µm. The knurling may be single wheel knurling or double wheel knurling.

The thus obtained web is wound to complete the cellulose acylate film.

Cellulose Acylate Film in Roll Form

The cellulose acylate film used in the invention may be a cellulose acylate film in a roll form, which is obtained by winding the long cellulose acylate film into a roll. The optical film of the invention that is produced in the form of a roll has good appearance even though the cellulose acylate film has a thickness of from 15 to 45 µm, and the cellulose acylate film used in the invention that is produced in the form of a roll also has a good appearance.

The enhancement of the appearance of the film may suppress the film from being deformed, and reduces the unevenness on installing the film in a polarizing plate. As a result, a liquid crystal display device that has the film installed therein may be reduced in display unevenness.

Layer Structure

The cellulose acylate film used in the invention may be a single layer film or may have a laminated layer structure including two or more layers. For example, the cellulose acylate film preferably has a laminated layer structure containing two layers, a core layer and an outer layer (which may also be referred to as a surface layer or a skin layer), or a laminated layer structure containing three layers, an outer layer, a core layer and an outer layer. The laminated layer structure is preferably produced by co-casting.

In the case where the cellulose acylate film used in the invention has a laminated layer structure containing two or more layers, the outer layer preferably contains a matting agent. Examples of the matting agent used include those described in JP-A-2011-127045, and for example, silica particles having an average particle size of 20 nm may be used.

Thickness of Cellulose Acylate Film

The thickness of the cellulose acylate film is from 15 to 45 μm, preferably from 15 to 35 μm, and more preferably from 15 to 30 μm.

Optical Characteristics of Cellulose Acylate Film

The cellulose acylate film satisfies the following expression (1) and thus is free of display unevenness on installing the film in a liquid crystal display device.

$$|Rth(590)| \leq 50 \text{ nm} \tag{1}$$

wherein in the expression (1), Rth(590) represents a retardation in a thickness direction at a wavelength of 590 nm.

The value of |Rth(590)| is preferably 30 nm or less, and more preferably 20 nm or less.

The cellulose acylate film preferably satisfies the following expression (2) from the standpoint of the improvement of the display unevenness on installing the film in a liquid crystal display device.

$$|Re(590)| \leq 5 \text{ nm} \tag{2}$$

wherein in the expression (2), Re(590) represents a retardation in an in-plane direction at a wavelength of 590 nm.

The value of |Re(590)| is preferably 3 nm or less, more preferably 2 nm or less, and particularly preferably 1 nm or less.

The values of Re(λ) and Rth(λ) herein mean the in-plane retardation and the retardation in thickness direction, respectively, at a wavelength λ. The wavelength λ herein is 590 nm unless otherwise indicated. Re(λ) may be measured with KOBRA 21ADH (available from Oji Scientific Instruments Co., Ltd.) by making light having a wavelength of λ nm incident in the normal line direction of the film. Rth(λ) may be obtained in such a manner that Re(λ) is measured for 6 points by making light having a wavelength of λ nm incident at angles of from the normal line direction to 50° for each ends with a step of 10° with the in-plane retardation axis being the tilting axis (rotation axis) (when there is no retardation axis, an arbitrary direction within the plane of the film is designated as the rotation axis), and Rth (λ) is calculated with KOBRA 21ADH based on the retardation values thus measured, the assumed value of the average refractive index and the thickness of the film thus input. Rth(λ) may also be obtained in such a manner that retardation values are measured in arbitrary two directions with the retardation axis being the tilting axis (rotation axis) (when there is no retardation axis, an arbitrary direction within the plane of the film is designated as the rotation axis), and Rth is calculated from the following expressions (A) and (B) based on the retardation values thus measured, the assumed value of the average refractive index and the thickness of the film thus input. The assumed value of the average refractive index used herein may be values shown in Polymer Handbook (John Wiley & Sons, Inc.) and catalogs of various optical films. For a film with no known average refractive index, the refractive index thereof may be measured with an Abbe refractometer. The average refractive indices of major optical films are shown below: cellulose acylate (1.48), cycloolefin polymer (1.52), polycarbonate (1.59), polymethyl methacrylate (1.49) and polystyrene (1.59). KOBRA 21ADH calculates nx, ny and nz based on the assumed value of the average refractive index and the thickness of the film thus input, and based on nx, ny and nz, Nz=(nx−nz)/(nx−ny) is further calculated.

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left(\sin^{-1}\left(\frac{\sin(-\theta)}{nx}\right)\right)} \tag{A}$$

wherein Re(θ) represents the retardation value in the direction that is tilted from the normal line direction by an angle θ, nx, ny and nz represent the refractive indices of the index ellipsoid in the main axis azimuths respectively, and d represents the thickness of the film.

$$Rth = ((nx+ny)/2 - nz) \times d \tag{B}$$

In the calculation, the average refractive index n is required as a parameter, and a value measured with an Abbe refractometer (Abbe Refractometer 2-T, produced by Atago Co., Ltd.) is used therefor.

Functional Layer

The optical film of the invention preferably has a functional layer on at least one surface of the cellulose acylate film. Examples of the functional layer include a patterned retardation layer for displaying a 3D image, a hard coat layer, an antireflection layer, an antiglare layer, an antistatic layer, an optically anisotropic layer, and a low moisture permeation layer. The functional layers may be used solely or as a combination thereof. An embodiment that contains a patterned retardation layer for displaying a 3D image having formed thereon a hard coat layer is preferred.

The antireflection layer, the antiglare layer and the low moisture permeation layer may also have a function of the hard coat layer.

Patterned Retardation Layer

An optically anisotropic layer described in Japanese Patent No. 4,887,463 may be used.

Shapes of First Region and Second Region

The optical film of the invention may have a patterned retardation layer that contains a first retardation region (which may be hereinafter referred simply to a first region) and a second retardation region (which may be hereinafter referred simply to a second region) having different birefringence, in which the first retardation region and the second retardation region are patterned alternately by one line. It is preferred that the first region and the second region are in the form of strips with the short edges thereof having the substantially same length, and are patterned alternately repeatedly, from the standpoint of the use of the optical film in a 3D stereoscopic image display system.

In the optical film of the invention, the slow axis of the first region and the slow axis of the second region are preferably substantially perpendicular to each other from the standpoint that on displaying a 3D image, the polarization state of the light passing through the first region and the second region is changed from linear polarization to circular polarization or from circular polarization to linear polarization.

In the optical film of the invention, the slow axis of the first region and the slow axis of the second region are more preferably perpendicular to each other from the standpoint that on displaying a 3D image, the polarization state of the light passing through the first region and the second region is changed from linear polarization to circular polarization or from circular polarization to linear polarization without elliptical polarization.

In the optical film of the invention, the direction of the long edge of the pattern and the direction where the sonic velocity of the support is maximum are preferably substantially perpendicular to each other from the standpoint that the displacement of the patterned region and the pixels is reduced to suppress the crosstalk.

Retardation

The patterned retardation layer that has a function of converting from linear polarization to circular polarization or from circular polarization to linear polarization preferably has a retardation of ¼ of the wavelength. It is generally referred to as a quarter wavelength plate, in which the ideal value of Re is 137.5 nm at a wavelength of 550 nm of visible light.

The patterned retardation layer that has a function of converting from linear polarization to circular polarization or from circular polarization to linear polarization is not limited to that having a retardation of ¼ of the wavelength. For example, one having a retardation of −¼ or ¾ of the wavelength may be used, and as shown with a general expression, one having a retardation of ¼±n/2 (wherein n represents an integer) may be used.

The patterning having the slow axis of the first region and the slow axis of the second region that are perpendicular to each other may be formed of regions having retardations of −¼ and ¼ of the wavelength formed alternately. In this case, the slow axes of the regions are substantially perpendicular to each other. The regions having retardations of ¼ and ¾ of the wavelength may be patterned, and in this case, the slow axes of the regions are substantially in parallel to each other, but the rotation directions of circular polarized light of the regions are opposite to each other.

In the patterning of regions having retardations of ¼ and ¾ of the wavelength, such a method may be employed that a region having a retardation of ¼ of the wavelength is formed on the entire surface, and a region having a retardation of ½ or −½ of the wavelength is then formed.

In the case where the optical film of the invention has a retardation of ¼ of the wavelength, the Re(550) value of the first region contained in the optical film and the Re(550) value of the second region contained in the optical film each are preferably from 30 to 250 nm, more preferably from 50 to 230 nm, particularly preferably from 100 to 200 nm, further particularly preferably from 105 to 180 nm, and still further particularly preferably from 115 to 160 nm, and still more further particularly preferably from 130 to 150 nm.

From the standpoint that on displaying a 3D image, the polarization state of the light passing through the first region and the second region is changed from linear polarization to circular polarization or from circular polarization to linear polarization, the total Re(550) of the patterned retardation layer and the support is preferably from 110 to 165 nm, more preferably from 110 to 155 nm, and further preferably from 120 to 145 nm. It is particularly preferred that the total Re(550) of the patterned retardation layer and the support is in the aforementioned range, and the slow axes of the first region and the second region are substantially perpendicular to each other, from the standpoint that the polarization states of the image for the right eye and the image for the left eye are differentiated from each other with high accuracy.

Hard Coat Layer

The hard coat layer preferably has a thickness of from 0.1 to 6 μm, and more preferably from 3 to 6 μm. The hard coat layer that is as thin as in the range may provide an optical film containing the hard coat layer that is improved in the physical properties, such as brittleness and prevention of curling, the lightweight property, the production cost, and the like. In the case where the base film is a cellulose acylate having a large elastic modulus, the pencil hardness may be considerably enhanced by using the elastic modulus within the aforementioned particular range.

The hard coat layer used in the invention is a layer that is used for imparting hardness and scratch resistance to the film. The hard coat layer may be formed, for example, by coating a coating composition on the base film (cellulose acylate film), followed by curing.

By providing the hard coat layer on the optical film of the invention, the Knoop hardness measured on the side where the hard coat layer is provided may be enhanced by a range of from 20 to 100 N/mm$^2$ from the surface of the optical film having no hard coat layer or the optical film, from which the hard coat layer is completely removed. The Knoop hardness may also be enhanced by providing an antiglare layer. When the antiglare layer is provided on the optical film of the invention, the Knoop hardness measured on the side where the antiglare layer is provided may be enhanced by a range of from 10 to 100 N/mm$^2$ from the surface of the optical film having no antiglare layer or the optical film, from which the antiglare layer is completely removed.

Another functional layer may be laminated on the hard coat layer for the purpose of imparting another function. A filler or an additive may be added to the hard coat layer, and thereby physical functions, such as mechanical, electric and optical functions, and chemical functions, such as water repellency and oil repellency, may be imparted to the hard coat layer itself.

The hard coat layer is preferably formed by curing a curable composition. The curable composition is preferably prepared in the form of a coating composition in the form of liquid. Examples of the coating composition include one containing a binder monomer or oligomer for forming a matrix, a polymer, and an organic solvent. The coating composition may be coated and then cured, thereby forming the hard coat layer. The curing may be performed by utilizing crosslinking reaction or polymerization reaction.

Binder Monomer or Oligomer for Forming Matrix

Examples of the binder monomer or oligomer for forming a matrix include a polyfunctional monomer and a polyfunctional oligomer that have ionization radiation-curable property. The polyfunctional monomer and the polyfunctional oligomer are preferably formed of a monomer capable of undergoing crosslinking reaction or polymerization reaction. The functional group contained in the ionization radiation-curable polyfunctional monomer and polyfunctional oligomer is preferably a photopolymerizable, electron beam-polymerizable or radiation-polymerizable functional group, and is more preferably a photopolymerizable functional group among these.

Examples of the photopolymerizable functional group include an unsaturated polymerizable functional group, such as a (meth)acryloyl group, a vinyl group, a styryl group and an allyl group, and a ring-opening polymerization type polymerizable functional group, such as an epoxy group, and among these, a (meth)acryloyl group is preferred.

Specific examples of the photopolymerizable polyfunctional monomer having a photopolymerizable functional group include:

a (meth)acrylate diester of an alkylene glycol, such as neopentyl glycol diacrylate, 1,6-hexanediol di(meth)acrylate and propylene glycol di(meth)acrylate;

a (meth)acrylate diester of a polyoxyalkylene glycol, such as triethylene glycol di(meth)acrylate, dipropylene glycol di(meth)acrylate, polyethylene glycol di(meth)acrylate and polypropylene glycol di(meth)acrylate;

a (meth)acrylate diester of a polyhydric alcohol, such as pentaerythritol di(meth)acrylate; and a (meth)acrylate diester of an ethylene oxide adduct or a propylene oxide adduct, such as 2,2-bis(4-(acryloxydiethoxy)phenyl)propane and 2,2-bis(4-(acryloxypolypropoxy)phenyl)propane.

Further preferred examples of the photopolymerizable polyfunctional monomer include a urethane(meth)acrylate compound, a polyester(meth)acrylate compound, an isocyanuric acid acrylate compound and an epoxy (meth)acrylate compound.

Among these, an ester of a polyhydric alcohol and (meth)acrylic acid is preferred, and a polyfunctional monomer having three or more (meth)acryloyl groups in one molecule is more preferred.

Specific examples thereof include (di)pentaerythritol tri(meth)acrylate, (di)pentaerythritol tetra(meth)acrylate, (di)pentaerythritol penta(meth)acrylate, (di)pentaerythritol hexa(meth)acrylate, tripentaerythritol triacrylate, tripentaerythritol hexatriacrylate, trimethylolpropane tri(meth)acrylate, trimethylolethane tri(meth)acrylate, ditrimethylolpropane tetra(meth)acrylate, EO-modified trimethylolpropane tri(meth)acrylate, PO-modified trimethylolpropane tri(meth)acrylate, EO-modified phosphoric acid tri(meth)acrylate, 1,2,4-cyclohexane tetra(meth)acrylate, pentaglycerol triacrylate, 1,2,3-cyclohexane tetramethacrylate, polyester polyacrylate and caprolactone-modified tris(acryloxyethyl) isocyanurate.

In the description herein, the expressions "(meth)acrylate", "(meth)acrylic acid", and "(meth)acryloyl" mean "acrylate or methacrylate", "acrylic acid or methacrylic acid", and "acryloyl or methacryloyl", respectively.

Examples thereof also include a resin having three or more (meth)acryloyl groups, such as a polyester resin having a relatively small molecular weight, a polyether resin, an acrylic resin, an epoxy resin, a urethane resin, an alkyd resin, a spiroacetal resin, a polybutadiene resin, a polythiolpolyene resin, and an oligomer or prepolymer of a polyfunctional compound, such as a polyhydric alcohol.

For specific examples of the polyfunctional acrylate compound having three or more (meth)acryloyl groups, reference may be made to paragraph (0096) of JP-A-2007-256844 and the like.

Examples of the urethane acrylate compound include a urethane acrylate compound that is obtained in such a manner that a hydroxyl group-containing compound, such as an alcohol, a polyol and/or a hydroxyl group-containing acrylate, and an isocyanate compound are reacted, and depending on necessity, the polyurethane compound obtained through the reaction is esterified with (meth)acrylic acid.

For specific examples of the compound, reference may be made to paragraph (0017) of JP-A-2007-256844 and the like.

An isocyanuric acid acrylate is preferably used since the film may be suppressed from being curled. Examples thereof include an isocyanuric acid diacrylate compound and an isocyanuric acid triacrylate compound, and for specific examples of the compound, reference may be made to paragraphs (0018) to (0021) of JP-A-2007-256844.

An epoxy compound may be used in the hard coat layer for reducing the contraction due to curing. As a monomer having an epoxy group used for the purpose, a monomer having two or more epoxy groups in one molecule may be used, and examples thereof include the epoxy monomers described in JP-A-2004-264563, JP-A-2004-264564, JP-A-2005-37737, JP-A-2005-37738, JP-A-2005-140862, JP-A-2005-140862, JP-A-2005-140863, JP-A-2002-322430 and the like. A compound having both epoxy and acrylic functional groups, such as glycidyl (meth)acrylate, is also preferably used.

Polymer Compound

The hard coat layer may contain a polymer compound. For the description and preferred examples of the polymer compound, reference may be made to JP-A-2012-215812, which is incorporated here by reference.

Curable Composition

For the description and preferred examples of the curable composition capable of being used for forming the hard coat layer, reference may be made to JP-A-2012-215812, which is incorporated here by reference.

High Hardness Hard Coat Layer

In the case where a high hardness hard coat layer is demanded as the hard coat layer in the invention, reference may be made to paragraphs (0012) to (0057) of JP-A-2012-252275, paragraphs (0010) to (0043) of WO 2012/043341A1 and the like.

Property of Hard Coat Layer

The hard coat layer preferably has excellent scratch resistance. Specifically, the hard coat layer preferably achieves 3H or higher in the pencil hardness test, which is a standard test method for scratch resistance.

Antiglare Layer

An antiglare layer may be formed for such purposes as antiglare property due to surface scattering, and preferably hard coat property for enhancing the hardness and the scratch resistance of the film.

The antiglare layer capable of being used in the invention may contain a binder and translucent particles for imparting antiglare property, and preferably has surface irregularity formed with protrusions of the translucent particles themselves or protrusions formed by aggregates of plural particles.

The use of the antiglare layer having hard coat property may avoid the necessity of forming a hard coat layer separately.

Preferred specific examples of the translucent particles include inorganic particles, such as silica particles and $TiO_2$ particles; and resin particles, such as acrylic particles, crosslinked acrylic particles, polystyrene particles, crosslinked styrene particles, melamine resin particles and benzoguanamine resin particles. Among these, crosslinked styrene particles, crosslinked acrylic particles and silica particles are preferred.

The shape of the translucent particles may be any of a spherical shape and an irregular shape.

The refractive index of the binder is preferably regulated in consideration of the refractive index of the translucent particles selected from the aforementioned particles, from the standpoint of the control of the internal haze and the surface haze. Examples of the binder that is selected in consideration of the translucent particles include a combination of a binder containing a trifunctional or higher functional (meth)acrylate monomer as the major component (having a refractive index of from 1.55 to 1.70 after curing) and one or both kinds of translucent particles formed of a crosslinked poly(styrene-acrylate) polymer having a styrene content of from 50 to 100% by mass and benzoguanamine particles, and preferred examples thereof include a combination of the binder and translucent particles formed of a crosslinked poly(styrene-acrylate) polymer having a styrene content of from 50 to 100% by mass (having a refractive index of from 1.54 to 1.59).

In view of the aforementioned standpoint, the absolute value of the difference between the refractive index of the binder and the refractive index of the translucent particles is preferably 0.04 or less. The absolute value of the difference between the refractive index of the binder and the refractive index of the translucent particles is more preferably 0.030 or less, further preferably 0.020 or less, and still further preferably 0.015 or less.

The refractive index of the binder may be measured directly with an Abbe refractometer or may be quantitatively evaluated by the measurement of the spectral reflectance spectrum or the spectral ellipsometry. The refractive index of the translucent particles may be measured in such a manner that the same amounts of the translucent particles are dispersed in mixed solvents containing two kinds of solvents having different refractive indices with different mixing ratios, the dispersions are measured for turbidity, and the mixed solvent that provides the minimum turbidity is measured for refractive index with an Abbe refractometer.

The content of the translucent particles is preferably from 3 to 30% by mass, and more preferably from 5 to 20% by mass, based on the total solid content in the antiglare layer formed, from the standpoint of the antiglare property and the like.

Two or more kinds of the translucent particles having different particle diameters may be used. The translucent particles having the larger particle diameter may provide antiglare property, and the translucent particles having the smaller particle diameter may provide other optical characteristics.

Such an embodiment is also preferred in the invention that a smectite clay-organic composite obtained through intercalation of smectite clay with a quaternary ammonium salt is utilized for controlling the agglomeration property of the translucent particles. The content of the smectite clay-organic composite is preferably from 0.2 to 8.0% by mass, more preferably from 0.3 to 4.0% by mass, further preferably from 0.4 to 3.0% by mass, and particularly preferably from 0.5 to 2.0% by mass, based on the total solid content of the antiglare layer formed.

The quaternary ammonium salt is preferably a quaternary ammonium salt represented by the following general formula (201):

$$((R^{201})_3(R^{202})N)^+ \cdot X^- \qquad (201)$$

wherein in the general formula (201), $R^{201}$ and $R^{202}$ are different from each other, $R^{201}$ represents an alkyl group, an alkenyl group, or an alkynyl group, each having from 4 to 24 carbon atoms, $R^{202}$ represents an alkyl group, an alkenyl group, or an alkynyl group, each having from 1 to 10 carbon atoms, and $X^-$ represents an anion.

Examples of the quaternary ammonium ion represented by the general formula (201) include trioctylmethylammonium ion, tristearylethylammonium ion, trioctylethylammonium ion, tristearylmethylammonium ion, tridecylhexylammonium ion and tritetradecylpropylammonium ion, and preferred examples among these include trioctylmethylammonium ion and tristearylethylammonium ion.

In the general formula (201), $X^-$ represents an anion. Examples of the anion include $Cl^-$, $OH^-$ and $NO_3^-$, and preferred examples thereof include $Cl^-$.

Examples of the commercially available product of the smectite clay-organic composite include Lucentite SAN, Lucentite STN, Lucentite SEN and Lucentite SPN (all produced by Co-op Chemical Co., Ltd.), which may be used solely or as a combination of two or more kinds thereof.

The thickness of the antiglare layer in the invention is preferably from 0.5 to 50 μm, more preferably from 1 to 35 μm, and further preferably from 1 to 25 μm.

The centerline average roughness ($Ra_{75}$) of the antiglare layer in the invention is preferably in a range of from 0.10 to 0.40 μm.

The strength of the antiglare layer is preferably 3H or more in terms of pencil hardness.

Examples of the known method for forming the antiglare layer include the method described in claim 22 of JP-A-6-16851, in which the antiglare layer is formed by laminating a molding film in the form of a mat having minute irregularity on the surface thereof; the method described in claim 10 of JP-A-2000-206317, in which the antiglare layer is formed through curing contraction of an ionization radiation-curable resin due to the difference in radiation amount of the ionization radiation; the method described in claim 6 of JP-A-2000-338310, in which translucent fine particles and a translucent resin are solidified while gelling by reducing the weight ratio of the good solvent for the translucent resin by drying, thereby forming irregularity on the surface of the coated film; and the method described in claim 8 of JP-A-2000-275404, in which surface irregularity is formed with an external pressure.

High Refractive Index Layer, Medium Refractive Index Layer and Low Refractive Index Layer A high refractive index layer preferably has a refractive index of from 1.70 to 1.74, and more preferably from 1.71 to 1.73. A medium refractive index layer may have a refractive index that is controlled between a refractive index of a low refractive index layer and the refractive index of the high refractive index layer. The refractive index of the medium refractive index layer is preferably from 1.60 to 1.64, and more preferably from 1.61 to 1.63. A low refractive index layer preferably has a refractive index of from 1.30 to 1.47. In a multilayer thin film interference anti-reflection film (containing a medium refractive index layer, a high refractive index layer and a low refractive index layer in this order), the refractive index of the low refractive index layer is preferably from 1.33 to 1.38, and more preferably from 1.35 to 1.37.

Examples of the formation method of the high refractive index layer, the medium refractive index layer and the low refractive index layer include a chemical vapor deposition (CVD) method and a physical vapor deposition (PVD) method. A transparent film of an inorganic oxide formed by a vacuum vapor deposition method or a sputtering method, which is one of the physical vapor deposition method, may be used, but the formation method is preferably a method of wet coating in all the process steps.

Examples of the high refractive index layer, the medium refractive index layer and the low refractive index layer used herein include those described in paragraphs (0197) to (0211) of JP-A-2009-98658.

These layers are preferably formed on the antiglare layer and preferably appropriately controlled in material and thickness.

Examples of the antiglare layer that is capable of being provided in the invention include those described in paragraphs [0010] to [0070] of WO 2011/115226, paragraphs [0011] to [0077] of WO 2011/115228, paragraphs [0013] to [0057] of WO 2011/122483, paragraphs [0023] to [0049] of WO 2011/129367, paragraphs [0011] to [0074] of WO 2012/046640, paragraphs [0010] to [0073] of WO 2012/046662, paragraphs [0011] to [0074] of WO 2012/046663, paragraphs [0011] to [0074] of WO 2012/046664, and paragraphs [0009] to [0079] of WO 2012/053632.

A screen for an image display screen having a touch-sensitive panel of various systems, which is becoming popular in recent years, is demanded to have resistance to contamination with fingerprints and antifouling property, and it may be effective to form a fingerprint contamination resistant layer or an antifouling layer on the optical film of the invention. For the fingerprint contamination resistant layer and the antifouling layer, reference may be made, for example, to Japanese Patent No. 4,517,590, Japanese Patent No. 4,638,954, WO 2010/090116 and WO 2011/105594.

The optical film of the invention may also be used as a base material of a transparent electroconductive film having a hard coat layer, which is used for a touch-sensitive panel.

Low Moisture Permeation Layer

The optical film of the invention preferably has a low moisture permeation layer on at least one surface of the cellulose acylate film.

Low Moisture Permeation Layer

The low moisture permeation layer in the optical film of the invention is a layer that is provided separately from the cellulose acylate film, the patterned optically anisotropic layer, and the antireflection layer and the like optionally provided, and may satisfy the following expression (301):

$$A/B \leq 0.6 \tag{301}$$

wherein in the expression (301), A represents the moisture permeability of the laminate of the cellulose acylate film and the low moisture permeation layer laminated on each other, and B represents the moisture permeability of the cellulose acylate film.

Moisture Permeability

The moisture permeability in the invention is an amount of water vapor (g/m$^2$/day) that passes for 24 hours under conditions of a temperature of 40° C. and a relative humidity of 90% according to the method described in JIS Z0208 (1976), moisture permeability test method for moisture proof packaging materials (cup method).

The expression (301) means that the moisture permeability A of the laminate of the cellulose acylate film and the low moisture permeation layer laminated on each other is lower than the moisture permeability B of the base film by the prescribed ratio, i.e., the expression defines the capability of the low moisture permeation layer.

In the expression (301), A represents the moisture permeability of the laminate of the cellulose acylate film and the low moisture permeation layer laminated on each other as described above, but this does not mean that the cellulose acylate film and the low moisture permeation layer are adjacent to each other in the optical film of the invention.

The value of A/B in the expression (301) is preferably 0.5 or less, more preferably 0.4 or less, further preferably 0.3 or less, and still further preferably 0.2 or less.

First Embodiment

For further reducing the moisture permeability of the optical film, the low moisture permeation layer preferably has an embodiment (first embodiment) containing a compound (A1) having an alicyclic hydrocarbon group and/or a compound (A2) having a fluorene ring in an amount of from 50 to 99% by mass based on the total solid content except for the inorganic components.

The content of the compound (A1) and/or a compound (A2) in the low moisture permeability layer (which may be hereinafter referred to as the total content in the case where both the compound (A1) and the compound (A2) are contained) may be measured, for example, by a combination of pyrolysis GC-MS and elemental analysis. The contents of a rosin compound (B), inorganic fine particles (C) and a cyclic polyolefin resin (D) described later may also be measured in the similar manner.

The content of the compound (A1) and/or the compound (A2) in the low moisture permeability layer is more preferably more than 50% by mass and 99% by mass or less, further preferably from 55 to 95% by mass, and particularly preferably from 60 to 90% by mass.

The low moisture permeability layer preferably contains, in addition to the compound (A1) and/or the compound (A2), a rosin compound (B) and/or inorganic fine particles (C) having an average particle diameter of 30 nm or more and 100 nm or less, for further decreasing the moisture permeability of the optical film.

The content of the rosin compound (B) in the low moisture permeability layer is preferably from 1 to 50% by mass, more preferably from 10 to 40% by mass, and further preferably from 15 to 30% by mass.

The content of the inorganic fine particles (C) in the low moisture permeability layer is preferably from 10 to 80% by mass, more preferably from 15 to 75% by mass, and further preferably from 20 to 70% by mass.

The low moisture permeability layer according to the first embodiment is preferably a layer that is formed by curing a curable composition containing a compound (a1) having an alicyclic hydrocarbon group and an unsaturated double bond group and/or a compound (a2) having a fluorene ring and an unsaturated double bond group, the rosin compound (B), the inorganic fine particles (C), and the like (which may be hereinafter abbreviated as a curable composition for a low moisture permeability layer).

The curable composition for a low moisture permeability layer may further contain depending on necessity an additional compound (a3) having an unsaturated double bond group, an inorganic lamellar compound, a polymerization initiator, an ultraviolet ray absorbent, a solvent, and the like. The components will be described below.

Compound (a1) Having Alicyclic Hydrocarbon Group and Unsaturated Double Bond Group The compound having an alicyclic hydrocarbon group and an unsaturated double bond group may function as a binder. A low moisture permeability may be achieved by forming the low moisture permeability layer with the compound having an alicyclic hydrocarbon group and an unsaturated double bond group. While the details are not necessarily clear, the use of the compound having an alicyclic hydrocarbon group in the molecule thereof may introduce the hydrophobic alicyclic hydrocarbon group into the low moisture permeability layer to make the low moisture permeability layer hydrophobic, and thus external molecules are prevented from being incorporated into the layer, thereby reducing the moisture permeability. Furthermore, the unsaturated double bond group contained in the molecule may increase the density of the crosslinked sites to restrict the diffusion path of water molecules in the low moisture permeability layer. The increase of the density of the crosslinked sites may also be effective for increasing relatively the density of the alicyclic hydrocarbon group, and thereby the interior of the low moisture permeability layer may be made more hydrophobic, which may prevent water molecules from being adsorbed thereon, and thus may reduce the moisture permeability.

The number of the unsaturated double bond group contained in the molecule is more preferably 2 or more for increasing the density of the crosslinked sites.

The alicyclic hydrocarbon group is preferably a group derived from an alicyclic compound having 7 or more carbon atoms, more preferably a group derived from an alicyclic compound having 10 or more carbon atoms, and further preferably a group derived from an alicyclic compound having 12 or more carbon atoms.

The alicyclic hydrocarbon group is particularly preferably a group derived from a polycyclic compound, such as a bicyclic compound and a tricyclic compound.

The alicyclic hydrocarbon group is further preferably the main skeleton of the compound within the scope of claim of JP-A-2006-215096, the main skeleton of the compound described in JP-A-2001-10999, a skeleton of an adamantane derivative, and the like.

The alicyclic hydrocarbon group (including a linking group) is preferably a group represented by one of the following general formulae (I) to (V), more preferably a group represented by one of the following general formulae (I), (II) and (IV), and further preferably a group represented by the following general formula (I):

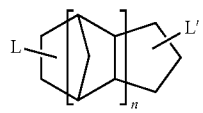
(I)

wherein in the general formula (I), L and L' each independently represent a divalent or higher-valent linking group; and n represents an integer of from 1 to 3,

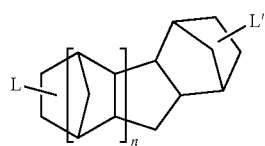
(II)

wherein in the general formula (II), L and L' each independently represent a divalent or higher-valent linking group; and n represents an integer of from 1 to 2,

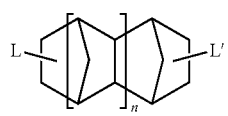
(III)

wherein in the general formula (III), L and L' each independently represent a divalent or higher-valent linking group; and n represents an integer of from 1 to 2,

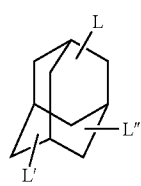
(IV)

wherein in the general formula (IV), L and L' each independently represent a divalent or higher-valent linking group; and L" represents a hydrogen atom or a divalent or higher-valent linking group, and

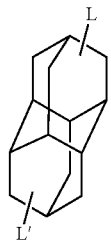
(V)

wherein in the general formula (V), L and L' each independently represent a divalent or higher-valent linking group.

Specific examples of the alicyclic hydrocarbon group include norbornyl, tricyclodecanyl, tetracyclodecanyl, pentacyclodecanyl, adamantyl and diadamantyl.

Examples of the unsaturated double bond group include polymerizable functional groups, such as a (meth)acryloyl group, a vinyl group, a styryl group and an allyl group, and among these, a (meth)acryloyl group and $-C(O)OCH=CH_2$ are preferred. A compound containing two or more (meth)acryloyl groups in one molecule described below is particularly preferably used.

The compound having an alicyclic hydrocarbon group and two or more unsaturated double bond groups in one molecule may be constituted by bonding the alicyclic hydrocarbon group and the group having an unsaturated double bond through a linking group.

Examples of the linking group include a single bond, an alkylene group having from 1 to 6 carbon atoms, which may have a substituent substituted thereon, an amide group, which may have a substituent substituted on the N atom thereof, a carbamoyl, which may have a substituent substituted on the N atom thereof, an ester group, an oxycarbonyl group, an ether group, and groups obtained by combining these groups.

These compounds may be easily synthesized by one-stage reaction or two-stage reaction of a polyol, such as a diol and a triol, having the alicyclic hydrocarbon group, and a carboxylic acid, a carboxylic acid derivative, an epoxy derivative, an isocyanate derivative or the like of a compound having a (meth)acryloyl group, a vinyl group, a styryl group, an allyl group or the like.

These compounds may be preferably synthesized through reaction of a compound, such as (meth)acrylic acid, (meth)acryloyl chloride, (meth)acrylic anhydride and glycidyl (meth)acrylate, or the compound described in WO 2012/00316A (for example, 1,1-bis(acryloxymethyl)ethyl isocyanate) with a polyol having the alicyclic hydrocarbon group.

Preferred specific examples of the compound having an alicyclic hydrocarbon group and an unsaturated double bond group are shown below, but the invention is not limited to the examples.

M-1

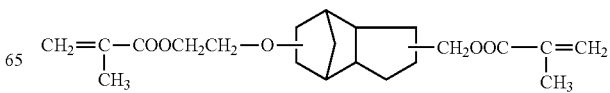

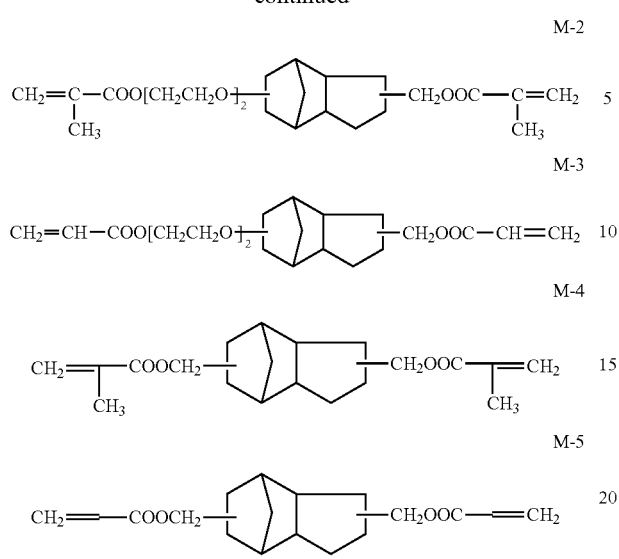

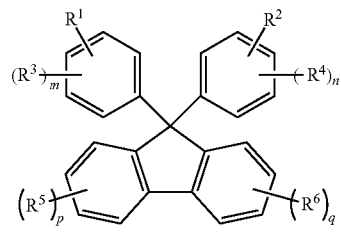

wherein in the general formula (VI), $R^1$, $R^2$, $R^3$, $R^4$, $R^5$ and $R^6$ each independently represent a monovalent substituent; and m, n, p and q each independently represent an integer of from 0 to 4, provided that at least one of $R^1$ and $R^2$ represents a monovalent organic group having an ethylenic unsaturated group.

The compound having a fluorene skeleton and an unsaturated double bond group is preferably represented by the following general formula (VII):

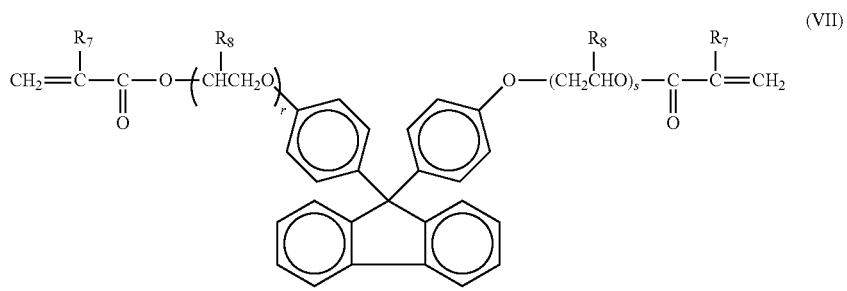

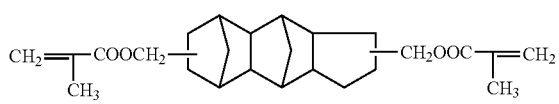

Compound (a2) Having Fluorene Ring and Unsaturated Double Bond Group

The compound having a fluorene ring and an unsaturated double bond group may function as a binder.

The compound having a fluorene ring and an unsaturated double bond group may function as a curing agent, which enhances the strength and the scratch resistance of the coated film and simultaneously achieving low moisture permeability.

The number of the unsaturated double bond group contained in the molecule is more preferably 2 or more for increasing the density of the crosslinked sites.

The compound having a fluorene ring and an unsaturated double bond group is preferably represented by the following general formula (VI):

wherein in the general formula (VII), $R^7$ and $R^3$ each represent a hydrogen atom or a methyl group; and r and s each represent an integer of from 0 to 5.

The content of the compound (a1) and/or a compound (a2) (which the total content in the case where both the compound (a1) and the compound (a2) are contained) is preferably from 50 to 99% by mass, more preferably more than 50% by mass and 99% by mass or less, further preferably from 55 to 95% by mass, and particularly preferably from 60 to 90% by mass, based on the total solid content of the curable composition for a low moisture permeability layer except for the inorganic components.

Rosin Compound (B)

The rosin compound (B) is preferably at least one kind selected from rosin, hydrogenated rosin, acid-modified rosin and esterified rosin.

Examples of the rosin include non-modified rosin, such as tall oil rosin, gum rosin and wood rosin, containing a resin acid as the major component, such as abietic acid, levopimaric acid, palustric acid, neoabietic acid, dehydroabietic acid and dihydroabietic acid.

Examples of the hydrogenated rosin include the aforementioned kinds of rosin having been hydrogenated. Examples of the acid-modified rosin include an unsaturated acid-modified rosin having an unsaturated acid, such as maleic acid, fumaric acid and acrylic acid, added through Diels-Alder addition reaction, and specific examples thereof include maleopimaric acid obtained by adding maleic acid to rosin, flumaropimaric acid obtained adding fumaric acid to rosin, and acrylopimaric acid obtained adding acrylic acid to rosin. Examples of the esterified rosin include a glycerin ester obtained by subjecting rosin and glycerin to esterification reaction, and a pentaerythritol ester obtained by esterifying pentaerythritol.

Examples of the rosin ester include Super Ester E-720, Super Ester E-730-55, Super Ester E-650, Super Ester E-786-60, Tamanol E-100, Emulsion AM-1002 and Emulsion SE-50 (all trade names of special rosin ester emulsion, produced by Arakawa Chemical Industries, Ltd.), Super Ester L, Super Ester A-18, Super Ester A-75, Super Ester A-100, Super Ester A-115, Super Ester A-125 and Super Ester T-125 (all trade names of special rosin ester, produced by Arakawa Chemical Industries, Ltd.).

Examples of the rosin ester also include Ester Gum AAG, Ester Gum AAL, Ester Gum A, Ester Gum AAV, Ester Gum 105, Ester Gum HS, Ester Gum AT, Ester Gum H, Ester Gum HP, Ester Gum HD, Pensel A, Pensel AD, Pensel AZ, Pensel C, Pensel D-125, Pensel D-135, Pensel D-160 and Pensel KK (all trade names of rosin ester resin, produced by Arakawa Chemical Industries, Ltd.)

Other examples of the rosin include Rondis R, Rondis K-25, Rondis K-80 and Rondis K-18 (all trade names of rosin derivative, produced by Arakawa Chemical Industries, Ltd.), Pinecrystal KR-85, Pinecrystal KR-120, Pinecrystal KR-612, Pinecrystal KR-614, Pinecrystal KE-100, Pinecrystal KE-311, Pinecrystal KE-359, Pinecrystal KE-604, Pinecrystal 30PX, Pinecrystal D-6011, Pinecrystal D-6154, Pinecrystal D-6240, Pinecrystal KM-1500 and Pinecrystal KM-1550 (all trade names of colorless rosin derivative, produced by Arakawa Chemical Industries, Ltd.), Aradime R-140 and Aradime R-95 (all trade names of polymerized rosin, produced by Arakawa Chemical Industries, Ltd.), Hypale CH (a trade name of hydrogenated rosin, produced by Arakawa Chemical Industries, Ltd.), and Beamset 101 (a trade name of rosin acrylate, produced by Arakawa Chemical Industries, Ltd.).

The acid value of the rosin compound is preferably from 150 to 400 KOHmg/g, more preferably from 200 to 400 KOHmg/g, and particularly preferably from 280 to 400 KOHmg/g. With the cellulose acylate film as the base material, the acid value of the rosin compound may be controlled within the range, and thereby considerably good adhesion of the cured layer may be obtained while maintaining the effect of reducing the moisture permeability of the cured layer.

Examples of the rosin compound having an acid value within the range include the acid-modified rosin described above, and a rosin compound obtained by adding maleic acid or fumaric acid through Diels-Alder addition reaction is preferably used in the invention.

In the invention, the rosin compound is preferably acid-modified rosin, and a rosin compound that is acid-modified and then hydrogenated is more preferably used. The hydrogenation thereof may oxidize the remaining double bond of the rosin compound in the low moisture permeability layer, thereby preventing the film from being colored.

The softening point of the rosin compound is preferably from 100 to 170° C. When the softening point of the rosin is less than 100° C., the cured layer may be too soft to provide a tendency that the anti-blocking property is deteriorated, and when the softening point exceeds 170° C., the solubility thereof in a solvent may be lowered, which may increase the haze of the cured layer.

The softening point of the rosin compound in the invention may be measured by a ball-and-ring method according to JIS K2531.

The content of the rosin compound (B) in the case where the rosin compound (B) is contained is preferably from 1 to 50% by mass, more preferably from 10 to 40% by mass, and further preferably from 15 to 30% by mass, based on the total solid content of the curable composition for a low moisture permeability layer, for further reducing the moisture permeability of the optical film.

Inorganic Fine Particles (C) Having Average Particle Diameter of 30 nm or More and 100 nm or Less Examples of the inorganic fine particles (C) having an average particle diameter of 30 nm or more and 100 nm or less used include inorganic oxide fine particles and magnesium fluoride fine particles. Among these, silica fine particles are preferred from the standpoint of the refractive index, the dispersion stability and the cost.

The average particle diameter (primary particle diameter) of the inorganic fine particles (C) is from 30 to 100 nm, preferably from 35 to 90 nm, and more preferably from 40 to 85 nm, from the standpoint of the reduction of the moisture permeability.

The inventors are considering as follows about the mechanism of the reduction of the moisture permeability by the use of the inorganic fine particles having an average particle diameter of 30 nm or more and 100 nm or less.

When a difference in water vapor partial pressure is made between one surface and the other surface of the film having the low moisture permeability layer, water molecules pass through the low moisture permeability layer with the difference in water vapor partial pressure as a driving force. In the case where the inorganic fine particles are present in the low moisture permeability layer, water molecules do not pass through the inorganic fine particles and thus restricted in the region, through which water molecules can pass inside the layer, and consequently the moisture permeability may be reduced.

On the other hand, the surface of the inorganic fine particles is covered with hydroxyl groups, to which water molecules are liable to be adsorbed, and thus water molecules are liable to be present inside the low moisture permeability layer. In the stationary state, it is considered that water molecules inside the low moisture permeability layer are repeatedly adsorbed and desorbed on the surface of the inorganic fine particles. Assuming that the amount of the inorganic fine particles contained in the low moisture permeability layer is constant, when the average particle diameter of the inorganic fine particles is less than 30 nm, it is considered that the total surface area of the inorganic is increased, and the average distance among the inorganic fine particles is decreased, thereby failing to achieve sufficiently the effect of reducing the moisture permeability, in which water molecules are prevented to pass through the inorganic fine particles.

When the average particle diameter of the inorganic fine particles exceeds 100 nm, on the other hand, it is considered that the gaps among the inorganic fine particles and the binder and the like are liable to be formed inside layer, and water molecules pass through the gaps to increase the moisture permeability.

The inorganic fine particles may be crystalline or amorphous, and may be monodisperse particles or agglomerated particles having particle diameter that satisfies the prescribed range, with monodisperse particles being preferred. The shape thereof may be an irregular shape, or may be porous particles or hollow particles, and particles having a spherical shape with no hollow thereinside are preferred since the amount of water adsorbed thereon may be small.

The inorganic fine particles may be a mixture of two or more kinds thereof having different average particle diameters.

The average particle diameter of the inorganic fine particles may be measured by any known method, for example, an electron micrograph or a BET method, and in the invention, the average particle diameter is a value that is measured by a BET method.

The inorganic fine particles (C) are preferably surface-treated by an ordinary method, and are preferably surface-treated (surface-modified) with a silane coupling agent.

In particular, for improving the dispersibility to the binder for forming the low moisture permeability layer, the surface of the inorganic fine particles is preferably treated with a hydrolysate of an organosilane compound and/or a partial condensate thereof, and it is further preferred that one or both of an acid catalyst and a metal chelate compound is used in the treatment. For the surface treatment method of the surface of the inorganic fine particles, reference may be made to paragraphs (0046) to (0076) of JP-A-2008-242314, and the organosilane compound, the siloxane compound, the solvent for the surface treatment, the catalyst for the surface treatment, the metal chelate compound, and the like described in the literature may be favorably used in the invention.

The content of the inorganic fine particles (C) in the case where the particles are contained is preferably from 10 to 80% by mass, more preferably from 15 to 75% by mass, and further preferably from 20 to 70% by mass, based on the total solid content of the curable composition for a low moisture permeability layer, for further reducing the moisture permeability of the optical film.

Additional Compound (a3) Having Unsaturated Double Bond Group

In the invention, a compound (a3) having an unsaturated double bond group other than the compound (a1) and the compound (a2) described above may be used in the curable composition for a low moisture permeability layer in such a range that does not impair the effects of the invention.

The compound (a3) is preferably a (meth)acrylate compound that does not have an alicyclic hydrocarbon group or a fluorene ring, and examples thereof include a (meth) acrylate diester compound of an alkylene glycol, a (meth) acrylate diester compound of a polyoxyalkylene glycol, a (meth)acrylate diester compound of a polyhydric alcohol, a (meth)acrylate diester compound of an ethylene oxide adduct or a propylene oxide adduct, an epoxy (meth)acrylate compound, urethane(meth)acrylate compound and a polyester (meth)acrylate compound.

Among these, an ester of a polyhydric alcohol and (meth) acrylic acid is preferred.

Specific examples thereof include 1,4-butanediol di(meth)acrylate, 1,6-hexanediol di(meth)acrylate, neopentyl glycol di(meth)acrylate, ethylene glycol di(meth)acrylate, triethylene glycol di(meth)acrylate, pentaerythritol tetra(meth) acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri (meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, polyurethane polyacrylate, polyester polyacrylate and caprolactone-modified tris(acryloxyethyl) isocyanurate.

The polyfunctional acrylate compound having a (meth) acryloyl group used may be a commercially available product, and examples thereof include NK Ester A-TMMT, produced by Shin-Nakamura Chemical Co., Ltd., and KAYARAD DPHA, produced by Nippon Kayaku Co., Ltd. For the polyfunctional monomer, reference may be made to paragraphs (0114) to (0122) of JP-A-2009-98658, which may be similarly applied to the invention.

The compound having no alicyclic hydrocarbon group and having an unsaturated double bond group is preferably a compound having a hydrogen bonding substituent from the standpoint of the adhesion to the base film and the patterned optically anisotropic layer and the low curing property. The hydrogen bonding substituent means a substituent containing an atom having a large electronegativity, such as nitrogen, oxygen, sulfur and a halogen, bonded to hydrogen through a covalent bond, and specific examples thereof include OH—, SH—, —NH—, CHO— and CHN—, with a urethane(meth)acrylate compound and a (meth)acrylate compound having a hydroxyl group being preferred. A commercially available polyfunctional acrylate having a (meth)acryloyl group may be used, and examples thereof include NK Oligo U4HA and NK Ester A-TMM-3, produced by Shin-Nakamura Chemical Co., Ltd., and KAYARAD PET-30, Nippon Kayaku Co., Ltd.

The content of the compound (a3) in the case where the compound is contained is preferably from 1 to 30% by mass, more preferably from 2 to 20% by mass, and further preferably from 3 to 15% by mass, based on the total solid content of the curable composition for a low moisture permeability layer.

Inorganic Lamellar Compound

The curable composition for a low moisture permeability layer also preferably contains an inorganic lamellar compound dispersed in the binder capable of being used in the low moisture permeability layer, for further reducing the moisture permeability of the low moisture permeability layer. The inorganic lamellar compound has a hydrophilic surface and is preferably subjected to organification.

The inorganic lamellar compound has a structure containing unit crystal layers laminated on each other and shows property of swelling or cleavage on coordination or absorption of a solvent among the layers. Examples of the inorganic compound of this type include a swellable hydrous silicate salt, such as a smectite group clay mineral (e.g., montmorillonite, saponite and hectorite), a vermiculite group clay mineral, a kaolinite group clay mineral, a ferrosilicate salt (e.g., mica). A synthetic inorganic lamellar compound may also be preferably used. Examples of the synthetic inorganic lamellar compound include synthetic smectite (such as hectorite, saponite and stevensite) and synthetic mica, and smectite, montmorillonite, and mica are preferred, with montmorillonite and mica being more preferred. Examples of the commercially available product of the inorganic lamellar compound include MEB-3 (synthetic mica aqueous dispersion, produced by Co-op Chemical Co., Ltd.), ME-100 (synthetic mica, produced by Co-op Chemical Co., Ltd.), S1ME (synthetic mica, produced by Co-op Chemical Co., Ltd.), SWN (synthetic smectite, produced by Co-op Chemical Co., Ltd.) SWF (synthetic smectite, produced by Co-op Chemical Co., Ltd.), Kunipia F (purified bentonite, produced by Kunimine Industries Co., Ltd.), BEN-GEL (purified bentonite, produced by Hojun Co., Ltd.), BEN-GEL HV (purified bentonite, produced by Hojun Co., Ltd.), BEN-GEL FW (purified bentonite, produced by Hojun Co., Ltd.), BEN-GEL Brite 11 (purified bentonite, produced by Hojun Co., Ltd.), BEN-GEL Brite 23 (purified bentonite, produced by Hojun Co., Ltd.), BEN-GEL Brite 25 (purified bentonite, produced by Hojun Co., Ltd.), BEN- GEL A (purified bentonite, produced by Hojun Co., Ltd.) and BEN-GEL 2M (purified bentonite, produced by Hojun Co., Ltd.).

The inorganic lamellar compound is preferably the inorganic lamellar compound that has been subjected to organification.

The swellable lamellar inorganic compound is preferably formed into fine particles for achieving both the low moisture permeability and the adhesion between the base material and the low moisture permeation layer. The swellable lamellar inorganic compound having been formed into fine particles is generally in a plate shape or a planar shape, and the planar shape thereof is not particularly limited and may be an irregular shape. The average particle diameter of the swellable lamellar inorganic compound having been formed into fine particles (i.e., the average particle diameter of the planar shape) is, for example, preferably from 0.1 to 10 μm, more preferably from 0.1 to 8 μm, and particularly preferably from 0.1 to 6 μm.

Polymerization Initiator

The curable composition for a low moisture permeability layer preferably contains a polymerization initiator. The polymerization initiator is preferably a photopolymerization initiator.

Examples of the photopolymerization initiator include an acetophenone compound, a benzoin compound, a benzophenone compound, a phosphine oxide compound, a ketal compound, an anthraquinone compound, a thioxanthone compound, an azo compound, a peroxide compound, a 2,3-dialkyldione compound, a disulfide compound, a fluoroamine compound, an aromatic sulfonium compound, a lophine dimer compound, an onium salt compound, a borate salt compound, an active ester compound, an active halogen compound, an inorganic complex and a coumarin compound. The specific examples, the preferred embodiments, the commercially available products and the like are described in paragraphs (0133) to (0151) of JP-A-2009-098658 and may be similarly favorably used in the invention.

Various examples of the photopolymerization initiator are described in "Saishin UV Koka Gijutsu" (Newest UV Curing Techniques), published by Technical Information Institute Co., Ltd., 1991, p. 159, and Kiyoshi Kato, "Shigaisen Koka System" (Ultraviolet Ray Curing Systems), published by Sogo Gijutsu Center, Heisei 1 (1989), pp. 65-148, and are useful in the invention.

Preferred examples of the commercially available photocleavage type photoradical polymerization initiator include Irgacure 651, Irgacure 184, Irgacure 819, Irgacure 907, Irgacure 1870 (a mixed initiator of CGI-403 and Irgacure 184 (7/3)), Irgacure 500, Irgacure 369, Irgacure 1173, Irgacure 2959, Irgacure 4265, Irgacure 4263, Irgacure 127 and OXE 01, all produced by BASF AG (former Ciba Specialty Chemicals, Inc.), Kayacure DETX-S, Kayacure BP-100, Kayacure BDMK, Kayacure CTX, Kayacure BMS, Kayacure 2-EAQ, Kayacure ABQ, Kayacure CPTX, Kayacure EPD, Kayacure ITX, Kayacure QTX, Kayacure BTC and Kayacure MCA, all produced by Nippon Kayaku Co., Ltd., Esacure (KIP100F, KB1, EB3, BP, X33, KT046, KT37, KIP150, TZT and the like), produced by Sartomer, and combination of these compounds.

The content of the photopolymerization initiator is preferably from 0.5 to 8% by mass, and more preferably from 1 to 5% by mass, based on the total solid content in the curable composition for a low moisture permeability layer, for polymerizing the polymerizable compounds contained in the curable composition for a low moisture permeability layer and preventing the number of initiating sites from being too large.

Ultraviolet Ray Absorbent

The curable composition for a low moisture permeability layer may contain an ultraviolet ray absorbent.

The optical film of the invention containing the low moisture permeability layer is used as a member of a polarizing plate or a liquid crystal display device, and for preventing the polarizing plate and the liquid crystal from being deteriorated, the low moisture permeability layer may contain an ultraviolet ray absorbent to impart an ultraviolet ray absorbing capability to the optical film.

Solvent

The curable composition for a low moisture permeability layer may contain a solvent.

Various solvents may be used therefor taking the solubility of the monomer, the drying property on coating, and the like into consideration. Examples of the organic solvent include dibutyl ether, dimethoxyethane, diethoxyethane, propylene oxide, 1,4-dioxane, 1,3-dioxolane, 1,3,5-trioxane, tetrahydrofuran, anisole, phenetol, dimethyl carbonate, methylethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethylcarbitol, butylcarbitol, hexane, heptane, octane, cyclohexane, methylcyclohexane, ethylcyclohexane, benzene, toluene and xylene, which may be used solely or as a combination of two or more kinds thereof.

Among the solvents, at least one of dimethyl carbonate, methyl acetate, ethyl acetate, methyl ethyl ketone, acetylacetone and acetone is preferably used, one of dimethyl carbonate and methyl acetate is more preferably used, and methyl acetate is particularly preferably used.

The content of the solvent is preferably such an amount that makes a solid concentration of the curable composition for a low moisture permeability layer of from 20 to 80% by mass, more preferably from 30 to 75% by mass, and further preferably from 40 to 70% by mass.

Second Embodiment

For further reducing the moisture permeability of the optical film, the low moisture permeation layer preferably has an embodiment (second embodiment) containing a cyclic polyolefin resin (D) in an amount of from 50 to 99% by mass.

Cyclic Polyolefin Resin (D)

The cyclic polyolefin resin means a polymer resin having a cyclic olefin structure.

Examples of the cyclic polyolefin resin include (1) a norbornene polymer, (2) a polymer of a monocyclic olefin, (3) a polymer of a cyclic conjugated diene, (4) a vinyl alicyclic hydrocarbon polymer, and hydrogenated products of (1) to (4).

The polymer that is preferred in the invention is an addition (co)polymer cyclic polyolefin resin containing at least one kind of a repeating unit represented by the following general formula (102), and depending on necessity, an addition (co)polymer cyclic polyolefin resin containing at least one kind of a repeating unit represented by the following general formula (101). A ring-opening (co)polymer containing at least one kind of a cyclic repeating unit represented by the following general formula (103) may also be preferably used.

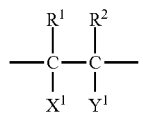
(101)

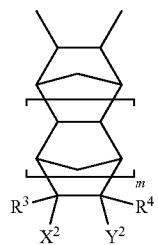
(102)

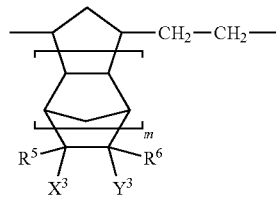
(103)

In the general formulae (101) to (103), m each represents an integer of from 0 to 4; $R^1$ to $R^6$ each represent a hydrogen atom or a hydrocarbon group having from 1 to 10 carbon atoms; and $X^1$ to $X^3$ and $Y^1$ to $Y^3$ each represent a hydrogen atom, a hydrocarbon group having from 1 to 10 carbon atoms, a halogen atom, a hydrocarbon group having from 1 to 10 carbon atoms substituted with a halogen atom, —$(CH_2)_n$COOR$^{11}$, —$(CH_2)_n$OCOR$^{12}$, —$(CH_2)_n$NCO, —$(CH_2)_n$NO$_2$, —$(CH_2)_n$CN, —$(CH_2)_n$CONR$^{13}$R$^{14}$, —$(CH_2)_n$NR$^{13}$R$^{14}$, —$(CH_2)_n$OZ or —$(CH_2)_n$W, or $X^1$ and $Y^1$, $X^2$ and $Y^2$, or $X^3$ and $Y^3$ constitute (—CO)$_2$O or (—CO)$_2$NR$^{15}$, wherein $R^{11}$, $R^{12}$, $R^{13}$, $R^{14}$ and $R^{15}$ each represent a hydrogen atom or a hydrocarbon group having from 1 to 20 carbon atoms; Z represents a hydrocarbon group or a hydrocarbon group substituted with a halogen atom; W represents SiR$^{16}_p$D$_{3-p}$ (wherein $R^{16}$ represents a hydrocarbon group having from 1 to 10 carbon atoms; D represents a halogen atom, —OCOR$^{16}$ or —OR$^{16}$; and p represents an integer of from 0 to 3); and n represents an integer of from 0 to 10.

The hydrogenated product or a norbornene polymer may be produced in such a manner that a polycyclic unsaturated compound is subjected to addition polymerization or metathesis ring-opening polymerization and then subjected to hydrogenation, as described in JP-A-1-240517, JP-A-7-196736, JP-A-60-26024, JP-A-62-19801, JP-A-2003-159767 and JP-A-2004-309979. In the norbornene polymer used in the invention, $R^3$ to $R^6$ each are preferably a hydrogen atom or —CH$_3$, and more preferably a hydrogen atom from the standpoint of low moisture permeability; $X^3$ and $Y^3$ each are preferably a hydrogen atom, Cl, or —COOCH$_3$, and more preferably a hydrogen atom from the standpoint of low moisture permeability; the other groups may be appropriately selected; and m is preferably 0 or 1. The norbornene resin may be commercially available as Arton G and Arton F, trade names, produced by JSR Corporation, and Zeonor ZF14 and ZR16, and Zeonex 250 and 280, all trade names, produced by Nippon Zeon Corporation, all of which may be used in the invention.

The norbornene addition (co)polymer is described in JP-A-10-7732, JP-A-2002-504184, U.S. Patent Application No. 2004/229157A1, WO 2004/070463A1 and the like, and may be obtained by subjecting a norbornene polycyclic unsaturated compound to addition polymerization. The norbornene addition (co)polymer may also be obtained by subjecting a norbornene polycyclic unsaturated compound and depending on necessity ethylene, propylene or butene; a conjugated diene, such as butadiene or isoprene; a non-conjugated diene, such as ethylidenenorbornene; or a linear diene compound, such as acrylonitrile, acrylic acid, methacrylic acid, maleic anhydride, an acrylate ester, a methacrylate ester, maleimide, vinyl acetate or vinyl chloride. Among these, a copolymer with ethylene is preferred. The norbornene addition (co)polymer is commercially available as Apel, a trade name, produced by Mitsui Chemicals, Inc., which includes grades with various glass transition temperatures (Tg), such as APL 8008T (Tg: 70° C.), APL 6013T (Tg: 125° C.), APL 6015T (Tg: 145° C.) and the like. The norbornene addition (co) polymer is also commercially available as TOPAS 8007, 6013, 6015 and the like in the form of pellets, trade names, produced by Polyplastics Co., Ltd., and as Appear 3000, a trade name, produced by Ferrania Company.

In the invention, the content of the cyclic polyolefin resin (D) in the low moisture permeation layer is preferably from 70 to 100% by mass, and more preferably from 80 to 100% by mass.

In the cyclic polyolefin resin (D), the content of the cyclic olefin polymerization unit is preferably from 5 to 95% by mass.

In the invention, the glass transition temperature (Tg) of the cyclic polyolefin resin (D) is not particularly limited, and a cyclic polyolefin resin having a high Tg, for example, of from 200 to 400° C. may be used.

The low moisture permeation layer according to the second embodiment is preferably a layer that is formed by curing a curable composition for a low moisture permeation layer containing the cyclic polyolefin resin (D).

The curable composition for a low moisture permeation layer may further contain depending on necessity an addition compound (a3) containing an unsaturated double bond group, the inorganic lamellar compound, the polymerization initiator, an ultraviolet ray absorbent, the solvent and the like, as similar to the first embodiment. In the second embodiment, the compound (a1) and the compound (a2) used in the curable composition for a low moisture permeability layer according to the first embodiment may also be contained.

Structure of Low Moisture Permeability Layer
Thickness of Low Moisture Permeability Layer The low moisture permeability layer may be a single layer or may be constituted by plural layers, and the thickness of the low moisture permeability layer (which is the thickness of each of the layers in the case where plural layers are provided) is preferably from 0.5 to 25 μm, more preferably from 1 to 20 μm, further preferably from 2 to 18 μm, and particularly preferably from 3 to 17 μm.

Moisture Permeability of Low Moisture Permeability Layer

The following expression (A) obtained from the gas permeation expression of a composite film (see, for example, Housou Zairyo no Barrier Sei no Kagaku, Housou Gaku Kiso Koza 5 (Science of Barrier Property of Packaging Materials, Basic Course of Packaging 5), pp. 68-72, T. Nakagawa, published by The Society Of Packaging Science & Technology, Japan):

$$1/Jf = 1/Js + 1/Jb \quad (A)$$

wherein Jf represents the moisture permeability of the optical film in the stationary state; Js represents the moisture permeability of the cellulose acylate film; Jb represents the moisture permeability of the low moisture permeability layer when the optical film is separated into the cellulose acylate film and the low moisture permeability layer.

The moisture permeability of the optical film Jf and the moisture permeability of the cellulose acylate film Js may be measured directly, and the moisture permeability of the low moisture permeability layer Jb may be calculated from these values.

In the invention, the moisture permeability of the low moisture permeability layer is preferably from 5.0 to 100 g/m²/day, more preferably from 10 to 100 g/m²/day, further preferably from 15 to 90 g/m²/day, and particularly preferably from 20 to 80 g/m²/day.

Moisture Permeability Per Unit Thickness of Low Moisture Permeability Layer

It has been ordinarily known that the moisture permeability in the stationary state is in reverse proportion to the thickness of the film. Accordingly, the moisture permeability that is achieved by the low moisture permeability layer having a thickness within the aforementioned range is determined by the moisture permeability per unit thickness, which is a value inherent to the material, and a smaller value thereof may achieve a smaller moisture permeability. The moisture permeability may be controlled with the thickness of the low moisture permeability layer according to the aforementioned relationship, but when the moisture permeability per unit thickness is too small, it may be difficult to control the moisture permeability of the optical film.

Taking these circumstances into consideration, the moisture permeability per a thickness of 10 μm or the low moisture permeability layer is preferably from 5.0 to 100 g/m²/day, more preferably from 10 to 100 g/m²/day, further preferably from 20 to 90 g/m²/day, and particularly preferably from 30 to 80 g/m²/day.

The moisture permeability herein is a value measured according to JIS 20208 at a temperature of 40° C. and a relative humidity of 90% after 24 hours.

The moisture permeability per a thickness of 10 μm or the low moisture permeability layer may be estimated as follows from the values of moisture permeability of the cellulose acylate film and the optical film, and the thickness of the low moisture permeability layer.

The moisture permeability per a thickness of 10 μm or the low moisture permeability layer Cb (10 μm) may be shown by the following expression (C) based on the value of Jb calculated above:

$$Cb(10 \, \mu m) = Jb \times db/10 (g/m^2/day) \quad (C)$$

wherein db (μm) represents the thickness of the low moisture permeability layer, which is obtained by the difference in thickness between before and after laminating the low moisture permeability layer as described above.

The low moisture permeability layer may also preferably have functions of a hard coat layer, an antireflection layer, an antifouling layer and the like.

Production Method of Low Moisture Permeability Layer

The production method (lamination method) of the low moisture permeability layer is not particularly limited, and preferred examples of the method include a method of coating the curable composition for a low moisture permeability layer described above on the cellulose acylate film or the patterned optically anisotropic layer, followed by curing.

Purpose of Optical Film

The optical film of the invention is useful as various purposes including a protective film for a polarizing plate, a surface protective film disposed on an image display surface, and the like. For imparting functions suitable for the purposes, the optical film may have other layers in addition to the cellulose acylate film and the hard coat layer. For example, the optical film may have an antiglare layer, a clear hard coat layer, an antireflection layer, an antistatic layer, an antifouling layer and the like.

The image display device is also not particularly limited. The image display device may be a liquid crystal display device containing a liquid crystal cell, an organic EL image display device containing an organic EL layer, or a plasma image display device. The optical film of the invention contains the cellulose acylate film, and thus has good adhesion property to a polarizer, and therefore the optical film is suitable for the use in a liquid crystal display device having a polarizing plate as an essential member.

The protective film for a polarizing plate used on the front side of the display device preferably has an antiglare layer and a clear hard coat layer, and also an antireflection layer, an antistatic layer and an antifouling layer.

In the production of a polarizing plate with the optical film of the invention having the cellulose acylate film that has an in-plane retardation axis, the optical film is preferably adhered in such a manner that the in-plane retardation axis is in parallel to or perpendicular to the transmission axis of the polarizer.

Polarizing Plate

The invention also relates to polarizing plate containing at least one sheet of the optical film according to the invention. The polarizing plate according to the invention preferably contains the optical film of the invention and a polarizer.

The polarizing plate of the invention may be produced by an ordinary method. For example, the polarizing plate may be produced by adhering a polarizer on the back surface of the cellulose acylate film (i.e., the surface having no hard coat layer formed thereon) of the optical film of the invention. The adhesion surface of the cellulose acylate film is preferably subjected to an alkali saponification treatment. A fully saponified polyvinyl alcohol aqueous solution may be used for the adhesion.

The polarizer may be any known ordinary one. Examples thereof include a polarizer obtained by treating a film formed of a hydrophilic polymer, such as polyvinyl alcohol or ethylene-modified polyvinyl alcohol having an ethylene unit content of from 1 to 4% by mol, a polymerization degree of from 2,000 to 4,000 and a saponification degree of from 99.0 to 99.99% by mol, with a dichroic dye, such as iodine, followed by stretching, and a polarizer obtained by treating and orienting a plastic film, such as polyvinyl chloride.

Examples of the method of providing a polarizer film having a thickness of 10 μm or less by subjecting a laminated film containing a base material having formed thereon a polyvinyl alcohol layer to stretching and dyeing include those described in Japanese Patent No. 5,048,120, Japanese Patent No. 5,143,918, Japanese Patent No. 5,048,120, Japanese Patent No. 4,691,205, Japanese Patent No. 4,751,481 and Japanese Patent No. 4,751,486. These known techniques relating to a polarizer may also be favorably used in the polarizing plate of the invention.

The thickness of the polarizer is preferably from 5 to 30 μm. The polarizer thus obtained is adhered to a polarizing plate protective film.

Lamination Method of Polarizer and Polarizing Plate Protective Film

The production method of a polarizing plate according to the invention preferably contains a step of laminating two sheets of the polarizing plate protective films on both surfaces of the polarizer obtained by the aforementioned method.

An adhesive may be generally used for the lamination. The adhesive layer between the polarizing film and the polarizing plate protective films on both surfaces thereof may have a thickness of approximately from 0.01 to 30 μm, preferably from 0.01 to 10 μm, and more preferably from 0.05 to 5 μm. When the thickness of the adhesive layer is in the range, the polarizing plate protective films thus laminated on the polarizer may be prevented from being floated or released, and an adhesive force that has no practical problem may be obtained.

Preferred examples of the adhesive include an aqueous adhesive, i.e., an adhesive containing an adhesive component that is dissolved or dispersed in water, and an adhesive containing a polyvinyl alcohol resin aqueous solution is preferably used.

Examples of the polyvinyl alcohol resin in the polyvinyl alcohol resin aqueous solution include a homopolymer of vinyl alcohol, which is obtained by saponifying polyvinyl acetate as a homopolymer of vinyl acetate, and also include a vinyl alcohol copolymer, which is obtained by saponifying a copolymer of vinyl acetate and another copolymerizable monomer, and a modified polyvinyl alcohol polymer, which is obtained by partially modifying the hydroxyl group thereof.

The adhesive may contain as a crosslinking agent a polyvalent aldehyde compound, a water soluble epoxy compound, a melamine compound, a zirconia compound, a zinc compound, a glyoxylate salt and the like. In the case where the aqueous adhesive is used, the thickness of the adhesive layer obtained therefrom is generally 1 μm or less.

Preferred examples of the adhesive also include a curable adhesive composition containing an epoxy compound capable of being cured through irradiation of an active energy ray or heating. The curable epoxy compound herein has at least two epoxy groups in the molecule. In this case, the polarizing film and the protective film may be adhered by irradiating the coated layer of the adhesive composition with an active energy ray or by heating the coated layer, thereby curing the curable epoxy compound contained in the adhesive. The curing of the epoxy compound is generally performed through cationic polymerization of the epoxy compound. The curing is preferably performed by irradiating an active energy ray from the standpoint of the productivity.

In the case where the curable adhesive is used, the thickness of the adhesive layer obtained therefrom is generally approximately from 0.5 to 5 μm.

In the case where the curable adhesive is used, such a method may be used that the films are adhered with a adhering roll, followed by drying depending on necessity, and then the films are irradiated with an active energy ray or heated to cure the curable adhesive. While the source of the active energy ray is not particularly limited, an active energy ray having an emission distribution at a wavelength of 400 nm or less, and specific preferred examples of the source include a low pressure mercury lamp, a medium pressure mercury lamp, a high pressure mercury lamp, ultrahigh pressure mercury lamp, a chemical lamp, a blacklight lamp, a microwave excited mercury lamp, and a metal halide lamp.

The epoxy compound contained in the curable adhesive composition preferably does not contain an aromatic ring in the molecule from the standpoint of the weather resistance, the refractive index, the cationic polymerizability and the like. Examples of the epoxy compound that does not contain an aromatic ring in the molecule include a hydrogenated epoxy compound, an alicyclic epoxy compound, and an aliphatic epoxy compound. For the epoxy compound that is favorably used in the curable adhesive composition, reference may be made to JP-A-2004-245925.

On the surface of the polarizer opposite to the surface having the optical film of the invention adhered, another optical film of the invention may be adhered, or a known optical film may be adhered.

While the known optical film used is not limited in the optical characteristics and the material thereof, an optical film formed of a cellulose resin, an acrylic resin or a cyclic olefin resin may be preferably used, and both an optically isotropic film and an optically anisotropic retardation film may be used.

Examples of the known optical film that is formed of a cellulose resin include the optical film formed of an optically isotropic cellulose resin containing a polyester diol described in JP-A-2009-98674, the optical film containing a cellulose resin having a positive Rth value having laminated thereon an optically anisotropic layer having a negative Rth value described in Japanese Patent No. 5,036,209, and the optical film formed of a cellulose resin having a high Re value and a high Rth value containing a low substitution degree layer and a high substitution degree layer laminated on each other described in JP-A-2011-118339.

Examples of the known optical film that is formed of an acrylic resin include the optical film formed of a (meth)acrylic resin containing a styrene resin described in Japanese Patent No. 4,570,042, the optical film formed of a (meth)acrylic resin having a glutarimide ring structure in the main chain thereof described in Japanese Patent No. 5,041,532, the optical film formed of a (meth)acrylic resin having a lactone ring structure described in JP-A-2009-122664, and the optical film formed of a (meth)acrylic resin having a glutaric anhydride unit described in JP-A-2009-139754.

Examples of the known optical film that is formed of a cyclic olefin resin include the cyclic olefin resin film described in paragraphs 0029 et seq. of JP-A-2009-237376, and the cyclic olefin resin film containing an additive that reduces the Rth value described in Japanese Patent No. 4,881,827 and JP-A-2008-063536.

In an embodiment where the polarizing plate according to the invention is used in a liquid crystal display device, both cases may be preferred where the optical film of the invention is disposed on the inner side of the polarizer (i.e., between the polarizer and the liquid crystal cell) and on the outer side of the polarizer (i.e., on the side of the polarizer opposite to the liquid crystal surface), and in the case where the optical film has a hard coat layer, the optical film is preferably disposed on the outer side of the display surface.

Liquid Crystal Display Device

The liquid crystal display device of the invention has the optical film according to the invention or the polarizing plate according to the invention. The function of the optical film of the invention in the liquid crystal display device is not particularly limited. One example of the position where the optical film of the invention is disposed is a surface protective film without a hard coat layer for a polarizing plate disposed on the inner side of the polarizer (i.e., between the polarizer and the liquid crystal cell). Another example of the position where the optical film of the invention is disposed is a surface protective film having a hard coat layer for a polarizing plate disposed on the inner side of the polarizer in the polarizing plate on the display surface side (i.e., between the polarizer and the liquid crystal cell). The polarizing plate of the invention is preferably a polarizing plate that is disposed on the display surface side, and the optical film of the invention is preferably disposed on the outer side of the display surface side. The other structures and materials of the liquid crystal display device may be ones that are known for known liquid crystal display devices. The display mode of the liquid crystal display device is not particularly limited, and the liquid crystal display device of the invention may be constituted as liquid crystal display devices having various display modes, such as TN (twisted nematic), IPS (in-plane switching), FLC (ferroelectric liquid crystal), AFLC (antiferroelectric liquid crystal), OCB (optically compensatory bend), STN (super twisted nematic), VA (vertically aligned) and HAN (hybrid aligned nematic).

The liquid crystal display device of the invention is preferably a transmission type liquid crystal display device, and the transmission type liquid crystal display device is generally constituted by a backlight, a liquid crystal cell, and two polarizing plates having transmission axes perpendicular to each other, and the two polarizing plates are adhered to the viewing side and the backlight side of the liquid crystal cell through an adhesive layer, respectively.

The liquid crystal cell contains a liquid crystal layer and two glass substrates provided on both sides of the liquid crystal layer.

The glass substrate used for the liquid crystal display device may be silicate glass, preferably silica glass and borosilicate glass, and most preferably alkali-free borosilicate glass. In the case where the glass substrate for the liquid crystal display device contains an alkali component, there are cases where the alkali component may be eluted to damage TFT. The alkali-free borosilicate glass herein means glass that contains substantially no alkali component, and specifically glass that has a content of an alkali component of 1,000 ppm or less. The content of the alkali component of the glass in the invention is preferably 500 ppm or less, and more preferably 300 ppm or less.

The glass substrate for the liquid crystal display device may be in the form of a plate having a substantially rectangular shape in planar view, and preferably has a thickness of from 0.01 to 1.1 mm. When the thickness is less than 0.01 mm, the glass substrate is liable to receive influence of the interference of light and the internal distortion due to deformation of the glass substrate for the display device to be evaluated, and when the thickness exceeds 1.1 mm, the luminance on evaluation may be decreased. The thickness of the glass substrate is more preferably from 0.1 to 0.7 mm, and further preferably from 0.1 to 0.5 mm.

EXAMPLE

The features of the invention will be described in more detail with reference to examples below. The materials, the amounts and ratios thereof used, the contents of processes, the procedures of processes, and the like in the examples may be modified as far as they do not deviate from the substance of the invention. Accordingly, the invention is not construed as being limited to the following examples.

Example 1

Production of Core Layer Cellulose Acylate Dope

The following components were dissolved by agitating in a mixing tank to prepare a cellulose acylate solution.

| | |
|---|---|
| Cellulose acylate having acetylation degree of 2.88 | 100 parts by mass |
| Ester oligomer A | 10 parts by mass |
| Polarizer durability improver (2-3) | 4 parts by mass |
| Ultraviolet ray absorbent (compound having the following structure) | 2 parts by mass |
| Methylene chloride (first solvent) | 430 parts by mass |
| Methanol (second solvent) | 64 parts by mass |

TABLE 1

| Ester oligomer | Dicarboxylic acid | | | Diol | End | Hydroxyl value (mgKOH/g) | Molecular weight |
|---|---|---|---|---|---|---|---|
| | Aliphatic (m) | Aromatic (n) | | | | | |
| | Adipic acid | Phthalic acid | Terephthalic acid | | | | |
| A | 3 | 7 | 0 | ethylene glycol | acetyl group | 0 | 1,000 |
| B | 3 | 7 | 0 | ethylene glycol | acetyl group | 0 | 800 |
| C | 3 | 7 | 0 | ethylene glycol | acetyl group | 0 | 1,200 |
| D | 2 | 8 | 0 | ethylene glycol | acetyl group | 0 | 1,200 |
| E | 0 | 10 | 0 | ethylene glycol | acetyl group | 0 | 1,000 |
| F | 3 | 7 | 0 | ethylene glycol | acetyl group | 0 | 1,000 |
| G | 2 | 8 | 0 | ethylene glycol | acetyl group | 0 | 1,000 |

TABLE 1-continued

| | Dicarboxylic acid | | | | | | |
| | Aliphatic (m) | Aromatic (n) | | | | Hydroxyl | |
| Ester oligomer | Adipic acid | Phthalic acid | Terephthalic acid | Diol | End | value (mgKOH/g) | Molecular weight |
|---|---|---|---|---|---|---|---|
| H | 0 | 0 | 10 | ethylene glycol | acetyl group | 0 | 1,000 |
| I | 3 | 5 | 2 | ethylene glycol | acetyl group | 0 | 1,000 |
| J | 5 | 5 | 0 | ethylene glycol | acetyl group | 0 | 1,000 |
| K | 3 | 7 | 0 | ethylene glycol | OH group | 56 | 1,000 |
| L | 0 | 10 | 0 | ethylene glycol | acetyl group | 0 | 650 |

Polarizer Durability Improver (2-3)

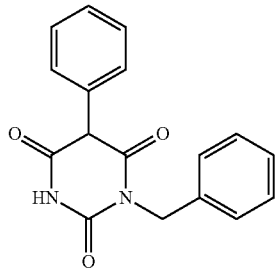 [SMILES: O=C1NC(=O)N(Cc2ccccc2)C(=O)C1c1ccccc1]

Ultraviolet Ray Absorbent

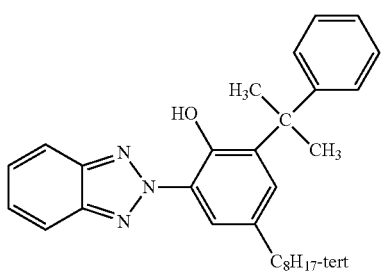

Production of Outer Layer Cellulose Acylate Dope 10 parts by mass of a matting agent solution shown below was added to 90 parts by mass of the core layer cellulose acylate dope produced above to prepare an outer layer cellulose acetate dope.

| | |
|---|---|
| Silica particles (average particle diameter: 20 nm, Aerosil R972, available from Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

Production of Cellulose Acylate Film

The core layer cellulose acylate dope and on both sides thereof the outer layer cellulose acylate dopes were cast simultaneously for three layers from the casting die onto a drum, the temperature of which is 20° C. The film was peeled at a condition where the solvent content thereof was approximately 20% by mass, and the film was dried while stretching its width by 1.1 times of that of the peeled film in the transverse direction of the film with both edges of the film being fixed with tenter clips in the condition where the solvent content was from 3 to 15%. Thereafter, the film was further dried by conveying among rolls of a heat treatment device, thereby producing a cellulose acylate film having a thickness of 20 µm.

Formation of Hard Coat Layer

As a coating liquid for forming a hard coat layer, the following curable composition, hard coat 1, for a hard coat layer was prepared.

| | Monomer | | | Total amount | UV Initiator | | |
| | Monomer 1 | Monomer 2 | Monomer 1/ monomer 2 | added (part by mass) | Kind | Amount added (parts by mass) | Solvent |
|---|---|---|---|---|---|---|---|
| Hard coat 1 | pentaerythritol triacrylate | pentaerythritol tetraacrylate | 3/2 | 53.5 | UV initiator 1 | 1.5 | Ethyl acetate |

UV Initiator 1

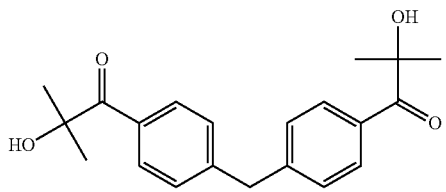 [SMILES: CC(C)(O)C(=O)c1ccc(Cc2ccc(C(=O)C(C)(C)O)cc2)cc1]

The hard coat 1 was coated on one of the surfaces of the cellulose acylate film produced above, and then cured by drying at 100° C. for 60 seconds and irradiating with an ultraviolet ray at 1.5 kW and 300 mJ under a condition of 0.1% or less of nitrogen, thereby forming a hard coat layer having the thickness shown in the following table. The thickness was controlled by changing the coated amount with a slot die in the die coating method.

Thus, an optical film of Example 1 having the cellulose acylate film produced above having the hard coat layer formed thereon was produced.

Examples 2 to 18 and Comparative Examples 1 to 7

Optical films of Examples 2 to 18 and Comparative Examples 1 to 7 each containing a cellulose acylate film having thereon a hard coat layer were produced in the same manner as in the production of the optical film of Example 1 except that the kind and the amount of the ester oligomer used in the cellulose acylate film, the kind and the amount of the polarizer durability improver, and the thickness of the film were changed as shown in Table 3.

The additives used in Examples and Comparative Examples were as follows.

Compound X
  triphenyl phosphate

Compound Y
  sugar ester compound shown below having an average substitution degree of 7.8 measured by the method described in JP-A-2012-66571

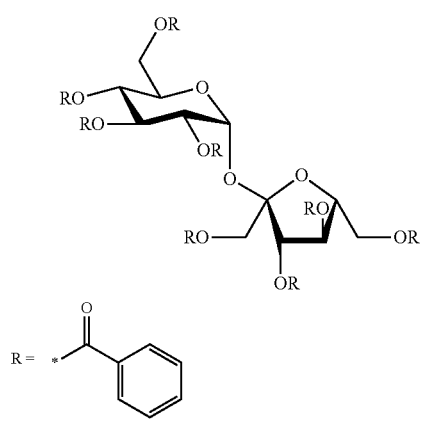

Polarizer Durability Improver (2-6)

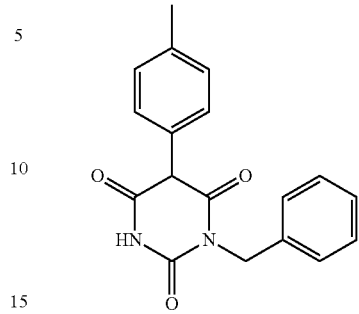

Polarizer Durability Improver (2-9)

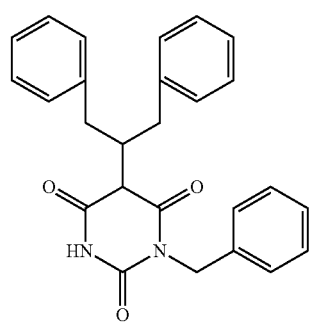 [SMILES: O=C1NC(=O)N(Cc2ccccc2)C(=O)C1C(Cc1ccccc1)Cc1ccccc1]

Polarizer Durability Improver (2-10)

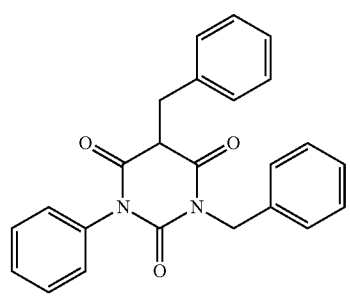 [SMILES: O=C1C(Cc2ccccc2)C(=O)N(c2ccccc2)C(=O)N1Cc1ccccc1]

Polarizer Durability Improver (1-5)

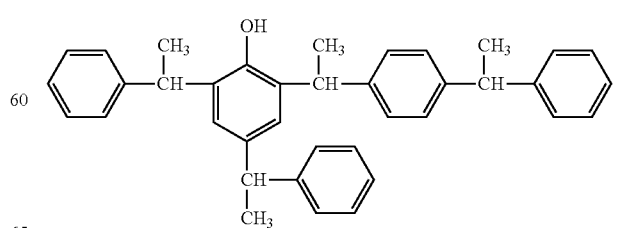

Polarizer Durability Improver (1-11)

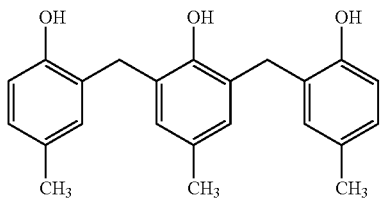 [SMILES: Cc1ccc(O)c(Cc2cc(C)cc(Cc3cc(C)ccc3O)c2O)c1]

Evaluation

The optical films obtained in Examples and Comparative Examples were evaluated as follows. The results of the evaluations are shown in Table 3 below.

Dent Bump

The cellulose acylate films without a hard coat layer used in the optical films of Examples and Comparative Examples each were wound in a length of 3,900 m to a roll, which was allowed to stand for one week, and the roll was visually observed for appearance.

A: The roll was not deformed.
C: The surface of the roll was deformed to form irregularity.

For the evaluation of dent bump, the grade A is necessary for practical use.

Evaluation of Optical Film

Knoop Hardness

By using a hardness meter, Model HM2000, produced by Fischer Instruments K.K., a diamond indenter was indented on the principal surface of the optical films of Examples and Comparative Examples at a maximum indentation load of 20 mN, an indentation speed of 10 seconds and a creep of 5 seconds, and the Knoop hardness was obtained from the resulting relationship between the maximum indentation depth and the load.

The Knoop hardness is preferably 240 or more, and particularly preferably 245 or more.

Pencil Hardness

The evaluation of pencil hardness according to JIS K5400 was performed. The optical films of Examples and Comparative Examples were subjected to humidity conditioning at a temperature of 25° C. and a relative humidity of 60% for 2 hours, and then evaluated with the test pencils having hardness of from F to 5H according to JIS 56006 under a load of 4.9 N, and the maximum hardness that the optical film passed was designated as the evaluated value of pencil hardness. The determination of pass and fail was made as follows.

pass: In 5 test specimens, 0 to 2 specimens were damaged.
fail: In 5 test specimens, 3 or more specimens were damaged.

The pencil hardness of 3H or more is necessary in practical use.

Evaluation of Polarizing Plate
Production of Polarizing Plate
(1) Saponification of Film The optical films of Examples and Comparative Exampleseach were immersed in a 4.5 mol/L sodium hydroxide aqueous solution (saponification solution) controlled to 37° C. for 1 minute, followed by rinsing with water, and then immersed in a 0.05 mol/L sulfuric acid aqueous solution for 30 seconds, followed by rinsing in a water bath. The films each were dehydrated by subjecting to draining with an air knife three times, and then dried by retaining in a drying zone at 70° C. for 15 seconds, thereby producing saponified films.

(2) Production of Polarizer

The film was stretched in the machine direction by passing through two pairs of nip rolls, to which a difference in circumferential speed was applied, according to Example 1 of JP-A-2001-141926, thereby preparing a polarizing film having a thickness of 20 μm.

(3) Adhesion

Two sheets were selected from the thus obtained polarizing film and the aforementioned saponified optical films and were disposed on both sides of the polarizing film with the cellulose acylate film side opposite to the hard coat layer of the optical film facing the polarizing film, and the films were adhered to each other by a roll-to-roll process with a 3% PVA aqueous solution (PVA-117H, available from Kuraray Co., Ltd.) as an adhesive in such a manner that the polarizing axis of the polarizing film was perpendicular to the machine direction of the saponified films, thereby producing a polarizing plate. The optical films on both sides of the polarizing film were the same as each other.

Evaluation of Polarizer Durability

The polarizing plates thus produced above each were adhered on the side of the optical films of Examples and Comparative Examples to a glass plate with a pressure-sensitive adhesive, thereby preparing two pairs of specimens each having a size of approximately 5 cm×5 cm. The specimens were disposed to form crossed nicols, which were measured for orthogonal transmittance at a wavelength of 410 nm with VAP-7070, available from Jasco Corporation. Thereafter, the specimens having been stored under an environment of 60° C. and 90% RH for 1,000 hours were measured for orthogonal transmittance in the same manner as above. The polarizer durability of the polarizing plate is defined by the change rate of the orthogonal transmittance as follows.

evaluation value of polarizer durability of polarizing plate=((orthogonal transmittance after storing (%))−(orthogonal transmittance before storing (%)))/(orthogonal transmittance before storing (%))

The evaluation value of polarizer durability is necessarily less than 0.15 for practical use, preferably 0.14 or less, and more preferably 0.09 or less.

Evaluation of Thickness of Polarizing Plate

The polarizing plates thus produced above each were evaluated for thickness, and a thickness exceeding 100 μm was designated as grade C, whereas a thickness of 100 μm or less was designated as grade A.

The thickness of the polarizing plate is necessarily grade A for practical use.

TABLE 3

| | Cellulose acylate film | | | | | | | | | |
|---|---|---|---|---|---|---|---|---|---|---|
| | Additive | | | | Polarizer durability improver | | | | | |
| | Kind | m/n | Hydroxyl value (mgKOH/g) | Amount added (part by mass) | Kind | Amount added (part by mass) | Ultraviolet ray absorbent (amount added (part by mass)) | Thickness (μm) | Rth (nm) | Re (nm) |
| Example 1 | A | 3/7 | 0 | 10 | 2-3 | 4 | UV agent (2) | 20 | 10 | 1 |
| Example 2 | A | 3/7 | 0 | 10 | 2-6 | 4 | UV agent (2) | 20 | 10 | 1 |
| Example 3 | A | 3/7 | 0 | 10 | 2-9 | 4 | UV agent (2) | 20 | 10 | 1 |
| Example 4 | A | 3/7 | 0 | 10 | 2-10 | 4 | UV agent (2) | 20 | 10 | 1 |
| Example 5 | A | 3/7 | 0 | 10 | 1-5 | 4 | UV agent (2) | 20 | 10 | 1 |
| Example 6 | A | 3/7 | 0 | 10 | 1-11 | 4 | UV agent (2) | 20 | 10 | 1 |
| Example 7 | B | 3/7 | 0 | 10 | 2-10 | 4 | UV agent (2) | 20 | 10 | 1 |
| Example 8 | C | 3/7 | 0 | 10 | 2-10 | 4 | UV agent (2) | 20 | 10 | 1 |
| Example 9 | D | 2/8 | 0 | 10 | 2-10 | 4 | UV agent (2) | 20 | 12 | 1 |
| Example 10 | E | 0/10 | 0 | 10 | 2-10 | 4 | UV agent (2) | 20 | 15 | 1 |
| Example 11 | F | 3/7 | 0 | 10 | 2-10 | 4 | UV agent (2) | 20 | 10 | 1 |
| Example 12 | G | 2/8 | 0 | 10 | 2-10 | 4 | UV agent (2) | 20 | 12 | 1 |
| Example 13 | H | 0/10 | 0 | 10 | 2-10 | 4 | UV agent (2) | 20 | 40 | 3 |
| Example 14 | I | 3/7 | 0 | 10 | 2-10 | 4 | UV agent (2) | 20 | 15 | 1 |
| Example 15 | E | 0/10 | 0 | 25 | 2-10 | 4 | UV agent (2) | 20 | 15 | 1 |
| Example 16 | A | 3/7 | 0 | 10 | 2-3 | 4 | UV agent (2) | 40 | 20 | 1 |
| Comparative Example 1 | J | 5/5 | 0 | 10 | 2-10 | 4 | UV agent (2) | 20 | 5 | 1 |
| Example 17 | K | 3/7 | 56 | 10 | 2-3 | 4 | UV agent (2) | 20 | 10 | 1 |
| Example 18 | A | 0/10 | 0 | 15 | 2-10 | 4 | — | 20 | 16 | 1 |
| Example 19 | E | 0/10 | 0 | 10 | 2-10 | 4 | UV agent (4) | 20 | 15 | 1 |
| Example 20 | E | 0/10 | 0 | 8 | 2-10 | 4 | UV agent (2) | 40 | 30 | 1 |
| Example 21 | L | 0/10 | 0 | 10 | 2-10 | 4 | UV agent (2) | 20 | 14 | 1 |
| Example 22 | L | 0/10 | 0 | 10 | 2-10 | 4 | UV agent (4) | 20 | 14 | 1 |
| Example 23 | L | 0/10 | 0 | 10 | 2-10 | 4 | UV agent (2) | 40 | 29 | 1 |
| Example 24 | L | 0/10 | 0 | 8 | 2-10 | 4 | UV agent (2) | 40 | 29 | 1 |
| Comparative Example 2 | H | 0/10 | 0 | 20 | 2-10 | 4 | UV agent (2) | 20 | 55 | 3 |
| Comparative Example 3 | Compound Y | — | — | 10 | 2-10 | 4 | UV agent (2) | 20 | 20 | 1 |
| Comparative Example 4 | Compound X | — | — | 10 | 2-10 | 4 | UV agent (2) | 20 | 30 | 1 |
| Comparative Example 5 | J | 5/5 | 0 | 10 | 2-3 | 4 | UV agent (2) | 60 | 8 | 1 |
| Comparative Example 6 | J | 5/5 | 0 | 15 | 2-10 | 4 | — | 20 | 5 | 1 |

| | Evaluation result | | | | | |
|---|---|---|---|---|---|---|
| | Hard coat layer | Cellulose acylate film | Optical film | | Polarizing plate | |
| | Thickness (μm) | Dent bump | Knoop hardness | Pencil hardness | Polarizer durability | Thickness of polarizing plate |
| Example 1 | 5 | A | 246 | 3H | 0.06 | A |
| Example 2 | 5 | A | 246 | 3H | 0.06 | A |
| Example 3 | 5 | A | 246 | 3H | 0.06 | A |
| Example 4 | 5 | A | 246 | 3H | 0.06 | A |
| Example 5 | 5 | A | 246 | 3H | 0.06 | A |
| Example 6 | 5 | A | 246 | 3H | 0.06 | A |
| Example 7 | 5 | A | 246 | 3H | 0.06 | A |
| Example 8 | 5 | A | 246 | 3H | 0.06 | A |
| Example 9 | 5 | A | 249 | 3H | 0.05 | A |
| Example 10 | 5 | A | 254 | 3H | 0.03 | A |
| Example 11 | 5 | A | 246 | 3H | 0.06 | A |
| Example 12 | 5 | A | 249 | 3H | 0.05 | A |
| Example 13 | 5 | A | 256 | 3H | 0.02 | A |
| Example 14 | 5 | A | 246 | 3H | 0.06 | A |
| Example 15 | 5 | A | 275 | 3H | 0.01 | A |
| Example 16 | 5 | A | 246 | 3H | 0.04 | A |
| Comparative Example 1 | 5 | A | 235 | 2H | 0.23 | A |
| Example 17 | 5 | A | 246 | 3H | 0.16 | A |
| Example 18 | 5 | A | 250 | 3H | 0.04 | A |
| Example 19 | 5 | A | 251 | 3H | 0.03 | A |
| Example 20 | 5 | A | 253 | 3H | 0.03 | A |
| Example 21 | 5 | A | 252 | 3H | 0.03 | A |

TABLE 3-continued

|  |  |  |  |  |  |  |
|---|---|---|---|---|---|---|
| Example 22 | 5 | A | 249 | 3H | 0.03 | A |
| Example 23 | 5 | A | 251 | 3H | 0.03 | A |
| Example 24 | 5 | A | 251 | 3H | 0.03 | A |
| Comparative Example 2 | 5 | A | 261 | 3H | 0.01 | A |
| Comparative Example 3 | 5 | A | 245 | 2H | 0.09 | A |
| Comparative Example 4 | 5 | C | 228 | 2H | 0.37 | A |
| Comparative Example 5 | 5 | A | 215 | 3H | 0.09 | C |
| Comparative Example 6 | 5 | A | 230 | 2H | 0.25 | A |

It was understood from Table 3 that the optical film of the invention had a thin thickness, has good appearance on forming the film in the roll form, achieved a pencil hardness of 3H on providing a hard coat layer, and did not suffer display unevenness on installing the film in a liquid crystal display device.

On the other hand, the optical film of Comparative Example 1, which had a ratio m/n, wherein m represents the molar proportion of the repeating unit derived from an aliphatic dicarboxylic acid of the aromatic ester oligomer, and n represents the molar proportion of the repeating unit derived from an aromatic dicarboxylic acid, exceeding the upper limit of the invention, was insufficient in Knoop hardness and had low pencil hardness on providing a hard coat layer.

It was confirmed that the polarizing plate produced by using the optical film of Comparative Example 2 having an Rth value exceeding the upper limit of the invention suffered large changed in luminance and color on observing from the front or the oblique direction, and display unevenness, which meant deteriorated display performance. The other polarizing plates exhibited characteristics that were equivalent to before removing the polarizing plate.

The optical film of Comparative Example 4 using triphenyl phosphate instead of the aromatic ester oligomer was insufficient in Knoop hardness and had low pencil hardness on providing a hard coat layer.

The optical film of Comparative Example 3 using the sugar ester compound instead of the aromatic ester oligomer had low pencil hardness on providing a hard coat layer, irrespective of the Knoop hardness thereof. It is considered that this is because the impregnation of the hard coat coating liquid into the cellulose acylate film increases the mixed region of the cellulose acylate film and the hard coat layer, which prevents the hardness inherent to the hard coat layer from being provided.

It is understood from the above results that a liquid crystal display device having excellent display performance by producing the polarizing plate using the cellulose acylate film of the invention.

Examples 101 to 124 and Comparative Examples 101 to 106

Optical films of Examples 101 to 124 and Comparative Examples 101 to 106 were produced in the same manner as in Examples 1 to 24 and Comparative Examples 1 to 6, respectively, except that in the optical films of Examples 1 to 24 and Comparative Examples 1 to 6, the drying condition after coating the hard coat 1 was changed from 100° C. for 60 seconds to 120° C. for 30 seconds.

The evaluations of the pencil hardness of the hard coat layers of the optical films of Examples 101 to 124 and Comparative Examples 101 to 106 were the same as the evaluations of the pencil hardness of the hard coat layers of the optical films of Examples 1 to 24 and Comparative Examples 1 to 6.

Examples 201 to 224 and Comparative Examples 201 to 206

Optical films of Examples 201 to 224 and Comparative Examples 201 to 206 were produced in the same manner as in Examples 1 to 24 and Comparative Examples 1 to 7, respectively, except that in the optical films of Examples 1 to 24 and Comparative Examples 1 to 6, the coating liquid for forming a hard coat layer used was changed from the hard coat 1 to the hard coat 2 described in paragraph 0132 of JP-A-2012-215812.

The evaluations of the pencil hardness of the hard coat layers of the optical films of Examples 201 to 224 and Comparative Examples 201 to 206 were the same as the evaluations of the pencil hardness of the hard coat layers of the optical films of Examples 1 to 24 and Comparative Examples 1 to 6.

Examples H1-1 to H1-24, Comparative Examples H1-1 to H1-6, Examples H2-1 to H2-24, and Comparative Examples H2-1 to H2-6

A high hardness hard coat layer was provided as the hard coat layer.

High Hardness Hard Coat Layer 1: H1

4 parts by mass of Irgacure 184 (photopolymerization initiator, produced by BASF Japan Co., Ltd.) was dissolved in a mixed solvent of methyl ethyl ketone (MEK) and methyl isobutyl ketone (MIBK) to prepare a solution having a final concentration of 40% by mass. To the solution, pentaerythritol triacrylate (PETA), U-4HA (tetrafunctional urethane oligomer, weight average molecular weight: 600, produced by Shin-Nakamura Chemical Co., Ltd.), U-15HA (penta-deca-functional urethane oligomer, weight average molecular weight: 2,300, produced by Shin-Nakamura Chemical Co., Ltd.), and a polymer (7975-D41, acrylic double bond equivalent: 250, weight average molecular weight: 15,000, produced by Hitachi Chemical Co., Ltd.) as resin components were added at a solid content ratio of 25 parts by mass/25 parts by mass/40 parts by mass/10 parts by mass, followed by stirring. To the resulting solution, a leveling agent (Megafac F-477, a trade name, produced by DIC Corporation) was added at a solid content of 0.2 parts by mass, followed by stirring, and further silica fine particles (SIRMIBK15WT %-E65, produced by CIK NanoTek Corporation) were added at a solid content of 2 parts by mass, followed by stirring, thereby preparing a composition for a hard coat layer.

The composition for a hard coat layer was coated on the optical films of Examples 1 to 24 and Comparative Examples 1 to 6 by slit reverse coating at a dry coated amount of 8 g/m² to prepare a coated film. The resulting coated film was dried at 70° C. for 1 minute, and then cured by irradiating with an ultraviolet ray at an ultraviolet ray irradiation amount of 150 mJ/cm² to form a hard coat layer having a thickness of 7 μm, thereby producing optical films having a high hardness hard coat layer of Examples H1-1 to H1-24 and Comparative Examples H1-1 to H1-6.

High Hardness Hard Coat Layer 2: H2

The following components were mixed to prepare a composition for forming a hard coat layer.

| | |
|---|---|
| Reactive irregular shape silica fine particles (40 parts by mass in terms of solid content) (equivalent product of DP1039SIV (a trade name, produced by JGC Corporation, average primary particle diameter: 20 nm, average number of particles connected: 4, solid content: 40%, MIBK solvent)) | 100 parts by mass |
| Dipentaerythritol hexaacrylate (DPHA, produced by Nippon Kayaku Co., Ltd.) | 60 parts by mass |
| Photopolymerization initiator (Irgacure 184, produced by BASF Japan Co., Ltd.) | 4 parts by mass |
| MIBK | 58 parts by mass |
| MEK | 2 parts by mass |

The composition for forming a hard coat layer was coated on the optical films of Examples 1 to 24 and Comparative Examples 1 to 6 to form a coated film. Thereafter, the coated film was dried in a heating oven at a temperature of 70° C. for 60 seconds to evaporate the solvents in the coated film, and then cured by irradiating with an ultraviolet ray at an accumulated dose of 200 mJ, thereby forming a hard coat layer having a dry thickness of 9 μm, and thus optical films having a high hardness hard coat layer of Examples H2-1 to H2-24 and Comparative Examples H2-1 to H2-6 were obtained.

Evaluation
Pencil Hardness

The resulting optical films having a high hardness hard coat layer of Examples and Comparative Examples were measured for the pencil hardness of the high hardness hard coat layer in the same manner as in the evaluation of the pencil hardness of the hard coat layer of the optical films of Examples 1 to 24 and Comparative Examples 1 to 6.

The optical films having a high hardness hard coat layer of Examples H1-1 to H1-24 and Examples H2-1 to H2-24 had a pencil hardness of 4H. The optical films having a high hardness hard coat layer of Comparative Examples H1-2, H1-5 and H1-6 and Comparative Examples H2-2, H2-5 and H2-6 had a pencil hardness of 3H. The other optical films of Comparative Examples having a high hardness hard coat layer had a pencil hardness of 2H.

Examples A1-1 to A1-24, Comparative Examples A1-1 to A1-6, Examples A2-1 to A2-24, and Comparative Examples A2-1 to A2-6

An antiglare layer shown below was provided on the optical films of Examples 1 to 24 and Comparative Examples 1 to 6.

Synthesis of Synthetic Smectite

4 L of water was placed in a 10 L beaker, in which 860 g of water glass No. 3 (SfO₂:28%, Na₂O:9%, molar ratio: 3.22) was dissolved, and 162 g of 95% sulfuric acid was added at one time thereto under stirring to prepare a silicate salt solution. Then, 560 g of a first class grade reagent of MgCl₂.6H₂O (purity: 98%) was dissolved in 1 L of water, and the resulting solution was added to the silicate salt solution to prepare a homogeneous mixed solution. The mixed solution was added dropwise to 3.6 L of 2N NaOH aqueous solution under stirring over 5 minutes.

The resulting reaction precipitate formed of a silicon-magnesium composite (a homogeneous composite in the form of aggregates of colloid particles) was immediately filtered with a cross-flow type filtration system (cross-flow filter, produced by NGK Industries, Ltd., pore size of ceramic membrane filter: 2 μm, tubular type, filtration area: 400 cm²), followed by sufficiently rinsing with water, to which a solution containing 200 mL of water and 14.5 g of Li(OH).H₂O was added to prepare a slurry. The slurry was placed in an autoclave and subjected to hydrothermal reaction at 41 kg/cm² and 250° C. for 3 hours. After cooling, the reaction product was taken out, dried at 80° C., and pulverized to provide synthetic smectite represented by the following formula having a composition of hectorite, which was one kind of smectite.

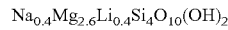

$$Na_{0.4}Mg_{2.6}Li_{0.4}Si_4O_{10}(OH)_2$$

Synthesis of Smectite Clay-Organic Composite 1

20 g of the synthetic smectite thus obtained was dispersed in 1,000 mL of tap water, to which 300 mL of a solution, which was obtained by dissolving 11.1 g of a 80% product of trioctylmethylammonium chloride, which is a quaternary ammonium salt (2.2 mmol of trioctylmethylammonium chloride) in pure water, was added, and the mixture was reacted under stirring at room temperature (25° C.) for 2 hours. The product was then subjected to solid-liquid separation and rinsing to remove the by-produced salts, and then the product was dried and pulverized to provide a clay-organic composite.

The clay-organic composite thus obtained was subjected to X-ray diffractiometry, and as a result, the base-to-base distance calculated from the (001) plane reflection was 18.0 Å, which confirmed the formation of a smectite clay-organic composite. The composite was dispersed in N,N-dimethylformamide to prepare a transparent dispersion liquid. The estimation of the content of the quaternary ammonium salt based on the analysis of the amount of nitrogen atoms by combustion of the clay-organic composite indicated 105 meq per 100 g of smectite.

In the synthesis, the amount of trioctylmethylammonium chloride added was 110 meq per 100 g of synthetic smectite, which corresponded to 1.0 time the cation exchange capacity of the synthetic smectite.

Preparation of Coating Liquid for Antiglare Layer

The components shown in Table 4 were mixed with a mixed solvent of MIBK (methyl isobutyl ketone) and MEK (methyl ethyl ketone) to provide a mixture having the composition shown in Table 4. The mixture was filtered with a polypropylene filter having a pore size of 30 μm to prepare a coating liquid for an antiglare layer. The coating liquids each had a solid concentration of 35% by mass. In the preparation of the coating liquids, the resin particles and the smectite clay-organic composite were added in the form of a dispersion liquid.

Preparation of Resin Particle Dispersion Liquid

Dispersion Liquid of transparent resin particles were added gradually to a MIBK solution under stirring until the solid concentration of the dispersion reached 30% by mass, followed by stirring for 30 minutes, thereby preparing a dispersion liquid of transparent resin particles.

The resin particles used were crosslinked styrene-methyl methacrylate copolymer particles (produced by Sekisui Plastics Co., Ltd.), which were prepared while changing the copolymerization ratio of styrene and methyl methacrylate to make the average particle diameters and the refractive indices shown in Table 4 below.

A: average particle diameter: 1.5 μm, refractive index: 1.52
B: average particle diameter: 2.5 μm, refractive index: 1.52

Preparation of Smectite Clay-Organic Composite Dispersion Liquid

In the preparation of the smectite clay-organic composite dispersion liquid, the entire MEK solution used in the coating liquid for an antiglare layer was used, and the smectite clay-organic composite was added gradually to the MEK solution under stirring, followed by stirring for 30 minutes, thereby preparing the dispersion liquid.

The compounds used are shown below.

PET-30: mixture of pentaerythritol triacrylate and pentaerythritol tetraacrylate (produced by Nippon Kayaku Co., Ltd.)

Irgacure 907: acetophenone photopolymerization initiator (produced by BASF AG, abbreviated as Irg907 in the following table)

SP-13: fluorine surfactant shown below (molar ratio: 60/40)

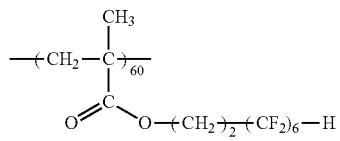

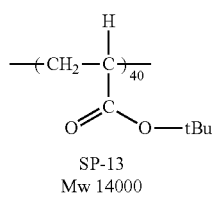

SP-13
Mw 14000

Coating of Antiglare Layer

The optical films of Examples 1 to 24 and Comparative Examples 1 to 6 each were wound off, and optical films having an antiglare layer of Examples A1-1 to A1-24, Comparative Examples A1-1 to A1-6, Examples A2-1 to A2-24 and Comparative Examples A2-1 to A2-6 having a thickness shown in Table 4 were produced therewith.

Specifically, the coating liquid was coated on the film by the die coating method using the slot die described in Example 1 of JP-A-2006-122889 under a condition of a conveying speed of 30 m/min, dried at 80° C. for 150 seconds, and then cured by irradiation with an ultraviolet ray of an illuminance of 400 mW/cm$^2$ and a dose of 180 mJ/cm$^2$ using an air-cooled metal halide lamp (produced by Eye Graphics Co., Ltd.) of 160 W/cm under an nitrogen-purged atmosphere having an oxygen concentration of approximately 0.1%, thereby forming an antiglare layer, and then the film was wound.

TABLE 4

| Antiglare layer No. | Coating liquid No. of antiglare layer | Smectite clay-organic composite | Quaternary ammonium ion content (per cation exchange capacity) | Amount of composite added | Kind of resin particles | Average particle diameter of resin particles | Refractive index of resin particles | Amount of resin particles added (% by mass) |
|---|---|---|---|---|---|---|---|---|
| A1 | 1 | composite 1 | ×0.954 | 1.20% | A | 1.5 μm | 1.52 | 8.00% |
| A2 | 2 | composite 1 | ×0.864 | 1.20% | B | 2.5 μm | 1.52 | 8.00% |

| Antiglare layer No. | PET30 (% by mass) | Irg907 (% by mass) | SP-13 (% by mass) | Dispersant* (% by mass) | Thickness | MIBK (mass ratio) | MEK (mass ratio) |
|---|---|---|---|---|---|---|---|
| A1 | 90.65% | 3.00% | 0.15% | — | 6 μm | 87 | 13 |
| A2 | 90.65% | 3.00% | 0.15% | 0.30% | 6 μm | 87 | 13 |

*Dispersant: Ajisper PB881 (produced by Ajinomoto Fine-Techno Co., Inc.)

Examples A3-1 to A3-24 and Comparative Examples A3-1 to A3-6 Antiglare Layer 3: A3

A mixture of pentaerythritol triacrylate (PETA), dipentaerythritol hexaacrylate (DPHA) and polymethyl methacrylate (PMMA) (mass ratio of PETA/DPHA/PMMA: 86/5/9) (refractive index after curing: 1.51) was used as a radiation-curable binder, to which 1-hydroxycyclohexyl phenyl ketone (Irgacure 184, produced by BASF AG, 3 parts by mass per 100 parts by mass of the solid content of the binder) as a photopolymerization initiator, acrylic particles (refractive index: 1.49, average particle diameter: 5.0 μm) as organic fine particle (A) in an amount of 9.0 parts by mass per 100 parts by mass of the radiation-curable binder, and a mixture of toluene and isopropyl alcohol (mass ratio: 73/27) as a solvent in an amount of 190 parts by mass per 100 parts by mass the radiation-curable binder were added, thereby preparing a coating liquid.

The coating liquid thus obtained was allowed to stand for 24 hours and then coated on the optical films of Examples 1 to 24 and Comparative Example 1 to 6 with a Meyer bar, and dried under a dry air stream at a temperature of 70° C. and a flow rate of 1.2 m/s for 1 minute. Thereafter, the coated film was irradiated with an ultraviolet ray (200 mJ/cm$^2$ under a nitrogen atmosphere) for curing the radiation-curable binder to form a diffusion layer, thereby producing optical films having an antiglare layer of Examples A3-1 to A3-24 and Comparative Examples A3-1 to A3-6. The thickness of the diffusion layer was 6.0 μm.

Examples A4-1 to A4-24 and Comparative Examples A4-1 to A4-6 Antiglare Layer 4: A4

A mixture of pentaerythritol triacrylate (PETA), dipentaerythritol hexaacrylate (DPHA) and polymethyl methacrylate (PMMA) (mass ratio of PETA/DPHA/PMMA: 86/5/9) (refractive index: 1.51) was used as a radiation-curable binder, to which 1-hydroxycyclohexyl phenyl ketone (Irgacure 184, produced by BASF AG, 5 parts by mass per 100 parts by mass of the solid content of the binder) as a photopolymerization initiator, highly crosslinked polystyrene particles (refractive index: 1.59, average particle diameter: 4.0 μm) as organic fine particle (A) in an amount of 12.0 parts by mass per 100 parts by mass of the radiation-curable binder, talc particles (refractive index: 1.57, average particle diameter D50: 0.8 μm) as a lamellar inorganic compound in an amount of 20.0 parts by mass per 100 parts by mass of the radiation-curable binder, and a mixture of toluene and methyl isobutyl ketone (mass ratio: 83/17) as a solvent in an amount of 190 parts by mass per 100 parts by mass the radiation-curable binder were added, thereby preparing a coating liquid.

The coating liquid thus obtained was allowed to stand for 24 hours and then coated on the optical films of Examples 1 to 24 and Comparative Example 1 to 6 by a gravure coating method, and dried under a dry air stream at a temperature of 70° C. and a flow rate of 1.2 m/s for 1 minute to form a coated film. Thereafter, the coated film was irradiated with an ultraviolet ray (200 mJ/cm$^2$ under a nitrogen atmosphere) for curing the radiation-curable binder to form a diffusion layer, thereby producing optical films having an antiglare layer of Examples A4-1 to A4-24 and Comparative Examples A4-1 to A4-6. The thickness of the diffusion layer was 6.6 μm.

Examples A5-1 to A5-24 and Comparative Examples A5-1 to A5-6 Antiglare Layer 5: A5

A mixture of pentaerythritol triacrylate (PETA), dipentaerythritol hexaacrylate (DPHA) and cellulose acetate propionate (SAP) (mass ratio of PETA/DPHA/SAP: 82/7/11) (refractive index: 1.51) was used as a radiation-curable binder, to which 1-hydroxycyclohexyl phenyl ketone (Irgacure 184, produced by BASF AG, 3 parts by mass per 100 parts by mass of the solid content of the binder) as a photopolymerization initiator, lowly crosslinked acrylic particles (refractive index: 1.49, average particle diameter: 5.0 μm) as organic fine particle (A) in an amount of 6.0 parts by mass per 100 parts by mass of the radiation-curable binder, polystyrene particles (refractive index: 1.59, average particle diameter: 3.5 μm) as organic fine particle (B) in an amount of 5.0 parts by mass per 100 parts by mass of the radiation-curable binder, talc particles (refractive index: 1.57, average particle diameter: 0.8 μm) as a lamellar inorganic compound in an amount of 8.0 parts by mass per 100 parts by mass of the radiation-curable binder. Further, as a surfactant, a non-reactive fluorine surfactant was added in an amount of 0.003 part by mass per 100 parts by mass of the radiation-curable binder, and a mixture of toluene and methyl isobutyl ketone (mass ratio: 82/18) as a solvent in an amount of 190 parts by mass per 100 parts by mass the radiation-curable binder were added thereto, thereby preparing a coating liquid.

The coating liquid thus obtained was coated on the optical films of Examples 1 to 24 and Comparative Example 1 to 6 by a gravure coating method while eliminating shear force by controlling the fed amount and the coated amount of the coating liquid to agree with each other (fed amount/coated amount of coating liquid=1/1), and dried under a dry air stream at a temperature of 70° C. and a flow rate of 1.2 m/s for 1 minute to form a coated film.

Thereafter, the coated film was irradiated with an ultraviolet ray (200 mJ/cm$^2$ under a nitrogen atmosphere) for curing the radiation-curable binder to form a diffusion layer, thereby producing optical films having an antiglare layer of Examples A5-1 to A5-24 and Comparative Examples A5-1 to A5-6. The thickness of the diffusion layer was 6.0 μm.

Examples A6-1 to A6-24 and Comparative Examples A6-1 to A6-6 Antiglare Layer 6: A6

A coating liquid having the following composition was Prepared.
Binder component 100 parts by mass (mixture of pentaerythritol triacrylate (PETA) and dipentaerythritol hexaacrylate (DPHA) (mass ratio of PETA/DPHA: 80/20, refractive index: 1.52))
Photopolymerization initiator 5.0 parts by mass (Irgacure 184, at trade name, produced by BASF Japan Co., Ltd.)
Organic fine particles (A) 8.0 parts by mass (lowly crosslinked acrylic particles (refractive index: 1.49, average particle diameter: 5.0 μm, produced by Soken Chemical & Engineering Co., Ltd.))
Solvent 190 parts by mass (mixture of toluene and isopropyl alcohol (mass ratio of toluene/isopropyl alcohol: 73/27))

The coating liquid thus obtained was aged at 20° C. for 24 hours and then coated on the optical films of Examples 1 to 24 and Comparative Example 1 to 6 with a Meyer bar, and dried under a dry air stream at a temperature of 70° C. and a flow rate of 1.2 m/s for 1 minute to form a coated film.

Thereafter, the coated film was irradiated with an ultraviolet ray (200 mJ/cm$^2$ under a nitrogen atmosphere) for curing the binder component to forma diffusion layer, thereby producing optical films having an antiglare layer of Examples A6-1 to A6-24 and Comparative Examples A6-1 to A6-6. The thickness of the diffusion layer was 6.0 μm.

Examples A7-1 to A7-24 and Comparative Examples A7-1 to A7-6 Antiglare Layer 7: A7

A coating liquid having the following composition was prepared.
Binder component 100 parts by mass (mixture of pentaerythritol triacrylate (PETA), dipentaerythritol hexaacrylate (DPHA) and polymethyl methacrylate (PMMA, weight average molecular weight: 75,000) (mass ratio of PETA/DPHA/PMMA: 80/10/10, refractive index: 1.52))
Photopolymerization initiator 5.0 parts by mass (Irgacure 184, at trade name, produced by BASF Japan Co., Ltd.)
Organic fine particles (A) 7.8 parts by mass (lowly crosslinked acrylic particles (refractive index: 1.49, average particle diameter: 5.0 μm, produced by Soken Chemical & Engineering Co., Ltd.))
Organic particles (B) 4.0 parts by mass (lowly crosslinked polystyrene particles (refractive index: 1.59, average particle diameter: 3.5 μm, produced by Soken Chemical & Engineering Co., Ltd.))
Solvent 190 parts by mass (mixture of toluene and methyl isopropyl ketone (mass ratio of toluene/methyl isobutyl ketone: 83/17))

The coating liquid thus obtained was aged for 24 hours and then coated on the optical films of Examples 1 to 24 and Comparative Example 1 to 6 with a Meyer bar, and dried under a dry air stream at a temperature of 70° C. and a flow rate of 1.2 m/s for 1 minute to form a coated film.

Thereafter, the coated film was irradiated with an ultraviolet ray (200 mJ/cm$^2$ under a nitrogen atmosphere) for curing the binder component to form a diffusion layer, thereby producing optical films having an antiglare layer of Examples A7-1 to A7-24 and Comparative Examples A7-1 to A7-6. The thickness of the diffusion layer was 6.0 µm.

Evaluation

Antiglare Property

The optical films having an antiglare layer were installed in a liquid crystal television set (LC-32DZ3, produced by Sharp Corporation), and visually evaluated for the extent of reflection of a fluorescent lamp on a solid black image displayed thereon according to the following standard.

A: The shape of the fluorescent lamp blurred, and the gradation of the blur was considerably smooth.
B: The shape of the fluorescent lamp blurred, but the gradation of the blur was slightly sharp.
C: The shape of the fluorescent lamp blurred, but the shape was slightly concerned.
D: The reflected image of the fluorescent lamp was concerned.

The optical films having an antiglare layer of all Examples and Comparative Examples were evaluated for the antiglare property, and the evaluations of all of them were grade A.

Pencil Hardness

The optical films having an antiglare layer of Examples and Comparative Examples were evaluated for the pencil hardness of the high hardness hard coat layer in the same manner as the evaluation of the pencil hardness of the hard coat layer of the optical films of Examples 1 to 24 and Comparative Examples 1 to 6.

The optical films having an antiglare layer of Examples A1-1 to A1-24, Examples A2-1 to A2-24, Examples A3-1 to A3-24, Examples A4-1 to A4-24, Examples A5-1 to A5-24, Examples A6-1 to A6-24, and Examples A7-1 to A7-24 each had a pencil hardness of 3H.

The optical films having an antiglare layer of Comparative Examples A1-2, A2-2, A3-2, A4-2, A5-2, A6-2, A7-2, A1-5, A2-5, A3-5, A4-5, A5-5, A6-5, A7-5, A1-6, A2-6, A3-6, A4-6, A5-6, A6-6, and A7-6 each had a pencil hardness of from 2H to 3H.

The optical films having an antiglare layer of Comparative Examples A1-1, A1-3, A1-4, A2-1, A2-3, A2-4, A3-1, A3-3, A3-4, A4-1, A4-3, A4-4, A5-1, A5-3, A5-4, A6-1, A6-3, A6-4, A7-1, A7-3, and A7-4 each had a pencil hardness of from F to H.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2014/050754, filed on Jan. 17, 2014; Japanese Patent Application No. 2013-007165 filed on Jan. 18, 2013; Japanese Patent Application No. 2013-053975 filed on Mar. 15, 2013; and Japanese Patent Application No. 2014-006019 filed on Jan. 16, 2014, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. An optical film containing a cellulose acylate film wherein:
   the cellulose acylate film contains a cellulose acylate and an aromatic ester oligomer having a repeating unit derived from a dicarboxylic acid and a repeating unit derived from a diol,
   the cellulose acylate film has a thickness of from 15 to 35 µm,
   the repeating unit derived from a dicarboxylic acid has a ratio m/n of from 0/10 to 3/7,
      wherein m represents a molar proportion of a repeating unit derived from an aliphatic dicarboxylic acid, and n represents a molar proportion of a repeating unit derived from an aromatic dicarboxylic acid, and
   the cellulose acylate film satisfies the following expression (1):

$$|Rth(590)| \leq 50 \text{ nm} \tag{1}$$

wherein Rth(590) represents a retardation in a thickness direction at a wavelength of 590 nm,
   wherein a proportion of a repeating unit derived from ortho-phthalic acid in the repeating unit derived from the dicarboxylic acid contained in the aromatic ester oligomer is 70% by mol or more, and
   wherein the Knoop hardness of the optical film is 240 or more N/mm$^2$.

2. The optical film according to claim 1, wherein the aromatic ester oligomer has a hydroxyl value of 10 mgKOH/g or less.

3. The optical film according to claim 1, wherein the aromatic ester oligomer has both ends that each are terminated with a monocarboxylic acid residual group.

4. The optical film according to claim 3, wherein the monocarboxylic acid residual group is an aliphatic monocarboxylic acid residual group having from 2 to 3 carbon atoms.

5. The optical film according to claim 1, wherein the aromatic ester oligomer has a number average molecular weight Mn of from 600 to 2,000.

6. The optical film according to claim 5, which contains the aromatic ester oligomer in an amount of from 5 to 25% by mass based on the cellulose acylate.

7. The optical film according to claim 1, which further contains a compound having a ratio of (molecular weight)/(number of aromatic groups) of 300 or less and represented by the following general formula (2):

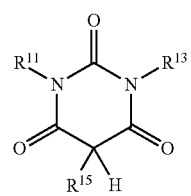

(2)

wherein $R^{11}$, $R^{13}$ and $R^{15}$ each independently represent a hydrogen atom, an alkyl group having from 1 to 20 carbon atoms, a cycloalkyl group having from 3 to 20 carbon atoms, an alkenyl group having from 2 to 20 carbon atoms, or an aromatic group having from 6 to 20 carbon atoms.

8. The optical film according to claim 1, which contains the aromatic ester oligomer in an amount of from 5 to 25% by mass based on the cellulose acylate.

9. The optical film according to claim 7, which further contains a compound having a ratio of (molecular weight)/(number of aromatic groups) of 300 or less and represented by the general formula (2) in an amount of from 0.5 to 20% by mass based on the cellulose acylate.

10. The optical film according to claim 1, which further contains an ultraviolet ray absorbent.

11. The optical film according to claim 1, which further contains at least one layer of an antiglare layer, a hard coat layer, or a patterned retardation layer, on the cellulose acylate film.

12. The optical film according to claim 11, wherein the patterned retardation layer contains a first region and a second region, the first region has an Re(550) value of from 30 to 250 nm, the second region has an Re(550) value of from 30 to 250 nm, and
wherein Re(550) represents a retardation in an in-plane retardation at a wavelength of 550 nm.

13. A polarizing plate containing an optical film containing a cellulose acylate film wherein:
the cellulose acylate film contains a cellulose acylate and an aromatic ester oligomer having a repeating unit derived from a dicarboxylic acid and a repeating unit derived from a diol,
the cellulose acylate film has a thickness of from 15 to 35 μm,
the repeating unit derived from a dicarboxylic acid has a ratio m/n of from 0/10 to 3/7,
wherein m represents a molar proportion of a repeating unit derived from an aliphatic dicarboxylic acid, and n represents a molar proportion of a repeating unit derived from an aromatic dicarboxylic acid,
the cellulose acylate film satisfies the following expression (1):

$$|Rth(590)| \leq 50 \text{ nm} \tag{1}$$

wherein Rth(590) represents a retardation in a thickness direction at a wavelength of 590 nm,
wherein a proportion of a repeating unit derived from ortho-phthalic acid in the repeating unit derived from the dicarboxylic acid contained in the aromatic ester oligomer is 70% by mol or more, and
wherein the Knoop hardness of the optical film is 240 or more N/mm².

14. A liquid crystal display device containing an optical film containing a cellulose acylate film wherein:
the cellulose acylate film contains a cellulose acylate and an aromatic ester oligomer having a repeating unit derived from a dicarboxylic acid and a repeating unit derived from a diol,
the cellulose acylate film has a thickness of from 15 to 35 μm,
the repeating unit derived from a dicarboxylic acid has a ratio m/n of from 0/10 to 3/7,
wherein m represents a molar proportion of a repeating unit derived from an aliphatic dicarboxylic acid, and n represents a molar proportion of a repeating unit derived from an aromatic dicarboxylic acid,
the cellulose acylate film satisfies the following expression (1):

$$|Rth(590)| \leq 50 \text{ nm} \tag{1}$$

wherein Rth(590) represents a retardation in a thickness direction at a wavelength of 590 nm,
wherein a proportion of a repeating unit derived from ortho-phthalic acid in the repeating unit derived from the dicarboxylic acid contained in the aromatic ester oligomer is 70% by mol or more, and
wherein the Knoop hardness of the optical film is 240 or more N/mm².

* * * * *